United States Patent
Wiles et al.

(10) Patent No.: US 6,990,228 B1
(45) Date of Patent: Jan. 24, 2006

(54) IMAGE PROCESSING APPARATUS

(75) Inventors: Charles Stephen Wiles, Guildford (GB); Adam Michael Baumberg, Bracknell (GB); Richard Ian Taylor, Bracknell (GB); Alexander Ralph Lyons, Bracknell (GB)

(73) Assignee: Canon Kabushiki Kaisha, Tokyo (JP)

( * ) Notice: Subject to any disclaimer, the term of this patent is extended or adjusted under 35 U.S.C. 154(b) by 760 days.

(21) Appl. No.: 09/718,413

(22) Filed: Nov. 24, 2000

(30) Foreign Application Priority Data

Dec. 17, 1999  (GB) ................................. 9929957
Aug. 3, 2000   (GB) ................................. 0019123

(51) Int. Cl.
*G06K 9/00*  (2006.01)
*G09G 3/10*  (2006.01)

(52) U.S. Cl. ................... 382/154; 345/419; 356/12; 348/42

(58) Field of Classification Search ............... 382/154, 382/255; 345/419–427; 356/12–14, 324–331; 348/42–60; 359/462–477; 352/57–65; 33/20.4; 353/7–9; 378/41–42
See application file for complete search history.

(56) References Cited

U.S. PATENT DOCUMENTS

| | | | | |
|---|---|---|---|---|
| 4,982,428 A | | 1/1991 | Usami et al. ................. 382/25 |
| 5,189,626 A | * | 2/1993 | Colburn ....................... 700/182 |
| 5,818,959 A | | 10/1998 | Webb et al. ................. 382/154 |
| 5,917,937 A | * | 6/1999 | Szeliski et al. ............. 382/154 |
| 6,088,035 A | * | 7/2000 | Sudarsky et al. ........... 345/421 |
| 6,351,572 B1 | * | 2/2002 | Dufour ........................ 382/285 |
| 6,363,170 B1 | * | 3/2002 | Seitz et al. ................. 382/154 |
| 6,373,487 B1 | * | 4/2002 | Culbertson et al. ......... 345/424 |
| 6,373,977 B1 | * | 4/2002 | Culbertson .................. 382/154 |
| 6,407,738 B1 | * | 6/2002 | Wakabayashi ............... 345/424 |
| 6,563,499 B1 | * | 5/2003 | Waupotitsch et al. ....... 345/420 |
| 6,574,360 B1 | * | 6/2003 | Berdardini et al. ......... 382/154 |

FOREIGN PATENT DOCUMENTS

| EP | 0 898245 A1 | 2/1999 |
|---|---|---|
| EP | 0898245 | 2/1999 |
| EP | 0 901105 A1 | 3/1999 |

(Continued)

OTHER PUBLICATIONS

Laurnetiini, "How Far 3D Shapes Can Be Understood from 2D Silhouettes", Feb. 1995, IEEE Trans. of Pattern Analysis and Machine Intel., vol. 17, No. 2, pp. 188-195.*

(Continued)

*Primary Examiner*—Bhavesh M. Mehta
*Assistant Examiner*—Aaron Carter
(74) *Attorney, Agent, or Firm*—Fitzpatrick, Cella, Harper & Scinto

(57) ABSTRACT

Creation of a computer representation of a three-dimensional object surface is described. The viewing cones for camera positions at which images of the object were taken are determined and the intersection of these viewing cones is used to define an initial three-dimensional space within which the object surface lies. This initial space is divided into voxels. Each non-occluded voxel is checked for photoconsistency by comparing the colors (or average colors) of the pixel patches in the images to which that voxel projects. Photo-inconsistent voxels are removed. A voxel may be determined to be photo-inconsistent if there exists no set of photoconsistent pixel regions or the pixel patches do not share a color value range. The pixel patch into which each voxel projects in a further image may be compared with the stored color for that voxel and any photo-inconsistent voxels removed. This process can then be repeated for further images.

35 Claims, 28 Drawing Sheets

FOREIGN PATENT DOCUMENTS

EP              0901105         3/1999

OTHER PUBLICATIONS

Carr et al., "3D Shape Reconstruction using Volume Intersection Techniques", Jan. 1998, IEEE Computer Vision 1998, 6th International Conference, pp. 1095-1100.*

Laurentini, "Inferring the Shape of the Real Object from the Object Reconstructed by Volume Intersection", 1993, IEEE, pp. 280-285.*

Laurentini, "The Visual Hull Concept for Silhouette-Based Image Understanding", Feb. 1994, IEEE Trans. of Pattern Analysis and Machine Intel., vol. 16, No. 2, pp. 150-162.*

"Photorealistic Scene Reconstruction by Voxel Coloring"; Steven M. Seitz et al.; Voxel Coloring Proc. Conf. Computer Vision & Pattern Recognition, 1997; pp. 1067-1073, Jun. 1997.

"Plenoptic Image Editing"; Steven M. Steitz et al.; Proc. 6th Int'l Conference on Computer Vision, Jan. 17-24, 1991; pp. 17-24.

"What Do N Photographs Tell Us About 3D Shape?"; Kiriakos N. Kutulakos et al.; Univ. of Rochester Computer Sciences Tech. Report 680, May 1998; pp. 1-8.

"An Implicit Surface Polygonizer"; J. Bloomenthal; Graphics Gems. IV, AP Professional, 1994, ISBN 0 12-336155-9; pp. 324-350.

"Direct Computation of Shape Cues Using Scale-Adapted Spatial Derivative Operators"; Jonas Garding et al.; Int'l. Journal of Computer Vision 17(2), 1996, pp. 163-191.

"Virtual View Generation for 3D Digital Video"; Saied Moezzi et al.; Visual Computing Lab. Dept. of Electrical & Computer Eng. Univ. of California, San Diego, La Jolla, CA.

"Adaptive Least Squares Correlation: A Powerfule Image Matching Technique"; A.W. Gruen; Institute of Geodesy and Photogrammetry Swiss Federal Institute of Technology, Zurich, pp. 175-187.

"Generalizing Epipolar-Plane Image Analysis For Non-Orthogonal and Varying View Directions"; H. Harlyn Baker et al.; Artificial Intelligence Center. SRI, Int'l. Menlo Park, CA. XP00572538; pp. 843-848.

"Automatic Reconstruction of 3D objects using a mobile Camera"; Wolfgang Niem et al.; Image and Vision Computing 17 (1999) pp. 125-134.

"Shape-from-Silhouette/Stereo and Its Application to 3-D Digitizer"; Y. Matsumoto et al. pp. 178-187.

"Automatic Reconstruction fo 3D Objects Using a Mobile Monoscopic Camera"; Wolfgang Niem et al.; Proc. Of the Int'l. Conference on Recent Advance in 3D Imaging and Modelling, (May, 1997).

"Marching Cubes: A High Resolution 3D Surface Construction Algorithm"; W.E.Lorensen et al.. Computer Graphics, SIGGRAPH 97 Proceedings, 21; Jul. 1987, pp. 163-169.

"The Facet Model"; R.M. Haralick et al.; Computer and Robot Vision vol. 1. Addison-Wesley, 1992, ISBN 0201-10877-1 (V.1), Sec. 8. pp. 371-452.

"Calibrating a Multi-Camera System for 3D Modelling"; Charles Wiles et al.; IEEE Workshop, Multi-View Modeling Analysis of Visual Scenes, ISBN 0769501109; pp. 29-36.

"A Theory of Shape by Space Carving", Kiriakos N. Kutulakos et al.; Univ. of Rochester Computer Sciences Tech. Report 692, May 1998; pp. 1-27.

"Rapid Octree Construction from Image Sequences"; Richard Szeliski;CVGIP Image Understanding vol. 58. No. 1. Jul. 1993, pp. 23-32.

"Calibration of Image Sequences For Model Visualisation", A. Broadhurst et al., 1999 IEEE Computer Society Conference On Computer Vision and Pattern Recognition, vol. 1, pp. 100-105, Jun. 23-25, 1999, Fort Collins, Colorado.

"Efficient Bundle Adjustment With Virtual Key Frames: A Hierarchical Approach To Multi-Frame Structure From Motion" Heung-Yeung Shum et al., 1999 IEEE Computer Society Conference On Computer Vision and Pattern Recognition, vol. 2, pp. 538-543, Jun. 23-25, 1999, Fort Collins, Colorado.

"A Robust Technique For Matching Two Uncalibrated Images Through The Recovery of The Unknown Epipolar Geometry", Zhengyou Zhang et al., Research Report No. 2273, INRIA Sophia-Antipolis, pp. 15-47, Cedesc (France), 1994.

"Photorealistic Scene Reconstruction by Voxel Coloring", S. Seitz et al., Proc. Conf. Computer Vision and Pattern Recognition, pp. 1067-1073, 1997.

"Plenoptic Image Editing", S. Seitz et al., Proc. $6^{th}$ International Conf. On Computer Vision, pp. 17-24.

"Rapid Octree Construction From Image Sequences", R. Szeliski, CVGIP: Image Understanding, vol. 58, No. 1, pp. 23-48, Jul., 1993.

"Polynomial Expansion of Severely Aberrated Wave Fronts", J. Braat, J. Opt. Soc. Am. A, vol. 4, No. 4, pp. 643-650, Apr., 1987.

"Closed-Form Solution of Absolute Orientation Using Unit Quaternions", B. Horn, J. Opt. Soc. Am. A, vol. 4, No. 4, pp. 629-642.

P. Eisert et al. "Multiple-hypothesis, Volumetric Reconstruction Of 3-D Objects From Multiple Calibrated Camera Views" Acoustics, Speech And Signal Processing, 1999. Proceedings., 1999 IEEE Int'l. Conf. Phoenix, AZ, USA, Mar. 15-19, 1999, Piscataway, NJ, USA, IEEE, US, Mar. 15, 1999, pp. 3509-3512, XP010328059 ISBN: 0-7803-5041-3.

C. I. Connolly, et al. "3D Scene Reconstruction From Multiple Intensity Images"; Workshop on Interpretation of 3D Scenes, 1989, Proceedings, Austin, TX, USA, Nov. 27-29, 1989, Los Alamitos, CA, USA, IEEE Computer. Soc. US, Nov. 27, 1989, pp. 124-130 XP010017917 ISBN: 0-8186-2007-2.

* cited by examiner

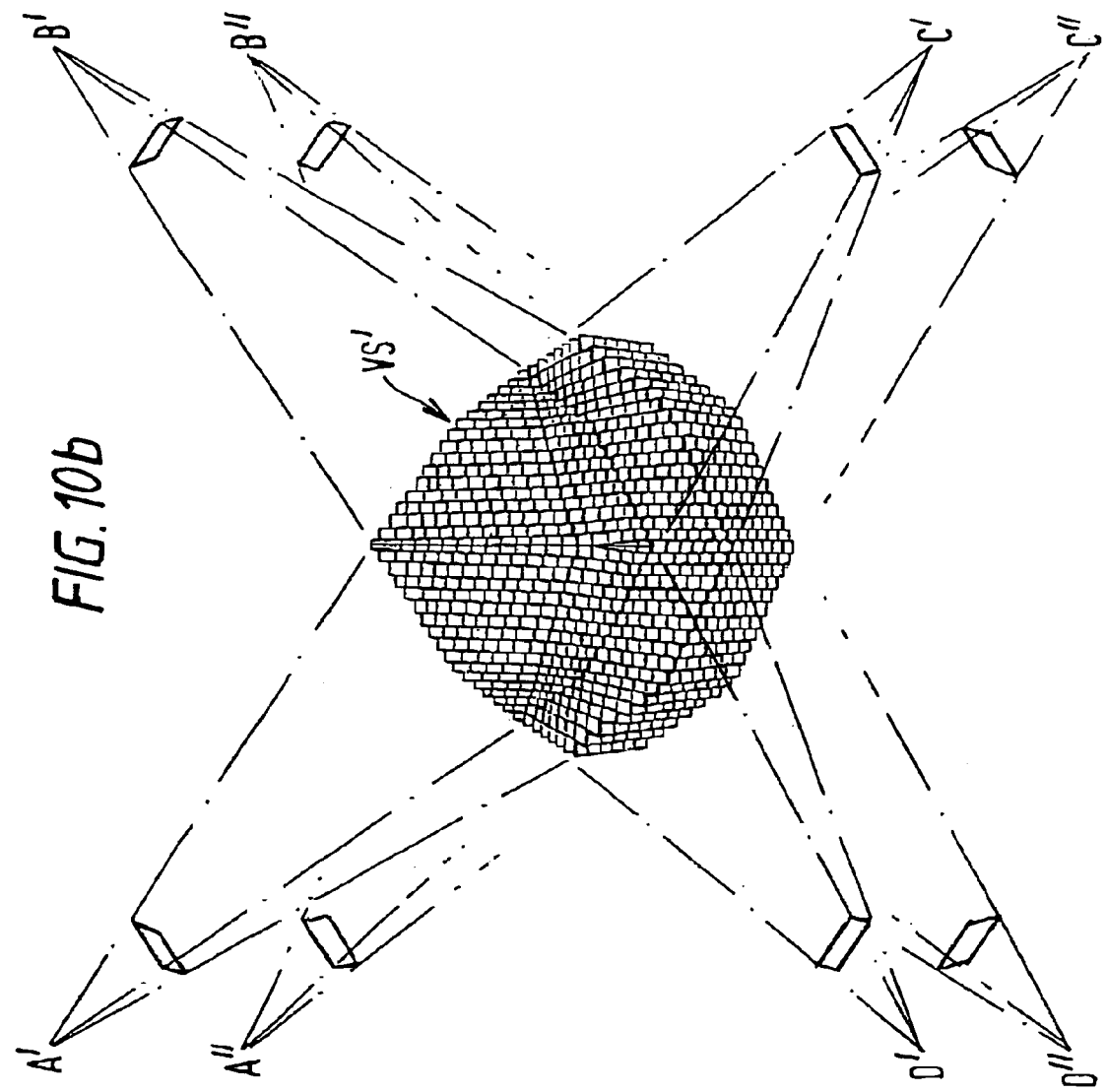

IMAGE PROCESSING APPARATUS

BACKGROUND OF THE INVENTION

FIELD OF THE INVENTION

This invention relates to an image processing apparatus and method, in particular, this invention relates to an image processing apparatus and method for use in the creation of a three-dimensional computer model of a real-life object from two-dimensional image data representing different views of the object to be modelled. Generally, this image data will consist of a set of still images or video frames recorded at different relative orientations or positions of the object and the recording camera.

In order to create the three-dimensional computer model, a three-dimensional object surface is generated from the set of image data and data defining the relative positions or orientations at which each of the images was recorded.

One known way of generating a three-dimensional object surface from the image data is to use a technique known as "voxel carving" which is described in detail in a paper entitled "Rapid Octree Construction from Image Sequences" by Richard Szeliski published in CVGIP: Image Understanding Vol. 58, No. 1, July 1993 at pages 23–32. In this method, a number of images of the object whose three-dimensional surface is to be modelled are produced such that each image shows a silhouette of the object surrounded by a background. The relative orientation between the object and the camera position at which each image was taken together with characteristics of the camera (such as focal length and the size of the image aperture) are used to determine the relative location and orientation of each image relative to a model volume or space which is divided into subsidiary volume elements or voxels to form a voxel space. Each non-occluded voxel is then projected into the images. Voxels that project into background portions of the images are removed from the voxel space. This procedure continues until no background voxels remain. At this stage, the surface voxels of the voxel space should define the outline or silhouette of the object shown in the images.

Although the above-described technique works satisfactorily where there is a well-defined boundary between the object and the background in the image, difficulties can arise where the boundary between the object and the background is ill-defined or difficult to distinguish because, for example, there is insufficient distinction in colour or brightness between the background and object pixels in the images. In practice, the above-described technique works well only when the conditions under which the images are acquired are well-controlled so that there is a clearly distinguishable boundary between the edge of the object and the background in each image.

Another technique for generating a three-dimensional object surface from images that does not rely on being able to separate each image into object and background pixels but rather uses colour consistency between the images is described in the University of Rochester Computer Sciences Technical Report No. 680 of January 1998 entitled "What Do N Photographs Tell Us About 3D Shape?" and a University of Rochester Computer Sciences Technical Report No. 692 of May 1998 entitled "A Theory of Shape by Space Carving", both by Kiriakos N. Kutulakos and Stephen M. Seitz. The technique described in these two papers is known as "space carving" or "voxel colouring". This technique relies on the fact that the viewpoint of each image or photograph is known in a common 3D world reference frame and that scene radiance follows a known, locally computable radiance function, that is so that effects such as shadows, transparencies and inter-reflections can be ignored. In this technique, the three-dimensional model space is again divided into voxels. A non-occluded voxel is then projected into each image in turn. The colour of the patch of pixels to which the voxel projects is determined for each image. If the colours are different or not consistent, then it is determined that that voxel does not form part of the 3D object's surface and that voxel is removed or discarded. Each non-occluded voxel is visited in turn and the process is repeated until the remaining non-occluded voxels are all photo or colour consistent.

The initial voxel space needs to be defined relative to the object. If the initial voxel space is too large, then a large number of computations and a large number of voxels will need to be removed until the final 3D object surface is generated.

One way to ensure that the initial voxel space is not too large is described in the aforementioned University of Rochester Computer Sciences Technical Reports. This method involves first identifying background pixels in each image and then restricting the voxel space to, for each image, a cone defined by the position and/or orientation at which the image was taken of the object and the identified non-background pixels in the image. Thus, in this method the initial voxel space is defined as the intersection of cones each projecting from the effective focal point of a corresponding image through the boundary or silhouette of the object in that image. This technique for defining the initial voxel volume therefore requires that the boundary be identified between the object and the background pixels in each image as described in the aforementioned paper by Richard Szeliski. Where the boundary between the object and the background is well-defined and precise, then this technique should not cause any problems in the generation of the three-dimensional object surface, although it will increase the amount of computation required to arrive at the three-dimensional object surface. However, where the boundary between the object and the background in each image is not well-defined and identifiable, then errors may arise in definition of that boundary so that, for example, the initial voxel space does not include all of the voxels that project into the object in the images. This can cause severe problems in the subsequent generation of the three-dimensional object surface. The reason for this is that, if the boundary erroneously excludes object voxels, then the relative relationship between voxels in the initial voxel space will be incorrect and voxels that should have been occluded by other voxels may not be occluded, and vice versa. Where a voxel that should have been occluded is not occluded, then the subsequent colour or photoconsistency check described above will almost certainly result in that voxel being determined to be photo-inconsistent, so resulting in the erroneous removal of that voxel. This erroneous voxel removal will compound the error discussed above and may itself result in one or more other voxels being erroneously removed and so on. Indeed, this initial error in definition of the voxel space may lead to a catastrophic failure in that so many voxels may be erroneously removed that it is not possible to generate the 3D object's surface.

The above described voxel colouring or space carving technique also relies on the individual pixel patches being formed of pixels of the same or very similar colours. If there is a variation in colour between the pixels of a pixel patch, then the photoconsistency check may not provide accurate results and it is possible that a voxel that actually forms part of the required 3D object surface (an 'object voxel') may be erroneously removed. The erroneous removal of that voxel may have knock-on effects so that further object voxels are erroneously removed. This erroneous removal may, in turn, cause erroneous removal of further voxels. The erroneous removal of a single voxel may, in certain cases, effectively cause a cascade or chain reaction and may cause the voxel colouring process to fail, that is it may be impossible to provide a 3D model of the object surface because too many (possibly even all) of the object voxels may be removed.

In the above described space carving or voxel colouring process, each voxel in turn is projected into each of the images in which it is visible. Because of the computational power and time required, it is generally not possible to carry out this process using more than 20–30 images. Depending upon the nature of the object whose three dimensional surface is to be modelled, this number of images may be insufficient to provide a realistic 3D model of the object surface.

In this known voxel colouring technique, if a voxel that actually forms part of the required 3D object surface is erroneously removed (because, for example, of shadows or highlights affecting the colours in the images), then the removal of that voxel may have knock-on effects so that further object voxels are erroneously removed. This erroneous removal may, in turn, cause erroneous removal of further voxels. The erroneous removal of a single voxel may, in certain cases, effectively cause a cascade or chain reaction and may cause the voxel colouring process to fail, that is it may be impossible to provide a 3D model of the object surface because too many (possibly even all) of the object voxels may be removed.

SUMMARY OF THE INVENTION

It is an aim of the present invention to provide image processing apparatus and a method of operating such image processing apparatus that enable the initial voxel space for a voxel colouring or space carving technique to be defined so as to avoid excessive computation whilst also avoiding or at least reducing the possibility of erroneous voxel removal.

In one aspect, the present invention provides image processing apparatus having processing means operable to define an initial voxel space from which a three-dimensional object surface is to be generated by defining the initial voxel space as the volume bounded by the intersection of a number of cones with each cone having its apex at a respective one of the focal points and having its surface defined by lines extending from the focal point through the boundary of the corresponding camera aperture or imaging area for a respective one of the images from which the three-dimensional object surface is to be generated. This avoids an arbitrary definition of the initial voxel space and enables the initial voxel space to be precisely defined while ensuring that all object voxels (that is voxels that project into the object in the images) are within the initial voxel space so as to avoid or at least reduce the possibility of catastrophic failure mentioned above.

It is an aim of the present invention to provide image processing apparatus and a method of operating such image processing apparatus that avoids or at least mitigates or reduces the possibility of erroneous removal of a voxel.

In one aspect, the present invention provides image processing apparatus having processing means operable to test whether a voxel forms part of a 3D object, the processing means being arranged, where it cannot determine whether a voxel forms part of the 3D object surface, to sub-divide that voxel into subsidiary voxels and to repeat the test for each of the subsidiary voxels. If desired, this sub-division may be continued until each subsidiary voxel projects only into a single pixel in each image. Such apparatus embodying the present invention should enable a more accurate determination of the 3D object surface even where there is significant colour variation within a pixel patch into which a voxel projects.

It is an aim of the present invention to provide image processing apparatus and a method of operating such image processing apparatus that enable the number of images of an object used during a voxel colouring process to be increased so as to enable a more precise 3D object surface to be generated without excessively increasing the amount of computational power and time required for the process.

It is an aim of the present invention to provide image processing apparatus and a method of operating such image processing image apparatus that enable recovery of a voxel colouring process from potential catastrophic failure without necessarily having to completely restart the voxel colouring process.

In one aspect, the present invention provides image processing apparatus having processing means operable to determine, using a first set of image data, the photoconsistency of non-occluded voxels of an initial voxel space to provide a first 3D object surface and then to refine that first 3D object surface by checking the photoconsistency of non-occluded voxels of that first 3D object surface against image data for one or more further images.

In one aspect, the present invention provides image processing apparatus having processing means operable to provide a 3D model of a surface of a 3D object by checking the photoconsistency of non-occluded voxels of an initial voxel space for a first set of image data, storing the results of that check as a first 3D object surface and then refining the first 3D object surface by checking the photoconsistency of non-occluded voxels using one or more further images of the object and one or more of the images used to produce the first 3D object surface.

In either of the above described aspects, the processing means may be operable to repeat the refinement one or more further times adding one or more further images each time.

In one aspect, the present invention provides image processing apparatus having processing means operable to provide a model of a 3D object surface by checking the photoconsistency of voxels of a voxel space using images of the object, and then to repeat that process using further images so as to further refine the 3D object surface model until a final 3D object surface model is produced, whereby the processing means is operable to use at least one additional image in each photoconsistency check and to store the 3D object surface generated by at least one of the previous photoconsistency checks before carrying out the next photoconsistency check so that, if the next photoconsistency check results in the erroneous removal of one or more object voxels, the processing means can return to the results of the stored previous photoconsistency check.

In one aspect, the present invention provides image processing apparatus having processing means operable to provide a model of a 3D object surface by checking the photoconsistency of voxels of a voxel space using images of the object, and then to repeat that process using further images so as to further refine the 3D object surface model until a final 3D object surface model is produced, the processing means also being operable to store the image data for one or more of the images previously used for a photoconsistency check and to discard the oldest of the stored images and replace it with the newest used image each time the photoconsistency check is repeated so that the processing means is operable to store a running set of images thereby enabling a photoconsistency check to be carried out using the stored images together with a newly added image so that the processing means has available the raw image data for each of the stored images and not simply the 3D object surface that resulted from the previous photoconsistency check. This should enable, for example, restoration of inadvertently removed voxels when the addition of new image data causes the processing means to conclude that a voxel is in fact an object voxel when a previous photoconsistency check determined that that voxel was inconsistent.

BRIEF DESCRIPTION OF THE DRAWINGS

Embodiments of the present invention will now be described, by way of example only, with reference to the accompanying drawings, in which:

FIGS. 10a and 10b show diagrammatic perspective views to illustrate division of two different initial voxel spaces into voxels;

FIG. 15 shows a flowchart for illustrating one way of carrying out the further processing step shown in FIG. 14a;

FIG. 17 shows a flowchart for illustrating another way of carrying out the additional processing step shown in FIG. 12a;

DETAILED DESCRIPTION OF THE PREFERRED EMBODIMENTS

Figure 1:
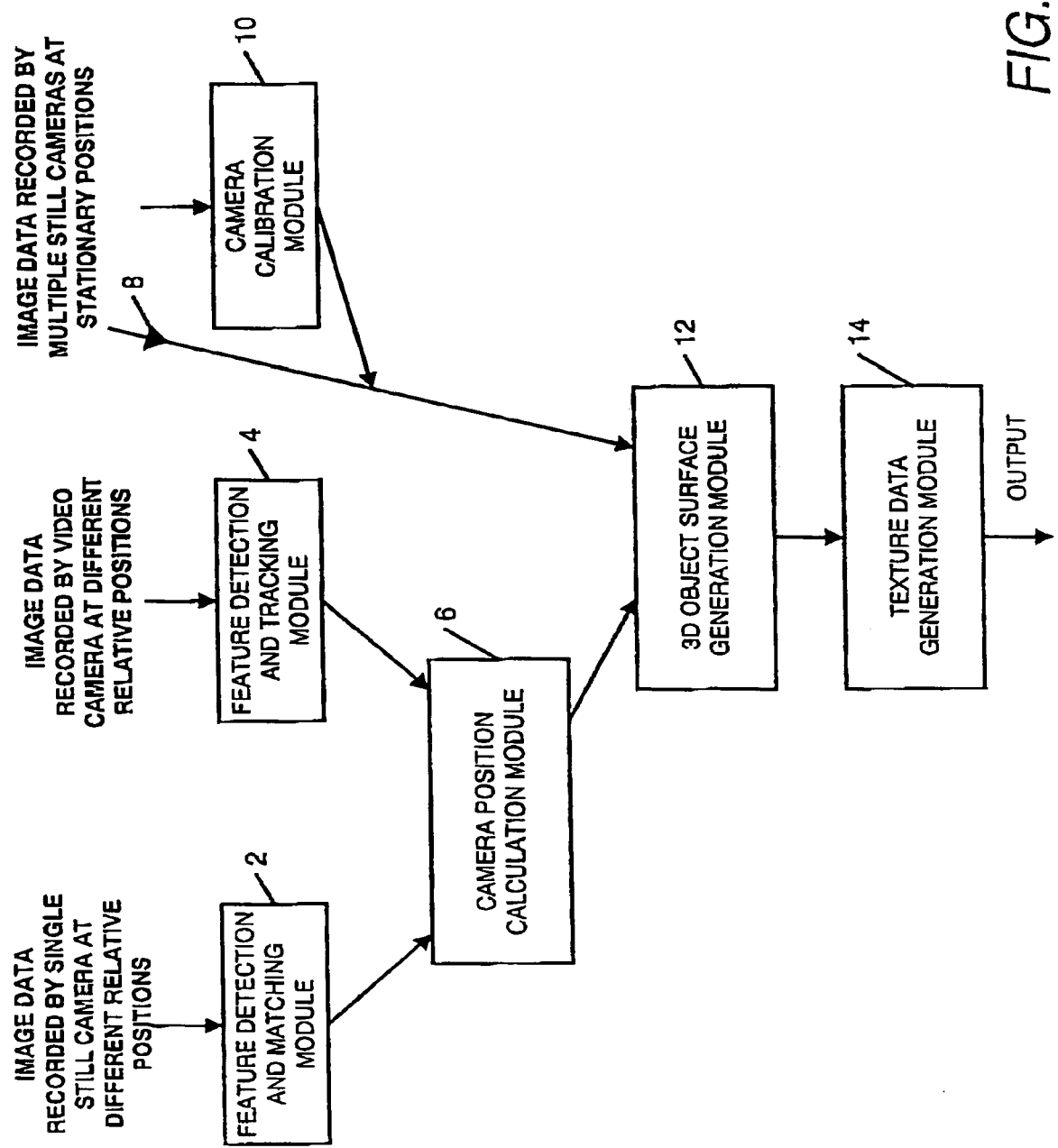
FIG. 1 shows schematically the components of a modular system in which the present invention may be embodied.

FIG. 1 schematically shows the components of a modular system in which the present invention may be embodied.

These components can be effected as processor-implemented instructions, hardware or a combination thereof.

Referring to FIG. 1, the components are arranged to process data defining images (still or moving) of one or more objects in order to generate data defining a three-dimensional computer model of the object(s).

The input image data may be received in a variety of ways, such as directly from one or more digital cameras, via a storage device such as a disk or CD ROM, by digitisation of photographs using a scanner, or by downloading image data from a database, for example via a datalink such as the Internet, etc.

The generated 3D model data may be used to: display an image of the object(s) from a desired viewing position; control manufacturing equipment to manufacture a model of the object(s), for example by controlling cutting apparatus to cut material to the appropriate dimensions; perform processing to recognise the object(s), for example by comparing it to data stored in a database; carry out processing to measure the object(s), for example by taking absolute measurements to record the size of the object(s), or by comparing the model with models of the object(s) previously generated to determine changes therebetween; carry out processing so as to control a robot to navigate around the object(s); store information in a geographic information system (GIS) or other topographic database; or transmit the object data representing the model to a remote processing device for any such processing, either on a storage device or as a signal (for example, the data may be transmitted in virtual reality modelling language (VRML) format over the Internet, enabling it to be processed by a WWW browser); etc.

The feature detection and matching module 2 is arranged to receive image data recorded by a still camera from different positions relative to the object(s) (the different positions being achieved by moving the camera and/or the object(s)). The received data is then processed in order to match features within the different images (that is, to identify points in the images which correspond to the same physical point on the object(s)).

The feature detection and tracking module 4 is arranged to receive image data recorded by a video camera as the relative positions of the camera and object(s) are changed (by moving the video camera and/or the object(s)). As in the feature detection and matching module 2, the feature detection and tracking module 4 detects features, such as corners, in the images. However, the feature detection and tracking module 4 then tracks the detected features between frames of image data in order to determine the positions of the features in other images.

The camera position calculation module 6 is arranged to use the features matched across images by the feature detection and matching module 2 or the feature detection and tracking module 4 to calculate the transformation between the camera positions at which the images were recorded and hence determine the orientation and position of the camera focal plane when each image was recorded.

The feature detection and matching module 2 and the camera position calculation module 6 may be arranged to perform processing in an iterative manner. That is, using camera positions and orientations calculated by the camera position calculation module 6, the feature detection and matching module 2 may detect and match further features in the images using epipolar geometry in a conventional manner, and the further matched features may then be used by the camera position calculation module 6 to recalculate the camera positions and orientations.

If the positions at which the images were recorded are already known, then, as indicated by arrow 8 in FIG. 1, the image data need not be processed by the feature detection and matching module 2, the feature detection and tracking module 4, or the camera position calculation module 6. For example, the images may be recorded by mounting a number of cameras on a calibrated rig arranged to hold the cameras in known positions relative to the object(s).

Alternatively, it is possible to determine the positions of a plurality of cameras relative to the object(s) by adding calibration markers to the object(s) and calculating the positions of the cameras from the positions of the calibration markers in images recorded by the cameras. The calibration markers may comprise patterns of light projected onto the object(s). Camera calibration module 10 is therefore provided to receive image data from a plurality of cameras at fixed positions showing the object(s) together with calibration markers, and to process the data to determine the positions of the cameras. A preferred method of calculating the positions of the cameras (and also internal parameters of each camera, such as the focal length etc) is described in a paper entitled "Calibrating and 3D Modelling with a Multi-Camera System" by Wiles and Davison published in 1999 IEEE Workshop on Multi-View Modelling Analysis of Visual Scenes, ISBN 0769501109.

The 3D object surface generation module 12 is arranged to receive image data showing the object(s) and data defining the positions at which the images were recorded, and to process the data to generated 3D computer model representing the actual surface(s) of the object(s), such as a polygon mesh model.

The texture data generation module 14 is arranged to generate texture data for rendering onto the surface model produced by the 3D object surface generation module 12. The texture data is generated from the input image data showing the object(s).

Techniques that can be used to perform the processing in the modules shown in FIG. 1 are described in EP-A-0898245, EP-A-0901105, pending U.S. applications Ser. Nos. 09/129,077, 09/129,079 and 09/129,080, the full contents of which are incorporated herein by cross-reference, and also the attached Annex.

The present invention may be embodied in particular as part of the 3D object surface generation module 12.

Figure 2:
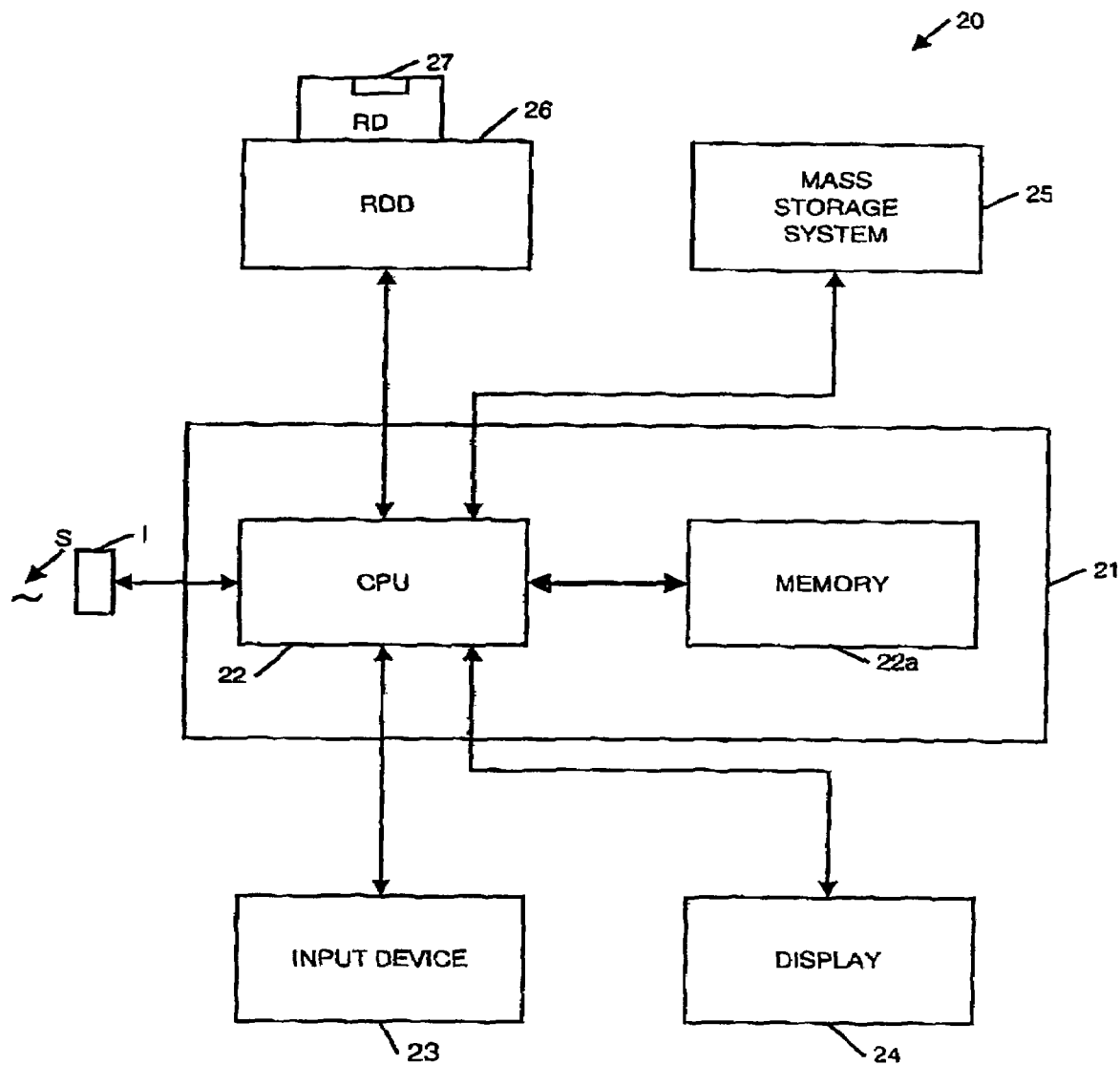
FIG. 2 shows a block diagram of processing apparatus for putting into effect one or more of the modules shown in FIG. 1.

FIG. 2 shows a block diagram of processing apparatus 20.

The processing apparatus 20 comprises a main processing unit 21 having a central processing unit (CPU) 22 with associated memory (ROM and/or RAM) 22*a*. The CPU 22 is coupled to an input device 23 (which may consist, in known manner, of a keyboard and a pointing device such as a mouse), a display 24, a mass-storage system 25 such as a hard disc drive, and a removable disc drive (RDD) 26 for receiving a removable disc (RD) 27. The removable disc drive 26 may be arranged to receive removable disc 27 such as a floppy disc, a CD ROM or a writable CD ROM. The CPU 22 may also be coupled to an interface I for receiving signals S carrying processor implementable instructions and/or data. The interface may comprise, for example, a connection to a network such as the Internet, an intranet, a LAN (local area network) or a WAN (wide area network) or may comprise a data link to another processing apparatus, for example an infrared link.

The processing apparatus 20 is configured to form the 3D object surface generation module 12 shown in FIG. 1 by means of processor implementable instructions and/or data stored in the memory 22*a*. Processor implementable instructions and/or data stored in the memory may also configure the apparatus to form any one or more of the other modules shown in FIG. 1. These processor implementable instructions and/or data may be prestored in the memory 22*a* or may be supplied to the main processing unit 21 as a signal S via the interface I or on a removable disc 27 or may be supplied to the main processing unit 21 by any combination of these techniques.

3D object surface data resulting from use of the processing apparatus 20 in a manner to be described below may be stored in the mass-storage system 25 and may also be displayed on the display 24. The 3D object surface data may also be downloaded to a removable disc 27 or supplied as a signal S via the interface I. The 3D object surface data may be subsequently processed by the processing apparatus 20 when configured to operate as the texture data generation module 14 shown in FIG. 1. Such further processing may, however, be carried out by another processing apparatus which receives the 3D object surface data via, for example, a removable disc 27 or as a signal S from the processing apparatus 20 shown in FIG. 2.

Operation of the processing apparatus 20 shown in FIG. 2 to generate a three-dimensional object surface will now be described.

The data necessary to enable generation of the 3D object surface will have been obtained as described above with reference to FIG. 1 and will already be stored in the mass-storage system 25 for access by the CPU 22. This data includes image data for each of the images of the object to be used to generate the 3D object surface.

Each of the images is stored in the mass-storage system 25 as an array of pixel values with each pixel of each image being allocated a number identifying the colour of that pixel. Typically, for grey shades the number will be between 0 and 255 giving a possibility of 256 grey shades while for full colour the number will be between 0 and 255 for each primary colour (generally red, green and blue).

The image data is accompanied by camera data representing the relative position and orientation with respect to the object of the camera positions at which the image was obtained and internal parameters of the camera or cameras such as the focal length and the dimensions of the imaging area or viewing window of the camera(s). This camera data may be obtained in the manner described above with reference to modules 2 and 6 in FIG. 1 or modules 4 and 6 in FIG. 1, or module 10 in FIG. 1 or, as indicated by the arrow 8 in FIG. 1, the position and relative orientation data may be obtained directly from known camera positions. The camera internal parameters may be prestored in the apparatus, input by the user using the input device 23 or determined as described in the aforementioned paper by Wiles and Davison (ISBN 0769501109).

Figure 3:
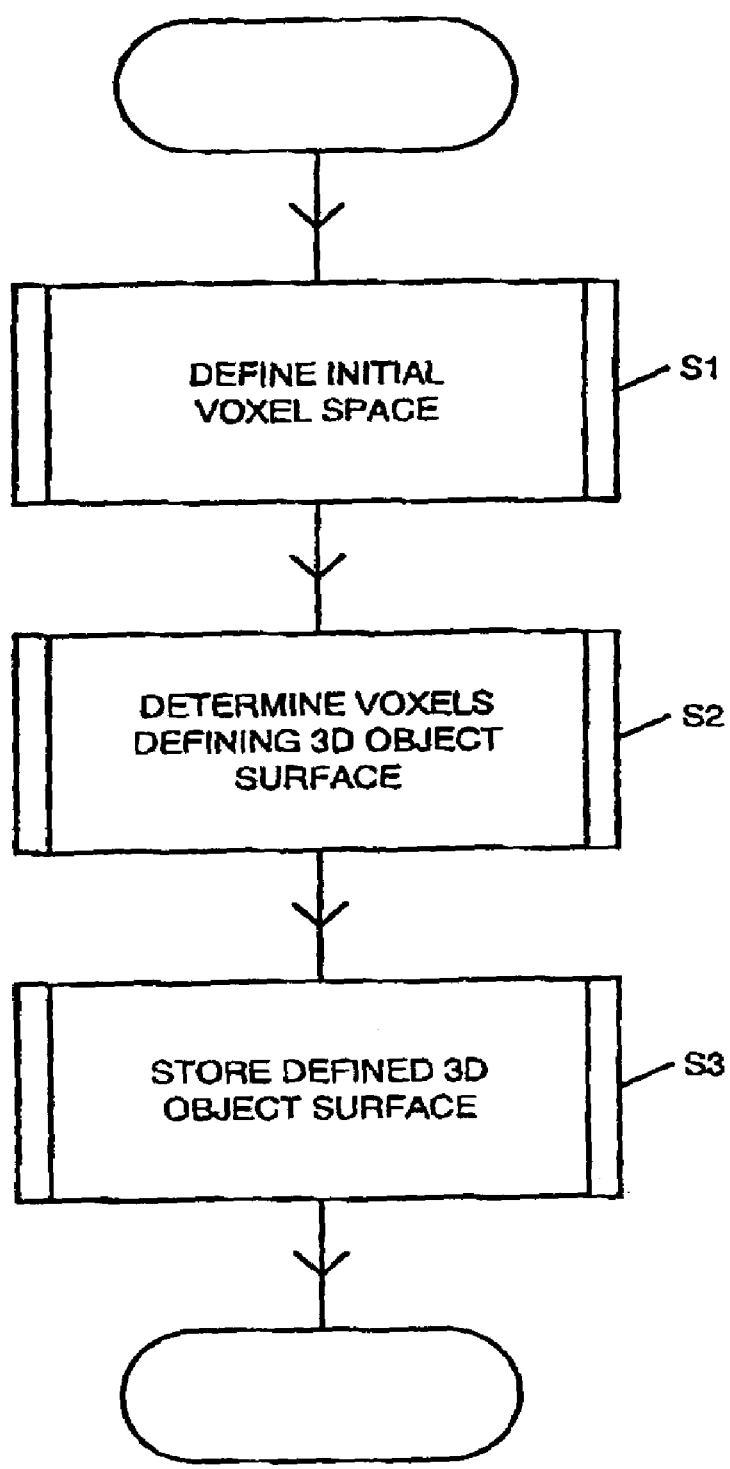
FIG. 3 shows a top level flowchart for illustrating generation of a three-dimensional object surface using the processing apparatus shown in FIG. 2.

FIG. 3 shows a top level flowchart for illustrating generation of the 3D object surface from this data. At step S1, an initial voxel space containing the required 3D object surface is defined by the CPU 22.

Once the initial voxel space has been defined, then the photoconsistency of each non-occluded voxel is checked in turn to determine the voxels defining the 3D object surface at step S2. The defined 3D object surface is then stored at step S3.

Step S1 of FIG. 3 will now be described in more detail with reference to the flowchart shown in FIG. 4. At step S11, the CPU 22 accesses the camera internal parameters and position data stored in the mass-storage system 25 (FIG. 2). At step S12, the CPU 22 determines, using the camera internal parameters and positions, the viewing cone for each camera position.

At step S13 the CPU 22 determines the volume bounded by the intersection of the viewing cones of the camera positions, at step S14 the CPU 22 sets the bounded volume as the initial voxel volume and at step S15 the CPU 22 sub-divides the initial voxel space into cubic or right-parallelopipedal voxels arranged in a cubic, close-packed array so as to form the initial voxel space.

Figure 4:
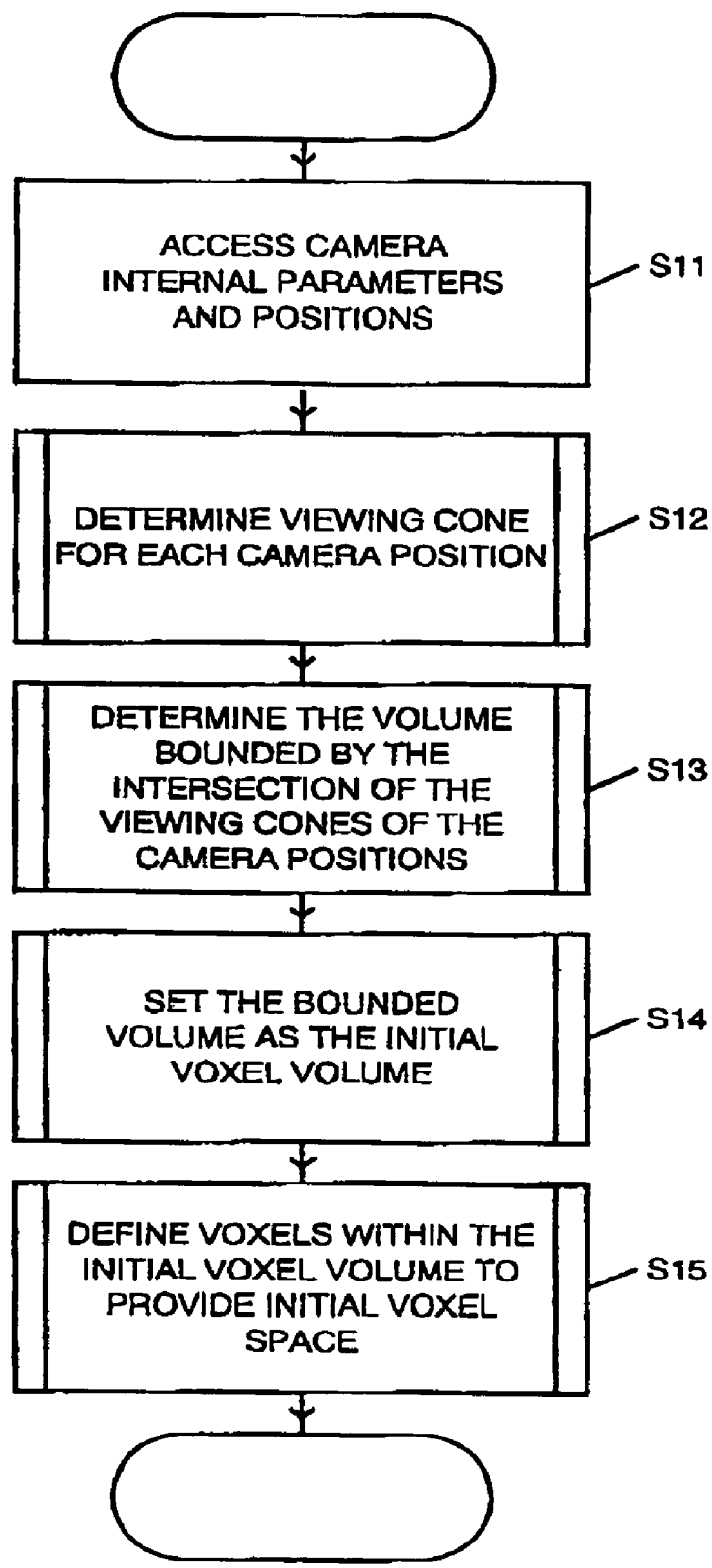
FIG. 4 shows a flowchart for illustrating the step shown in FIG. 3 of defining an initial voxel space.
Figure 5:
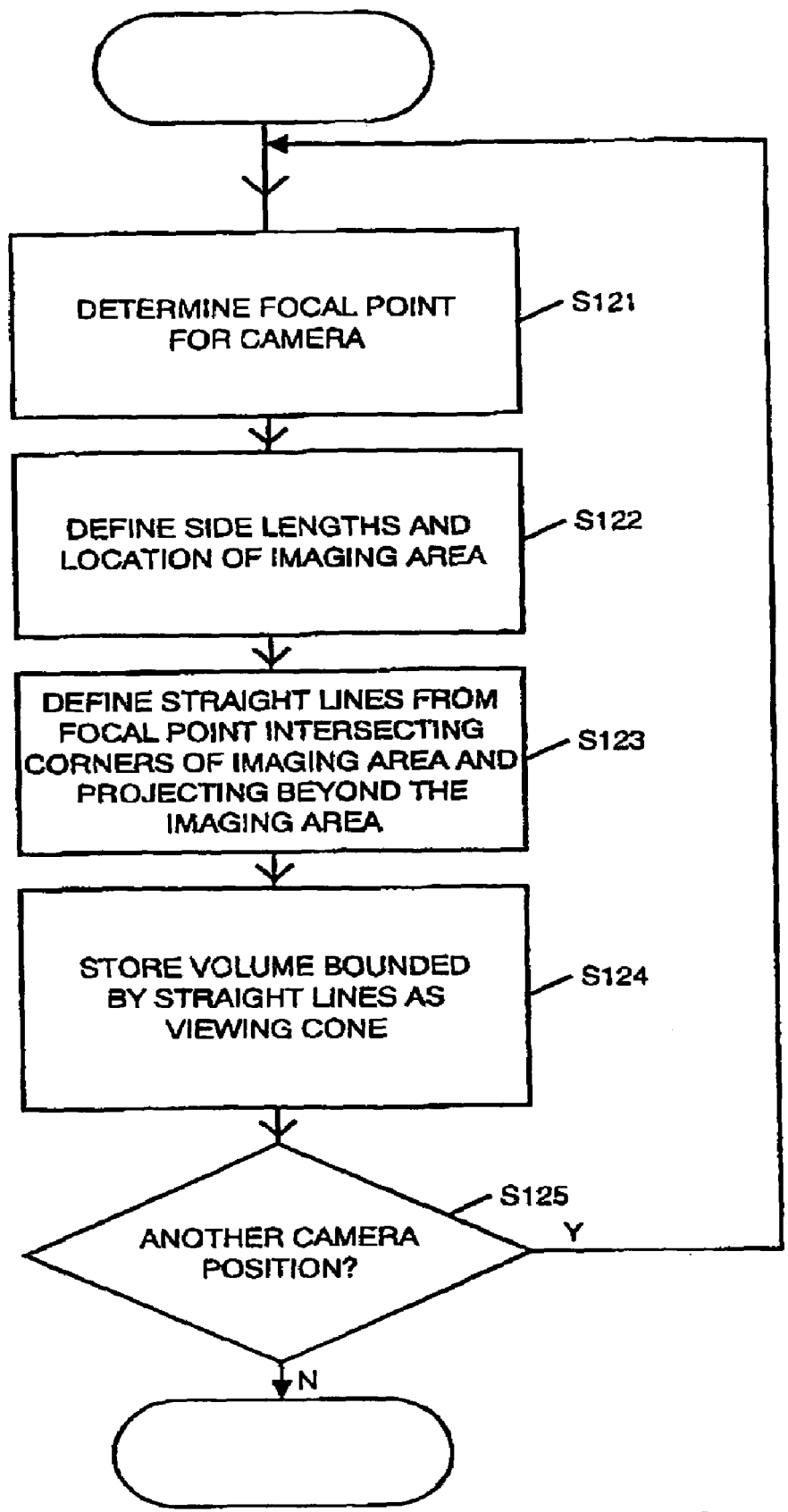
FIG. 5 shows a flowchart illustrating in greater detail the step of determining the viewing cones for each camera position shown in FIG. 4.

FIG. 5 shows a flowchart illustrating in greater detail step S112 of FIG. 4. At step S121, the CPU 22 determines from the data stored in the mass-storage system 25, the focal point of the camera for the camera position for a first one of the stored images. At step S122, the CPU 22 determines from the camera data stored in the mass-storage system the side lengths and location in three dimensional space of the imaging area relative to the focal point. At step S123, the CPU defines rectilinear straight lines projecting from the determined focal point and each passing through and projecting beyond a respective different one of the corners of the imaging area. At step S124, the CPU stores the volume bounded by the straight lines as the viewing cone by storing the relative orientations of the straight lines. At step S125, the CPU 22 determines whether the viewing cone for another camera position needs to be determined. If the answer is yes, then the CPU 22 repeats steps S121 to S125 until the answer at step S125 is no when the CPU 22 proceeds to step S13 in FIG. 4.

Figure 6:
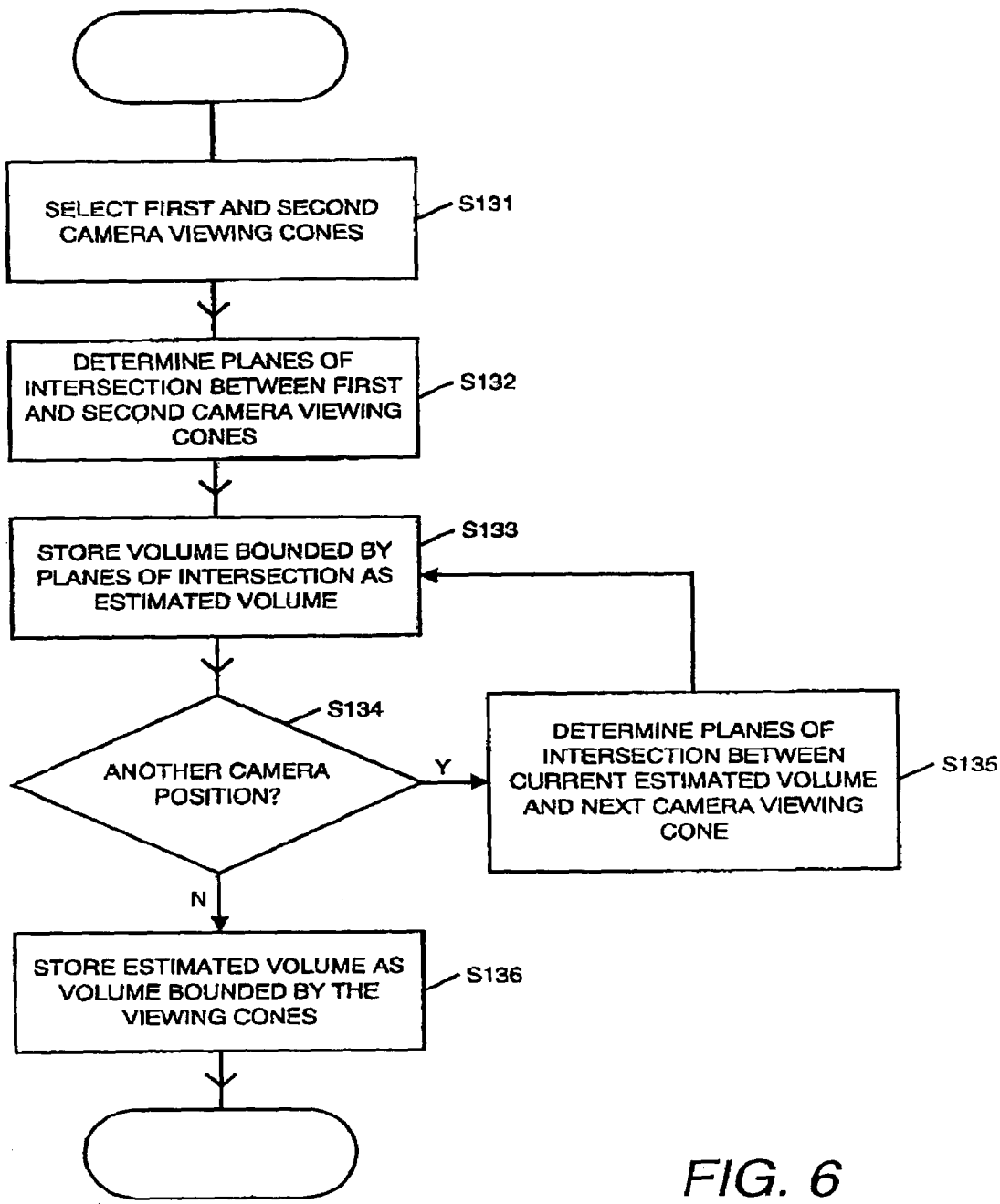
FIG. 6 shows a flowchart illustrating in greater detail the step of determining the viewing cone for each camera position shown in FIG. 4.

FIG. 6 shows a flowchart illustrating in greater detail step S13 shown in FIG. 4. At step S131, the CPU 22 selects the stored data representing the viewing cones of first and second ones of the camera positions. At step S132, the CPU 22 determines the planes of intersection between the first and second camera viewing cones using the stored data representing the straight lines defining the viewing cones. At step S133, the CPU 22 stores the volume bounded by the planes of intersection of the viewing cones as an estimated volume. At step S134, the CPU checks to see whether there is another camera position whose viewing cone intersection has not yet been determined. If the answer at step S134 is yes, then the CPU determines at step S135 the planes of intersection between the current estimated volume and the next camera position viewing cone and then stores the volume bounded by those planes of intersection as the new estimated volume at step S133. Steps S134, S135 and S133 are repeated until the answer at step S134 is no at which point the CPU stores the estimated volume as the volume bounded by the camera viewing cones at step S136 and returns to step S14 in FIG. 4 at which the bounded volume is set as the initial voxel volume.

Figure 7:
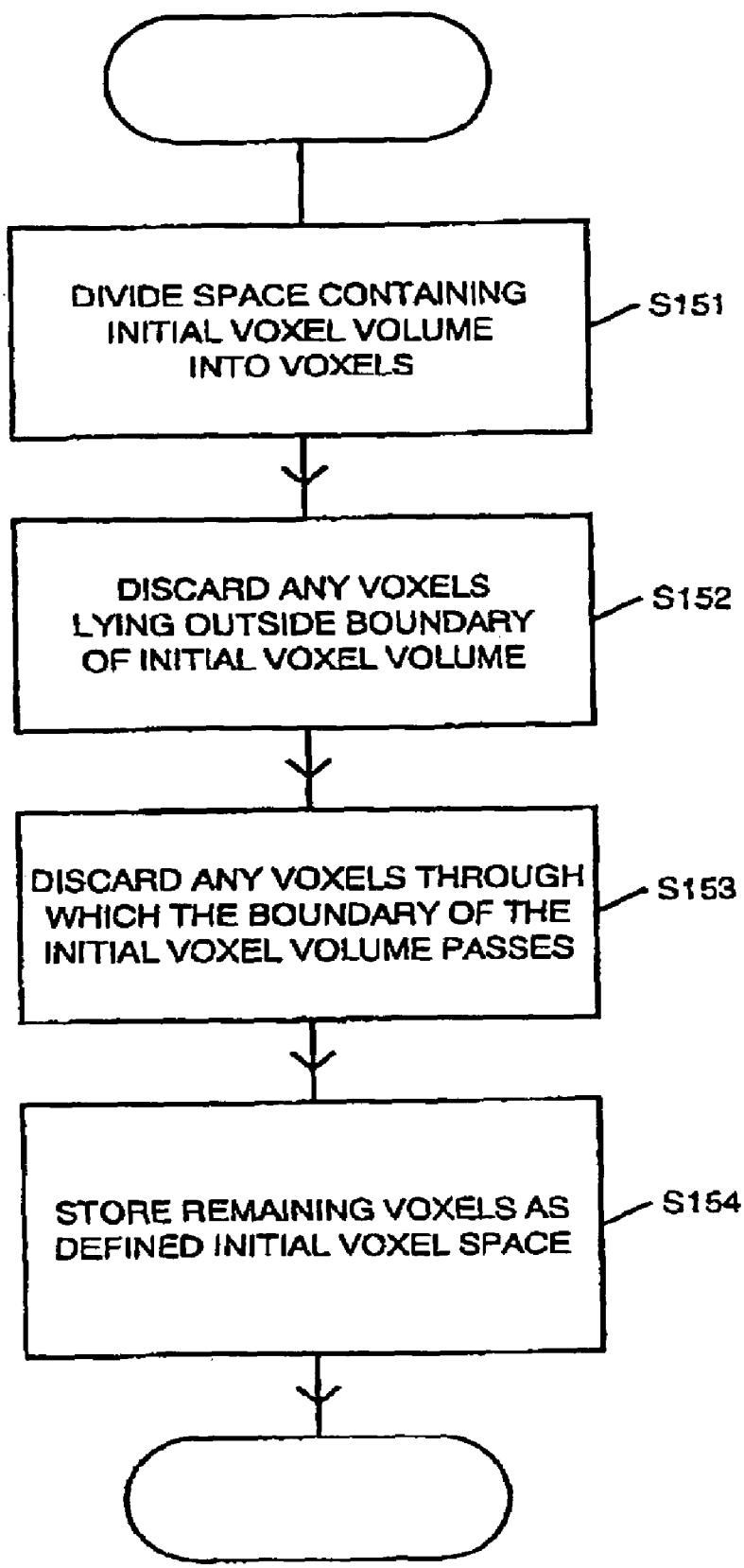
FIG. 7 shows in greater detail the step shown in FIG. 4 of defining voxels within the initial voxel space.

FIG. 7 shows a flowchart illustrating in greater detail step S15 of FIG. 4. At step S151, the CPU 22 divides a volume or space containing the initial voxel space into cubic or right-parallelopipedal voxels arranged in a close-packed array. The CPU 22 then discards at step S152 any voxels lying outside the boundary of the determined initial voxel volume. At step S153, the CPU 22 discards any voxels through which the boundary of the initial voxel volume passes and at step S154 stores the remaining voxels as the initial voxel space.

Figure 8:
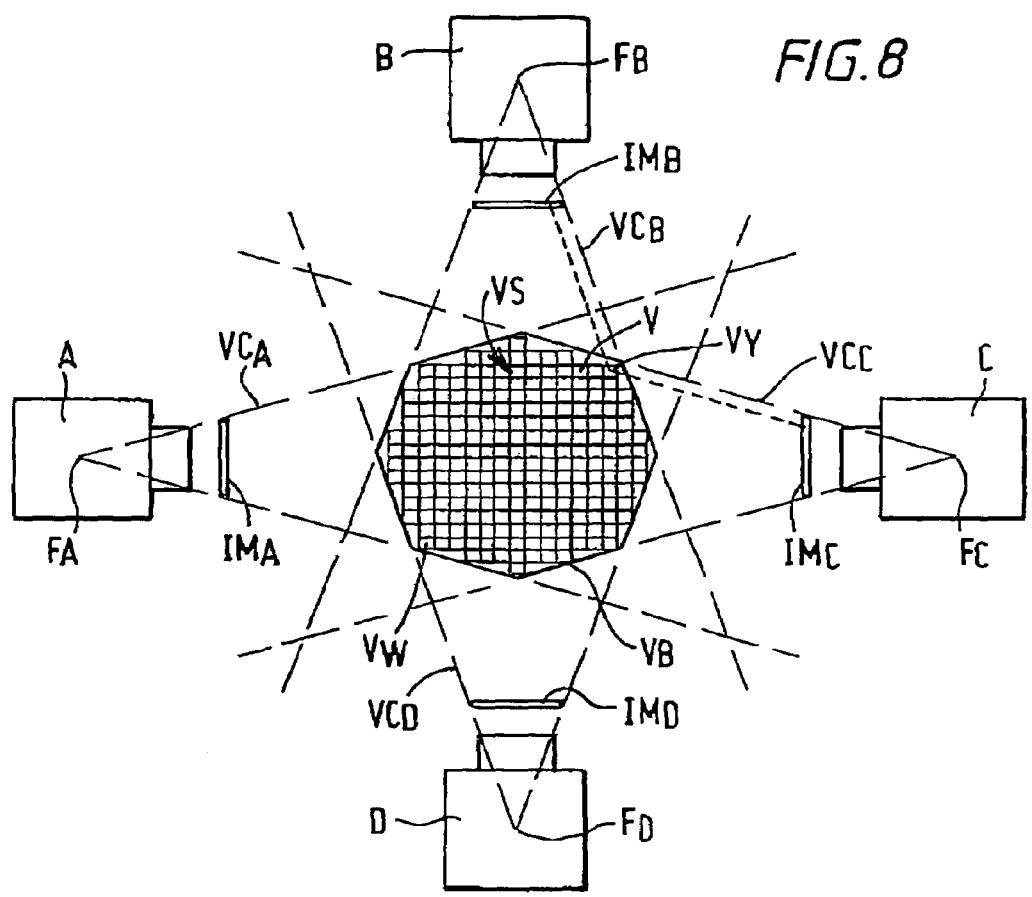
FIGS. 8 and 9 are schematic representations for illustrating a camera arrangement and the associated initial voxel space with FIG. 9 being a side elevational view (with the front camera omitted in the interests of clarity) and FIG. 8 showing a cross-sectional view taken along the lines VIII—VIII in FIG. 9.
Figure 9:
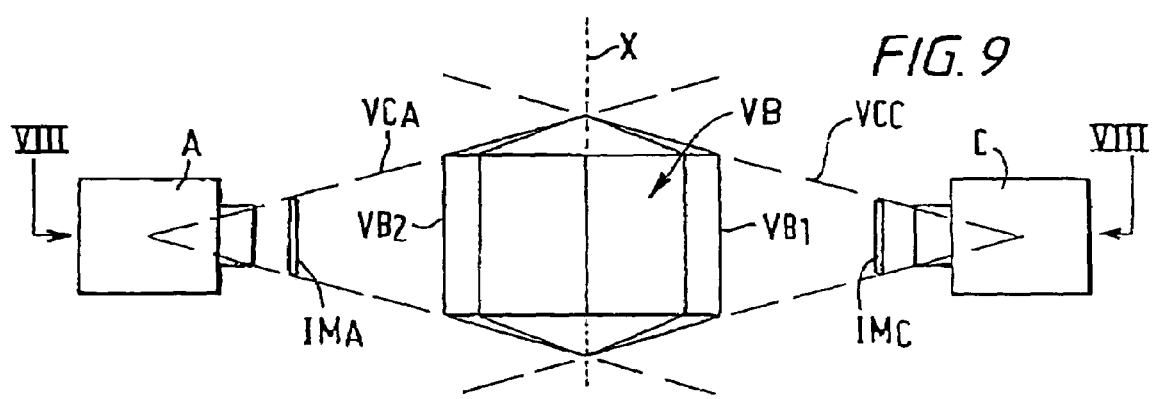

FIGS. 8 and 9 show one example of a camera position arrangement to illustrate an example of an initial voxel space derived in the manner described above.

In the example shown in FIGS. 8 and 9, the camera position arrangement consists of four camera positions A to D arranged in a single plane (the plane of the paper of FIG. 8 in this example) and spaced apart by an angle of 90° relative to one another about a central axis X indicated by the dotted line in FIG. 9.

Each of the camera positions has a focal point FA to FD (in this example the focal lengths are all the same although this need not necessarily be the case) and an imaging area $I_A$ to $I_D$ (see FIG. 10) defined by the camera aperture in the case of a camera using photographic film or by the CCD sensing area in the case of a CCD camera. Again, in this example, the imaging areas I of all four cameras are the same.

FIGS. 8 to 10 show by way of the dashed lines the viewing cones $VC_A$, $VC_B$, $VC_C$ and $VC_D$ of each of the camera positions A to D. FIGS. 8 and 9 also show the relative locations of the images $IM_A$, $IM_B$, $IM_C$ and $IM_D$ produced at the camera positions A to D.

The volume bounded by the intersection of the viewing cones of the camera positions A to D is identified by the reference sign VB in FIGS. 8 and 9.

As illustrated schematically in FIG. 8, the voxel space VS defined by the CPU 22 in the manner described above with reference to FIGS. 3 to 7 lies wholly within the volume VB and consists of a close-packed cubic array of cubic (or right parallelopipedal) voxels V each of which lies wholly within the bounding volume VB.

Figure 10A:
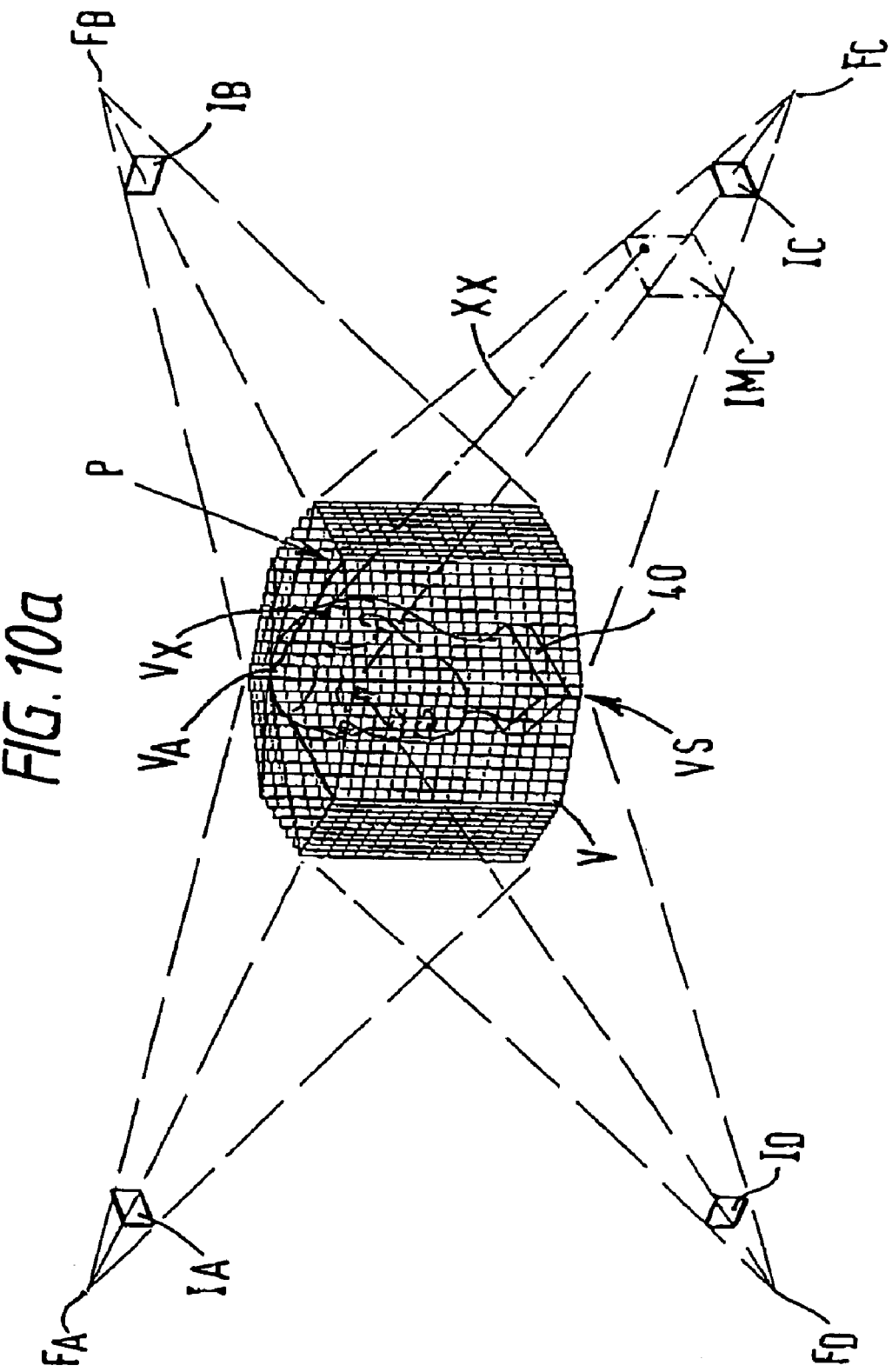
Figure 11:
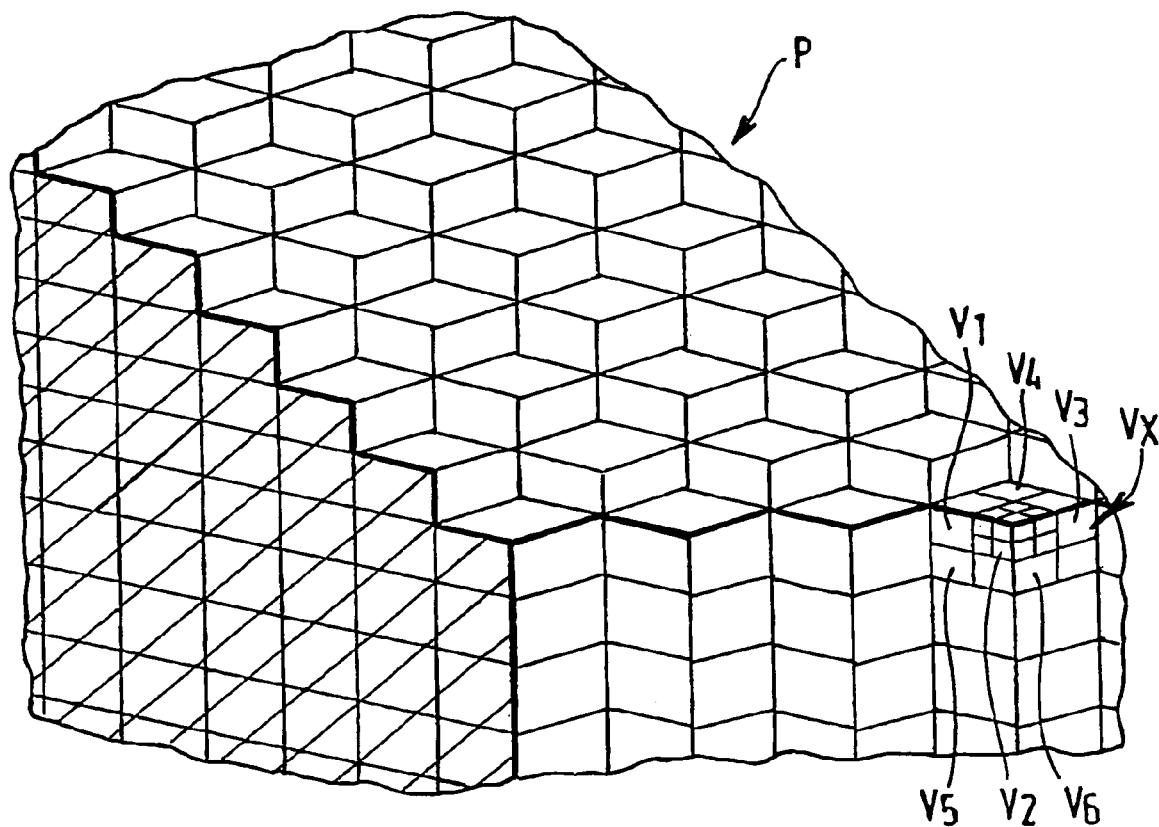
FIG. 11 shows a part-sectional perspective view of part of the voxel space shown in FIG. 10a so as to illustrate more clearly the division of the voxel space into voxels.

FIG. 10a shows a perspective view for the camera arrangement shown in FIGS. 8 and 9 to illustrate the overall appearance of the voxel space VS in relation to the 3D surface 40 to be generated, in this case a bust of a man. It will, of course, be appreciated that FIG. 10a necessarily shows the voxels V very schematically and, because of the very small size of the voxels V, is not accurate. FIG. 11 shows a part-sectional perspective view of part P of the voxel space VS shown in FIG. 10a to illustrate more clearly how the boundary of the voxel space VS is made up of a step-like arrangement of voxels V.

It will, of course, be appreciated that the shape of the bound volume VB defined by the intersection of the camera viewing cones will depend upon the relative orientations and numbers of the cameras and also upon the individual viewing cones which will in turn depend upon the focal points or positions of the cameras and the size and shapes of their imaging areas. To illustrate this, FIG. 10b shows very schematically the initial voxel space VS' where the camera arrangement comprises four cameras A' to D' arranged above and looking down on the object and four cameras A" to D"

arranged below and looking up at the object with, as in the example described above, the cameras being spaced at 90° intervals around the object. The periphery of the voxel space VS itself is, of course, determined by the boundary of the volume VB and the size of the voxels relative to the size of the bound volume VB. The size of the voxels, and thus the resolution to which the 3D object surface can be generated will depend upon the available computational capacity of the CPU 22 and the time available for the computation of the 3D object surface. Typically, the voxel space VS may consist of 100,000 voxels or up to several millions of voxels.

The method described above of defining the initial voxel volume by the intersection of the viewing cones of the camera positions avoids the disadvantages discussed above of defining the initial voxel volume using the silhouette or boundary of the object whose surface is to be generated and should also reduce the number of computations required to achieve the final 3D object surface in contrast to arrangements where the initial voxel space is defined arbitrarily so as to be sufficiently large to enclose the 3D object whose surface is to be generated.

A method of generating the 3D object surface starting from the initial voxel space VS will now be described with reference to FIGS. 10a, 12, 14a to d, 13 and 15.

Figure 12:
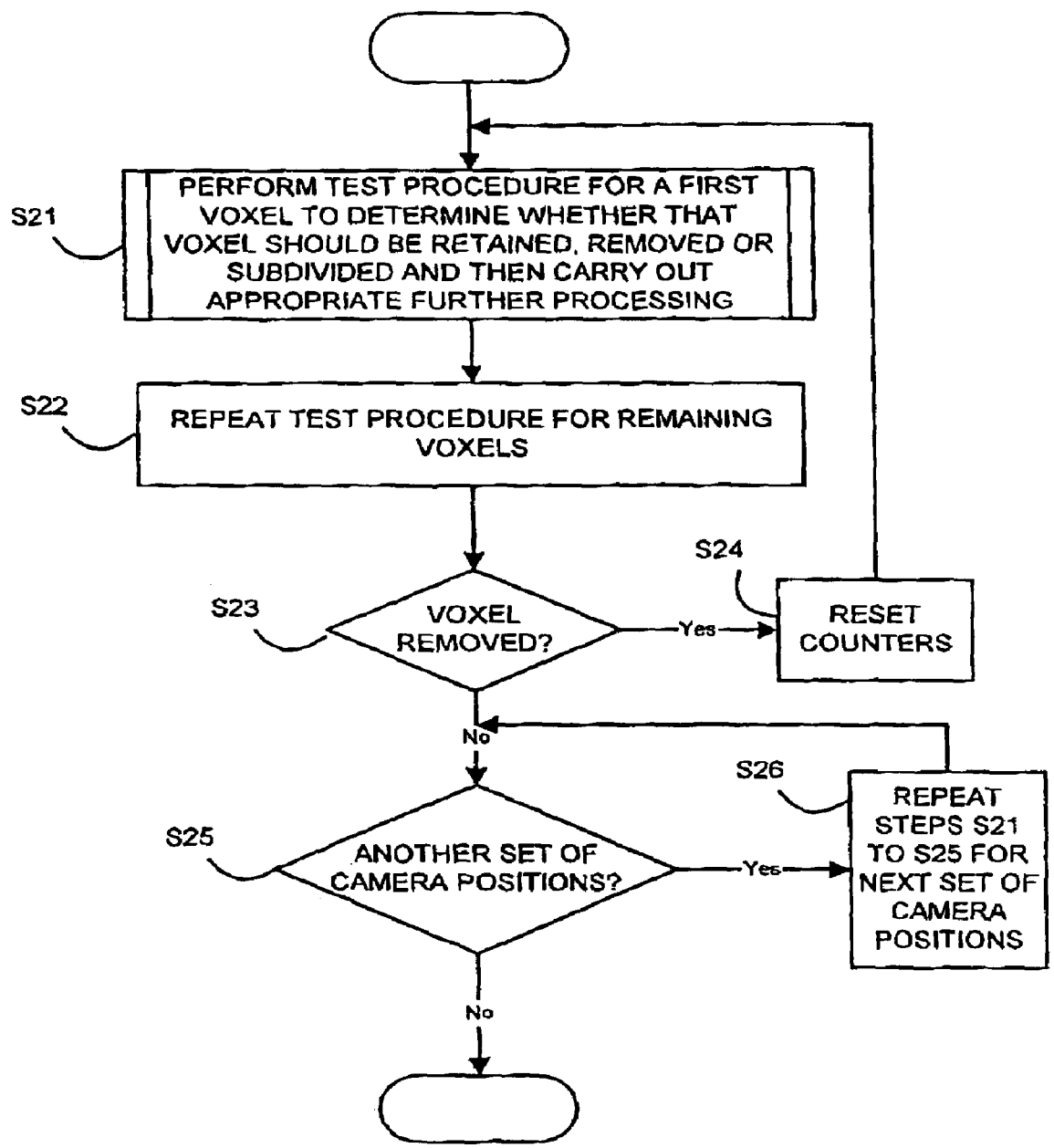
FIG. 12 shows a flowchart for illustrating in greater detail a method of carrying out the step shown in FIG. 3 of determining the voxels defining the three-dimensional object surface.

FIG. 12 shows a top level flow chart for this method. At step S21, the CPU 22 performs a test procedure for a first one of the surface voxels n of the initial voxel space VS to determine whether it should be removed, retained or sub-divided and then performs further processing in accordance with that determination so that the voxel is removed, retained or sub-divided and the sub-voxels subjected to further processing as will be described below.

At step S22, the CPU 22 repeats the test procedure of step S21 for the remaining surface voxels until each of the surface voxels of the initial voxel space has been processed in accordance with step S21.

The CPU 22 then determines at step S23 whether any voxel or sub-voxel has been removed and, if the answer is yes, resets its counters at step S24 so as to enable steps S21 and S22 to be repeated for the remaining voxels. Steps S21 and S22 are repeated until the answer at step S23 is no. The reason for repeating the voxel sweep effected by steps S21 and S22 when voxels have been removed is that the removal of a voxel or sub-voxel may cause voxels that were previously completely occluded by other voxels or sub-voxels to become non-occluded or partially non-occluded at least for some images and may also cause voxels or sub-voxels that were previously hidden by other voxels or sub-voxels from certain of the images to be projectable into those images. Thus, the removal of a voxel or sub-voxel may effect the photo-consistency of the remaining voxels and sub-voxels.

This technique means that each surface voxel is checked against each image in each voxel sweep. The images in which a voxel is visible will, however, be at least partly determined by the geometric arrangement of the camera positions at which the images were recorded. It thus should be possible to determine from these camera positions that certain surface voxels will not be visible or will not be visible in sufficient images to enable their photoconsistency to be checked. Where this can be determined, then the voxel colouring process may be repeated for another set of camera positions, if available, to enable the photoconsistency of those surface voxels to be checked. Thus, at step S25, the CPU 22 will determine whether there is another set of camera positions that should be considered. When the answer at step S25 is yes, then the CPU 22 will repeat at step S26 steps S21 to 25 for the next set of camera positions until all sets of camera positions have been considered.

Figure 14A:
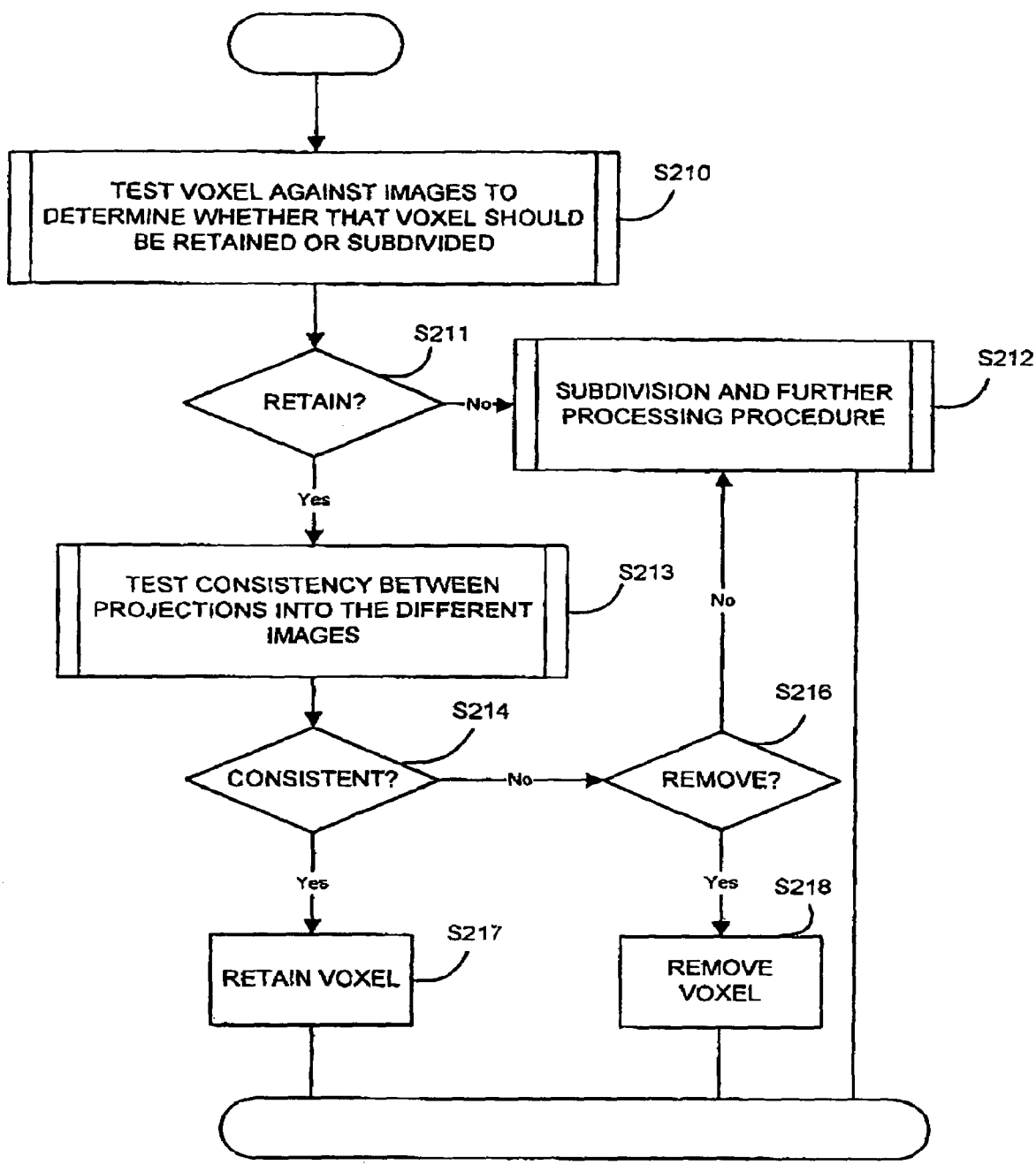
FIGS. 14a to 14d show flowcharts illustrating in greater detail steps carried out in a method of carrying out step S21 of FIG. 12.

FIG. 14a shows in greater detail the test procedure for a voxel carried out at step S21 in FIG. 12.

At step S210 in FIG. 14a, the CPU 22 tests the voxel against each of the images in turn to determine whether the voxel should be retained or sub-divided. The CPU 22 then checks at step S211 whether the result of the test at step S210 was that the voxel should be retained. If the answer is no, then at step S212 the CPU subjects the voxel to sub-division and further processing as will be described in detail below.

If the answer at step S211 is yes, then the CPU 22 tests, at step S213, the consistency between projections of the same voxel into the different images and then checks at step S214 whether the result of the tests was that the images were consistent. When the answer at step S214 is yes, then the CPU 22 retains the voxel at step S217.

If the answer at step S214 is no, then the CPU 22 checks at step S216 whether the result of the test at step S213 was that the voxel should be removed and if so removes the voxel at step S217. If the answer at step S216 is no then the CPU 22 carries out step S212 as described above so that the voxel is subjected to sub-division on further processing.

Figure 14B:
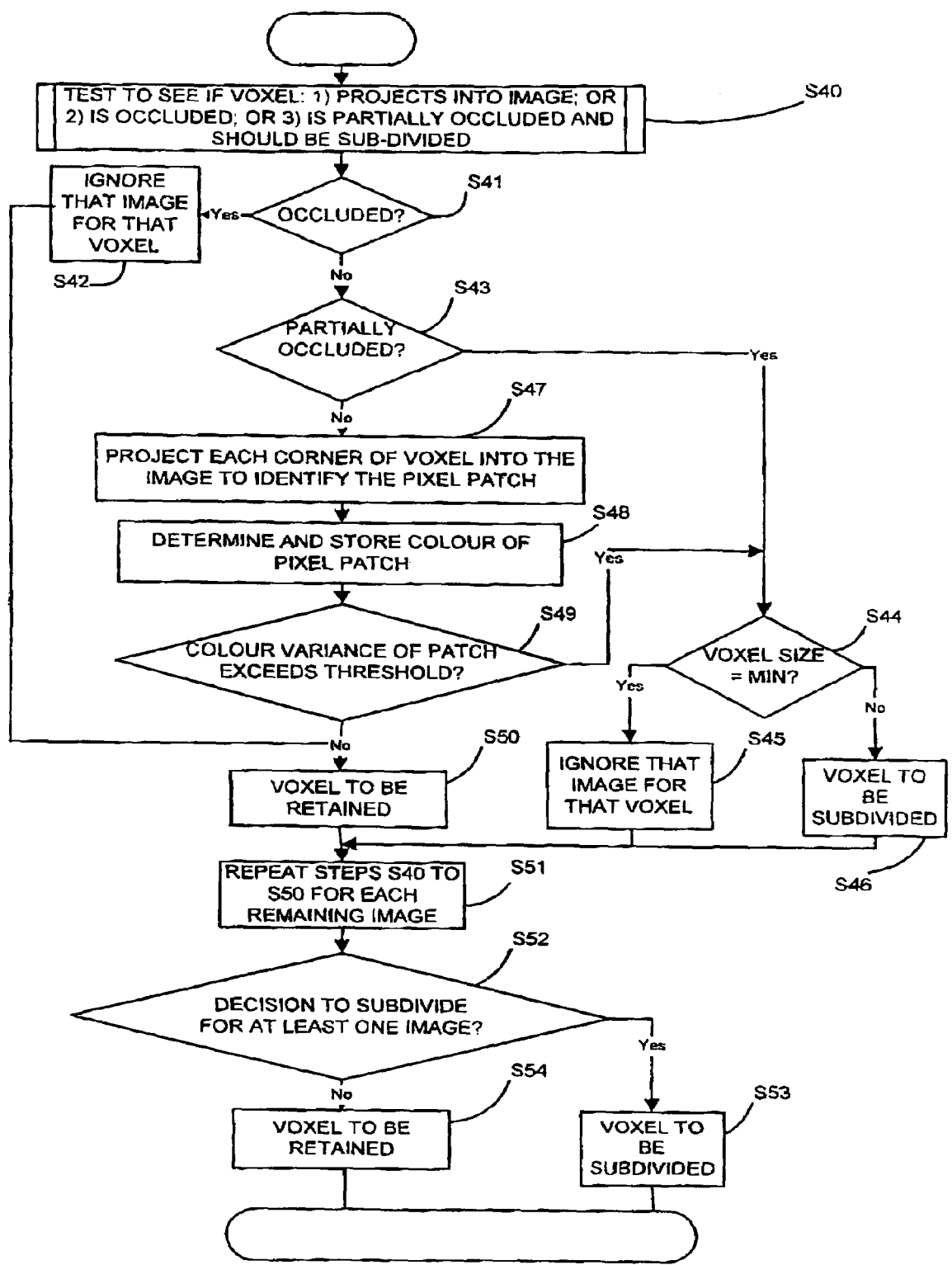

FIG. 14b shows step S210 in greater detail. At step S40, the CPU 22 tests to see whether a surface voxel (1) projects into an image; (2) is occluded in respect of that image; or (3) is partially occluded with respect to that image and should be sub-divided.

The CPU 22 then checks at step S41 whether the answer at step S40 was that the voxel was occluded with respect to that image and. If so, the CPU 22 ignores that image for that voxel at step S42 and determines that, on the basis of that image, the voxel should be retained at S50. If, however, the answer at step S41 is no, then the CPU 22 checks to see whether the answer at step S40 was that the voxel was partially occluded with respect to that image (step S43). If the answer at step S43 is yes, then the CPU 22 checks at step S44 whether the current voxel size is the minimum allowable and if the answer is yes decides at step S45 that that image should be ignored for that voxel and that, on the basis of the image, the voxel should be retained. If the answer at step S44 is no, then the CPU 22 determines at step S46 that the voxel should be sub-divided.

Figure 13:
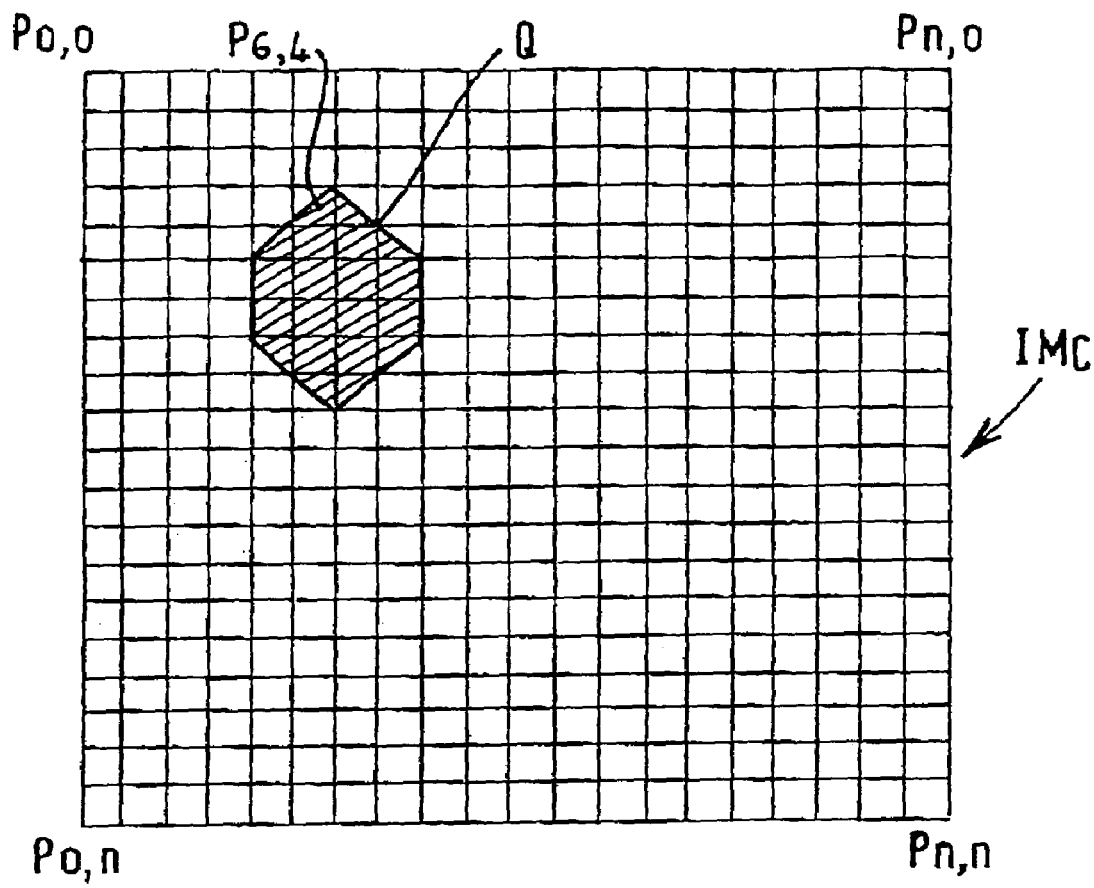
FIG. 13 shows schematically the projection of a voxel onto part of an image.

If the answer at step S43 is no, then in step S47 the CPU projects each of the eight corners of the voxel under test into the image to identify the pixel patch corresponding to that voxel. FIG. 13 shows schematically an array of pixels $P_{o,o}$ to $P_{n,n}$ of part of an image $IM_c$ to illustrate the projection of a voxel to a pixel patch Q (shown as a hatched area). The CPU 22 then determines at step S48 the colour of that pixel patch (for example Q in FIG. 13). Where, as shown in FIG. 13, the boundary of the pixel patch cuts through pixels (such as pixel $P_{6,4}$ in FIG. 13) the entirety of these pixels is considered to fall within the pixel patch. The CPU 22 determines the colour of the pixel patch by summing the respective numbers (each between zero and 255 for each colour in this example) associated in its memory with the different pixels forming the patch and dividing that sum by the number of pixels in the pixel patch to determine the colour (where all the pixels are the same colour) or the average colour of the pixel patch. This colour is then stored in the memory 22a by the CPU 22 for that voxel and that image m.

The CPU 22 then checks at step S49 whether the variance of the colours of the pixels in the patch exceeds a predetermined threshold, for example whether the standard deviation in colour is greater than 10. If the answer is yes, then the CPU 22 determines that that image contains too much colour variation and that that image cannot be used for checking the photoconsistency of that voxel without sub-division of the voxel. The CPU 22 then determines at step S44 whether the voxel size is already at a minimum. If the answer is yes, the CPU 22 determines at step S45 that that image should be ignored for the voxel and that the voxel should, as far as that image is concerned, be retained at step S50. If the answer is no, then the CPU determines at step S46 that the voxel should be sub-divided.

At step S51 in FIG. 14b the CPU 22 repeats steps S40 to S50 for each of the available images and, at step S52 checks to see whether a decision was taken at step S46 to sub-divide the voxel with respect to any one or more of the images. If the answer at step S52 is yes, then the CPU 22 confirms at step S53 that the voxel is to be sub-divided. If, however, the answer at step S52 is no, then the CPU 22 determines at step S54 that the voxel should be retained.

Figure 14C:
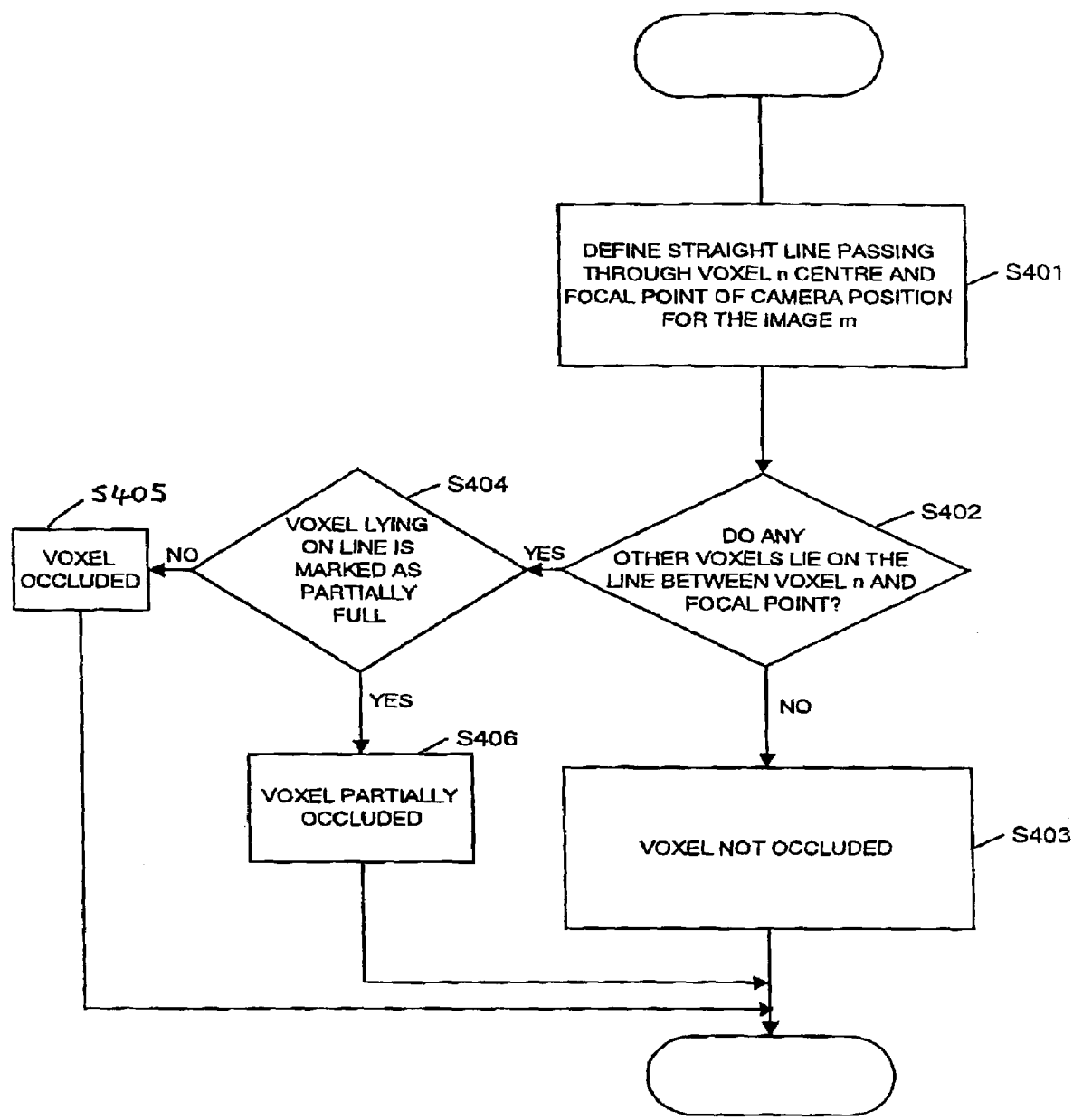

FIG. 14c shows in greater detail the steps carried out at step S40 in FIG. 14b. Thus, at step S401, the CPU 22 defines a straight line passing through the centre of the voxel and the focal point F of the camera position which produced the image for which the voxel is being tested. FIG. 10a shows a voxel $V_x$ being projected into the image $IM_c$ along the line xx.

The CPU 22 then checks at step S402 whether any other voxels lie on the line between the voxel under test and the focal point F. If the answer is no, then the CPU 22 determines that the voxel is not occluded for that image at step S403. If, however, the answer at step S402 if yes, then the CPU 22 checks the information in its memory 22a to determine, at step S404, whether the voxel lying on the line between the voxel being tested and the focal point F is a voxel that has been sub-divided, that is, as will be described below whether the information in the CPU's memory 22a includes information marking the voxel on the line as being partially full. If the answer at step S404 is yes, then the CPU 22 determines at step S406 that the voxel under test is partially occluded for that image. If the answer at step S404 is no, then the CPU 22 determines that the voxel under test is completely occluded for that image at step S405. The information as to whether the voxel under test is occluded, partially occluded or not occluded in that image is stored in the memory 22a.

Figure 14D:
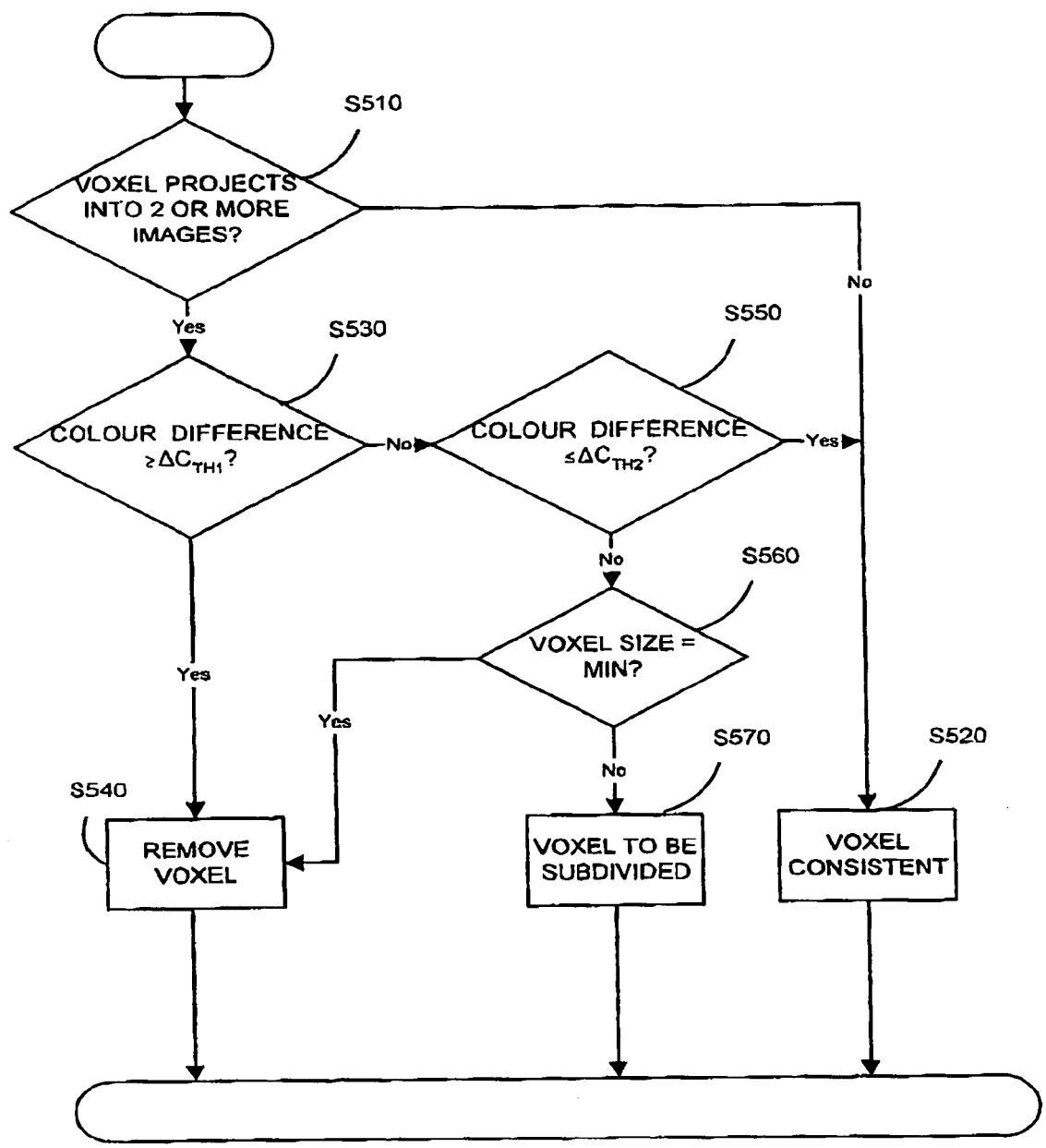

FIG. 14d shows in greater detail step S213 of FIG. 14A. Thus, at step S510, the CPU 22 checks to see whether the voxel under test projects into two or more images. If the answer is no, the CPU 22 determines that the consistency of the voxel cannot be checked and assumes that the voxel is consistent at step S520. If, however, the answer is yes, then at step S530 the CPU 22 compares the colour values of the pixel patches Q for each of the images in which the voxel was visible and determines whether the colour difference between the patches is greater than or equal to a first predetermined threshold $\Delta C_{TH1}$ by determining whether the standard deviation of the colour values exceeds a first predetermined value. Typically, the predetermined value for the standard deviation may be 20. Any technique may be used to determine the standard deviation. If the colour difference between the patches exceeds $\alpha C_{TH15}$, then the CPU 22 determines at step S540 that the voxel is inconsistent and removes it at step S540. If, however, the answer at step S530 is no, then the CPU 22 checks at step S540 whether the colour difference is less than or equal to a second predetermined threshold $\Delta C_{TH2}$ smaller than the first predetermined threshold. In this example the second predetermined threshold is a standard deviation of 10. If the answer at step S550 is yes the standard deviation is equal to or smaller than the second predetermined threshold then the CPU 22 determines at step S520 that the voxel is consistent and should be retained. If the answer at step S550 is no, then the CPU 22 checks at step S560 whether the voxel size is already at a minimum and, if so, decides that the voxel should be removed at step S540. Otherwise the CPU 22 determines that the voxel should be sub-divided (step S570). Thus, if the pixel patches into which the voxel projects have a colour variation greater than or equal to the first threshold the CPU 22 determines that that voxel cannot possibly form part of the 3D object surface because its colour is too inconsistent between images. If however the colour variation between the pixel patches is less than the first predetermined threshold but greater than the second predetermined threshold $\Delta C_{TH2}$ then the CPU 22 determines that the photoconsistency check is not conclusive and that the voxel should be sub-divided as part of the voxel may form part of the surface.

Figure 15:
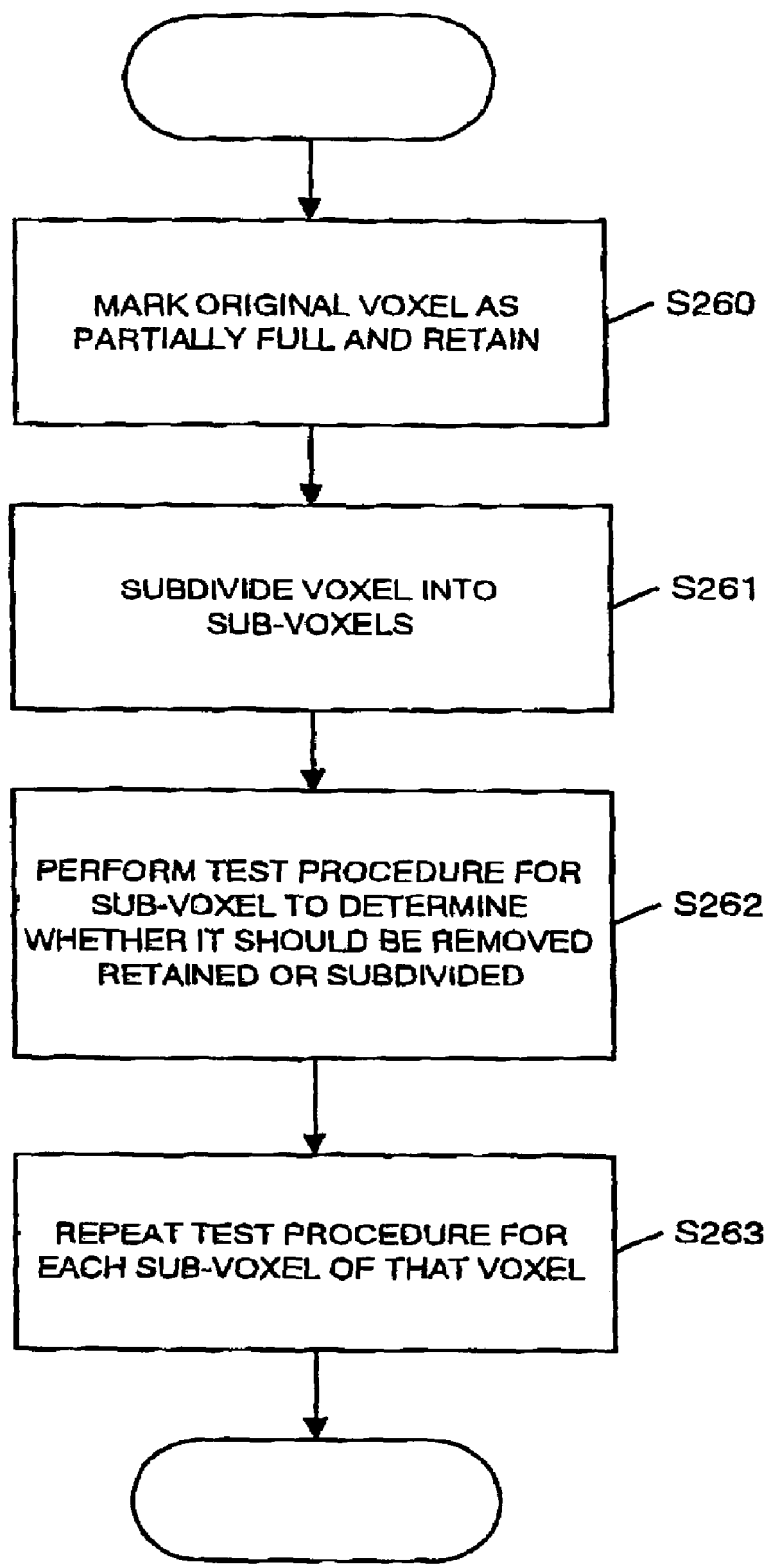

FIG. 15 shows a flow chart illustrating in greater detail the processing carried out step S212 in FIG. 14A. Thus, at step S260 in FIG. 15 the CPU 22 adds to its memory 22a information marking the original voxel as partially full and retains that voxel to enable the testing described above with reference to FIG. 12 to be carried out for subsequent voxels. At step S261, the CPU 22 sub-divides the voxel into a set of subsidiary voxels, sub-voxels. FIG. 11 shows a voxel $V_x$ that has been divided into eight subsidiary voxels of which sub-voxels V1 to V6 are visible in FIG. 11. It will, however, be appreciated that the CPU 22 may, for example, divide the voxel into 16 or more sub-voxels.

Once the CPU 22 has stored the sub-voxels and their location in its memory 22a the CPU performs the test procedure described above with reference to step S21 in FIG. 12 for a first one of the sub-voxels to determine whether it should be removed, retained or sub-divided at step S262 and then, at step S263, repeats that test procedure for each of the other sub-voxels of that voxel. It will, of course, be appreciated that the test procedure at step S262 is carried out in the manner described above with reference to FIGS. 12 to 14d with the exception that, of course, it is a sub-voxel rather than a voxel that is being tested.

Figure 16:
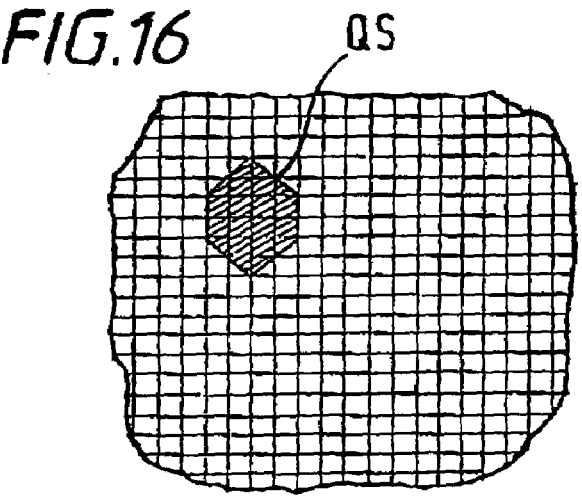
FIG. 16 shows a diagrammatic representation of a portion of the part of the image shown diagrammatically in FIG. 13 to illustrate a pixel patch formed by projection of a subsidiary voxel into the image.

FIG. 16 shows diagrammatically a portion of the part of the part of the image shown in FIG. 13 to illustrate the projection of a sub-voxel into a pixel patch QS in an image.

As will be appreciated from FIGS. 12 to 14d if a sub-voxel is found to be partially occluded (that is a correspondingly sized sub-voxel which has already been divided into further subsidiary voxels is on the line between that sub-voxel and the focal point for the image concerned,) or the colour variance of the patch into which the sub-voxel projects in an image exceeds the predetermined threshold or the colours of the patches into which the sub-voxel projects are inconsistent, then that sub-voxel may itself be sub-divided. However, before a sub-division is carried out, the CPU 22 checks at step S44 in FIG. 14b or step S56 in FIG. 14d whether the minimum voxel size has been reached and if so determines that the minimum size sub-voxel should be removed rather than sub-divided. The minimum size may be determined in dependence on the resolution of the images being considered and may, for example, be the size of a sub-voxel that projects to a single pixel in an image.

Thus, in this method, when the CPU 22 determines that a voxel (for example voxel $V_x$ in FIG. 11) is partially occluded, projects to a pixel patch having too large a colour variance or the colour difference between the pixel patches is too great, the CPU 22 does not immediately remove that voxel but rather sub-divides that voxel into subsidiary voxels (eight in the example given above) and then tests each of those sub-voxels in turn in the same way as the voxels were tested. Any consistent sub-voxels are retained whereas, if a sub-voxel is determined to be photo-inconsistent, the CPU 22 checks whether the minimum sub-voxel size has been reached and, if so, removes the sub-voxel. If not, the CPU 22 further sub-divides the sub-voxel and repeats the photoconsistency check for each further sub-divided voxel.

In the example described above with reference to FIGS. 12 to 15, the CPU 22 performs step S21 in FIG. 12 by first checking whether a voxel is occluded, partially occluded or unoccluded (step S14 in FIG. 14b) and, if the voxel is unoccluded, goes on to check the colour variance (step S49 in FIG. 14b). These two tests could, however, be combined so that, for example, the CPU 22 checks to see if the voxel is fully occluded and, if not, then checks the colour variance (step S49 in FIG. 14b) and, if the colour variance does not exceed the predetermined threshold, only then checks to see if the voxel is partially occluded.

Also, the photoconsistency check described with reference to FIG. 14d may be combined with these other checks so that, for example, the CPU 22 checks first to see if the voxel is visible in at least two of the images then carries out the photoconsistency check and then carries out the colour variance test (step S49 in FIG. 14b) and the partial-occlusion test only if the photoconsistency test is satisfactory. As another possibility, the partial-occlusion test may be carried out before the photoconsistency test. Also, step S53 of FIG. 14d could be omitted so that the CPU 22 only tests to see if the colour difference is less than or equal to the second predetermined threshold and, if the answer is no, sub-divides the voxel if it has not already reached the minimum size. This would mean that there was no upper threshold beyond which the voxel was considered definitely to be inconsistent with the 3D object surface. Although this may further reduce the possibility of a voxel being erroneously removed it would, as will be appreciated, increase the number of voxels that have to be sub-divided and therefore the overall processing time required.

It will, of course, be appreciated that the first and second predetermined thresholds may be user adjustable so as to enable a user to adjust these thresholds in accordance with the 3D object whose surface is being generated. The colour variance threshold may similarly be adjusted.

The method described with reference to FIGS. 12 to 15 thus enables the process of determining the photoconsistency of a voxel to be further refined by, when it is not clear whether a voxel forms part of the 3D object surface, sub-dividing that voxel into subsidiary voxels (sub-voxels) and then testing the sub-voxels for consistency with the 3D object surface. This should avoid or at least reduce the possibility of erroneous removal of a voxel when, for example, the colour patch into which that voxel projects in an image contains significantly different colours or a voxel is partially occluded from an image. The fact that a voxel can be sub-divided and the sub-voxels tested before making any decision to remove that voxel means that it is not necessary for the initial size of the voxels to be determined by the smallest colour area in the 3D object surface to be generated. Rather, the initial voxel size can be, for example, determined by the overall colouring of the images being used and need only be made smaller (sub-divided) where required, that is where the images have rapidly changing areas of colour such as may, for example occur at edges or highly patterned areas of the surface. This means that the voxel colouring process avoids or reduces the possibility of erroneous removal of a voxel due to significant colour changes within the colour patches into which that voxel projects without having to define the initial size of the voxels as being equivalent to the minimum single colour area in the images. This therefore should reduce the computational power and time required to generate the 3D object surface.

In the above described embodiment a sub-voxel has the same shape as the voxels and the photo inconsistency threshold is the same for the voxels as it is for sub-voxels. This need not, however, necessarily be the case and there may be advantages to having sub-voxels of different shape from the voxels and to using different photo inconsistency thresholds for voxels and sub-voxels.

Figure 17:
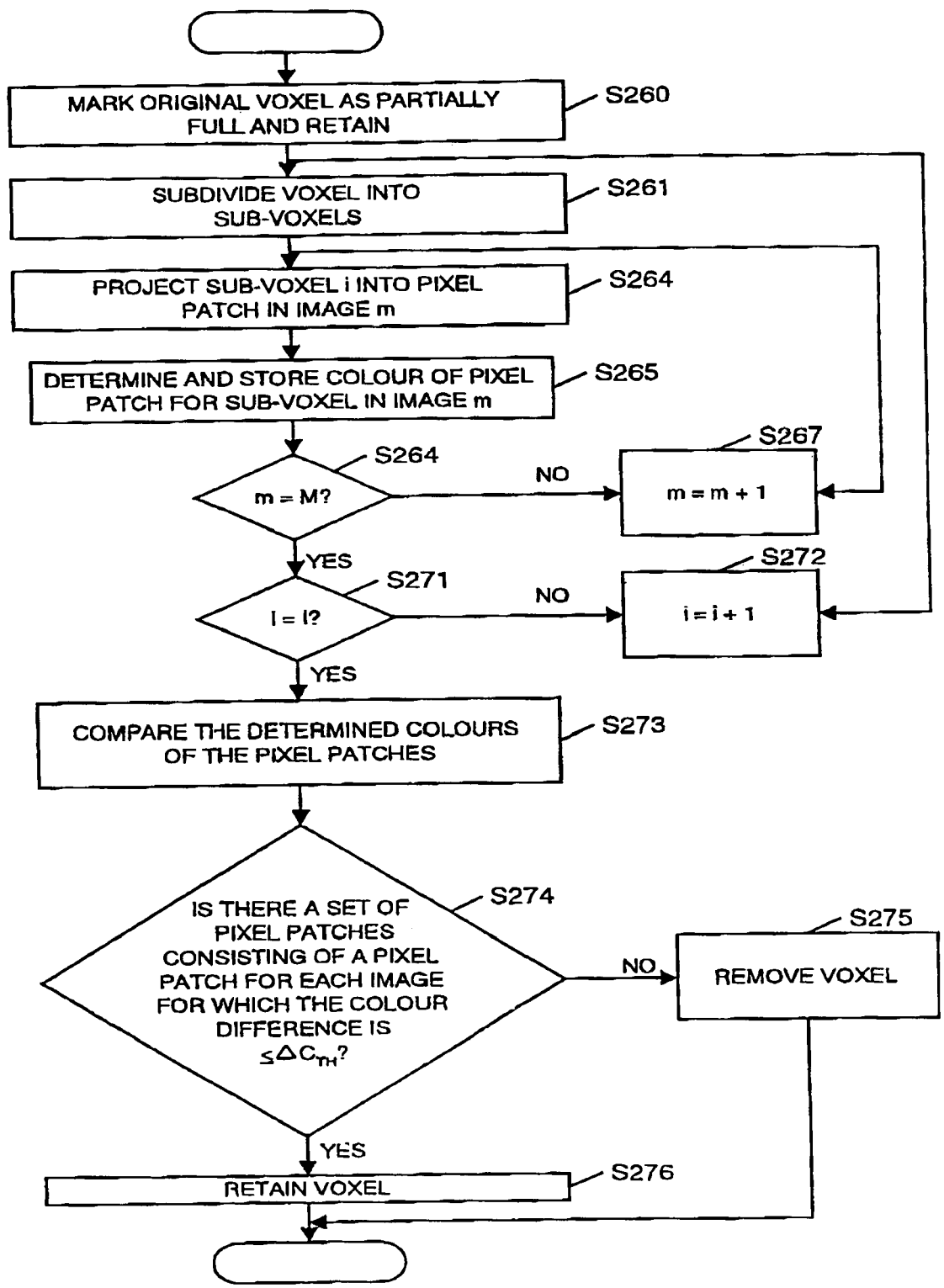

FIG. 17 shows a flowchart illustrating another example of a subdivision and further processing procedure that may be carried out at step S212 in FIG. 14a.

When the additional processing shown in FIG. 17 is carried out, steps S260 and S261 are carried out as for the additional processing shown in FIG. 15.

When the voxel has been divided into sub-voxels at step S261, a first sub-voxel i is projected into a pixel patch in a first image m (for example the pixel patch QS in FIG. 16) at step S264 in FIG. 17 by projecting each corner of the sub-voxel into the image along the line passing through that corner and the focal point of the image. At step S265, the CPU 22 determines and stores the colour of the pixel patch for that sub-voxel and that image and then, at step S266, checks whether m=M (that is whether that sub-voxel has been projected into each of the available images. If the answer is no, then the CPU 22 increments M by 1 at step S267 and repeats steps S264 to S266 until the answer at step S266 is yes). When the answer at step S266 is yes, that is a sub-voxel has been projected into all of the images, the CPU 22 determines at step S271 whether each of the sub-voxels into which the voxel has been divided has been projected into the images (that is whether i=I?). If the answer at step S271 is no, then the CPU 22 increments i by 1 at step S272 and then repeats steps S261 to S267, S271 and S272 until the answer at step S271 is yes. When the answer at step S271 is yes, the CPU 22 will have determined and stored for each sub-voxel the colour of the pixel patches associated with that sub-voxel. It will, of course, be appreciated that the order in which steps S261 to S267, S271 and S272 are carried out may be altered so that each sub-voxel is projected into an image and then the step of projecting the sub-voxels is repeated image by image.

When the answer at step S271 is yes, the CPU 22 compares at step S273 the determined colours of the pixel patches for the voxel being considered. Then, at step S274, the CPU 22 determines whether there is, for that voxel, a set of pixel patches consisting of a pixel patch for each image for which the colour difference is $\leq \Delta C_{TH}$. Thus, the CPU 22 does not check whether there is photoconsistency between corresponding sub-voxels but rather whether there is photoconsistency between pixel patches from the different images regardless of which sub-voxel projects into that pixel patch. If the answer at step S274 is no there is no such set of pixel patches, then the CPU 22 removes the entire voxel at step S275. If, however, the answer at step S274 is yes, then the entire voxel is retained at step S276.

Figure 18:
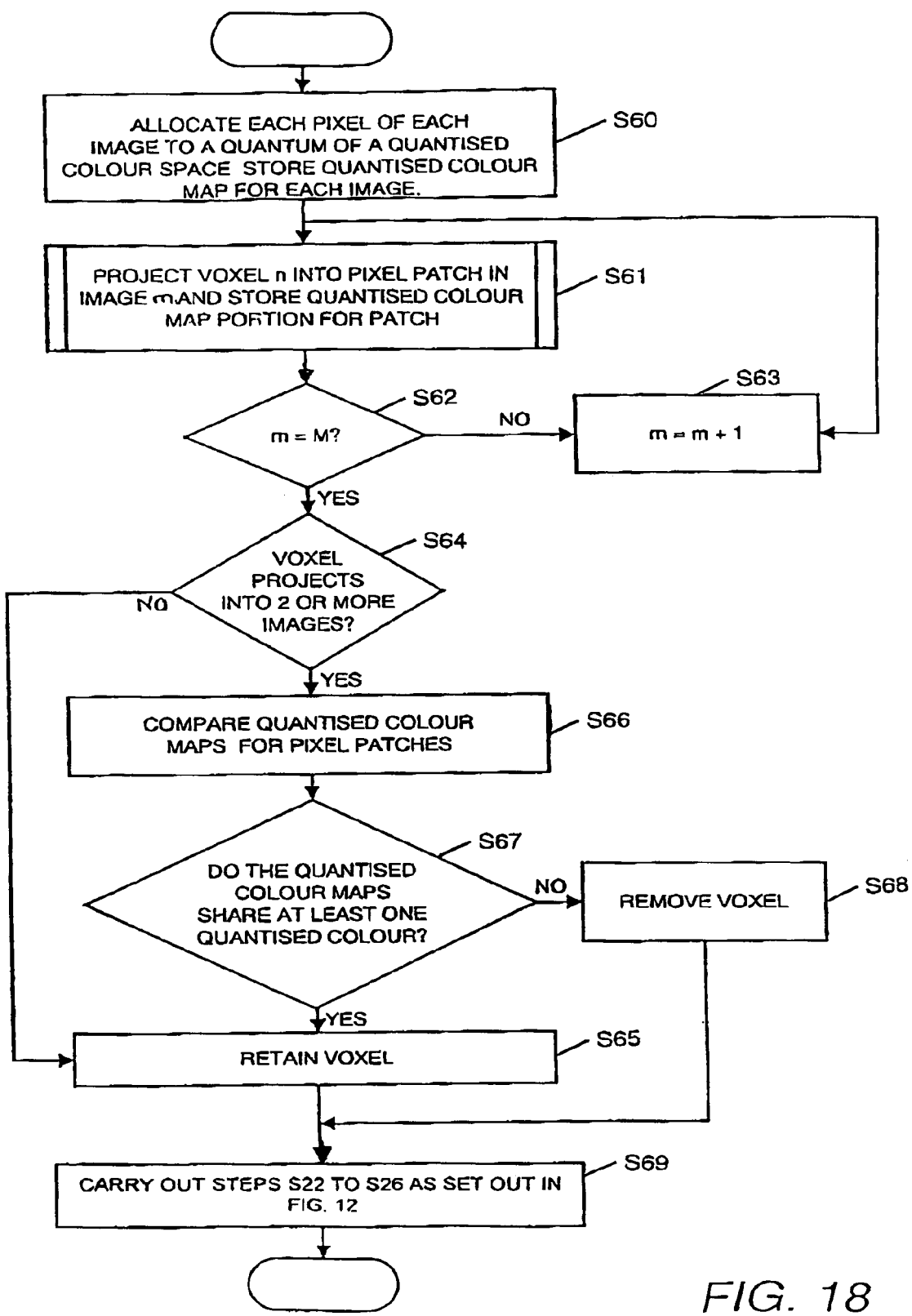
FIG. 18 shows a flowchart for illustrating another method of carrying out a voxel colouring process.

FIG. 18 illustrates another way of carrying out the voxel colouring process that replaces step S21 described above with reference to FIGS. 12 to 15.

Figure 19:
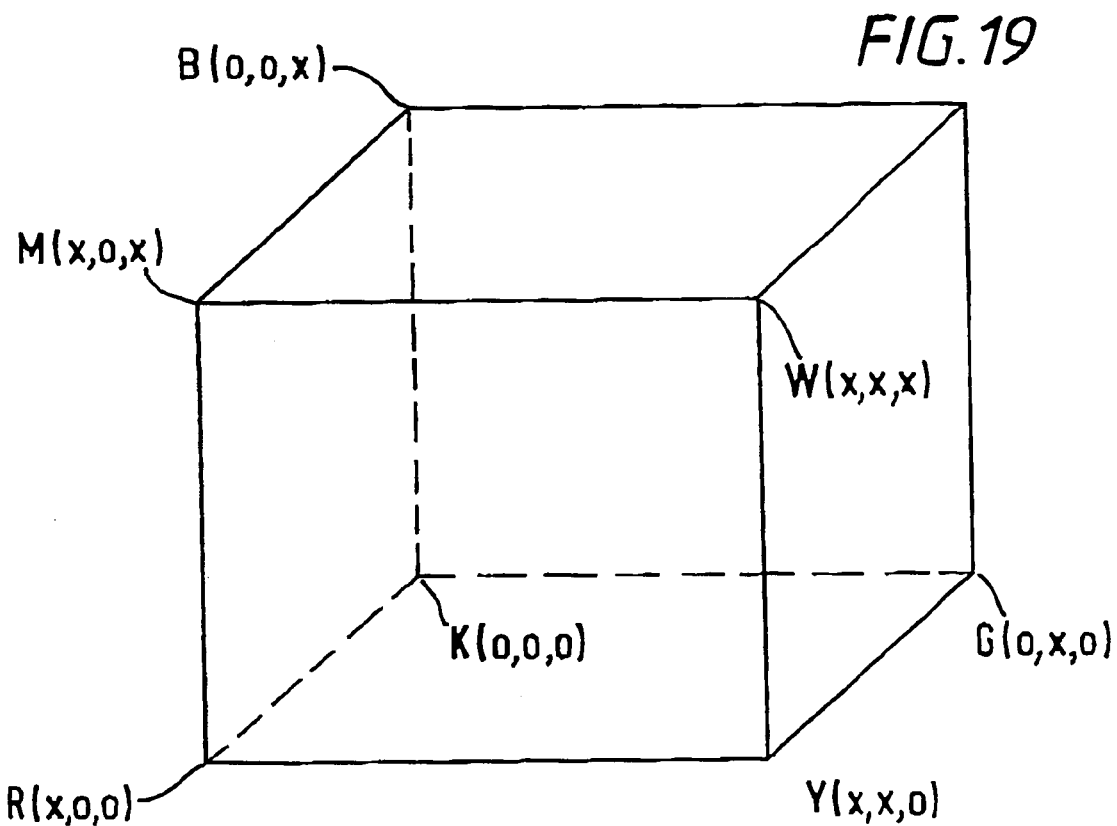
FIG. 19 illustrates diagrammatically one form of colour space.
Figure 20:
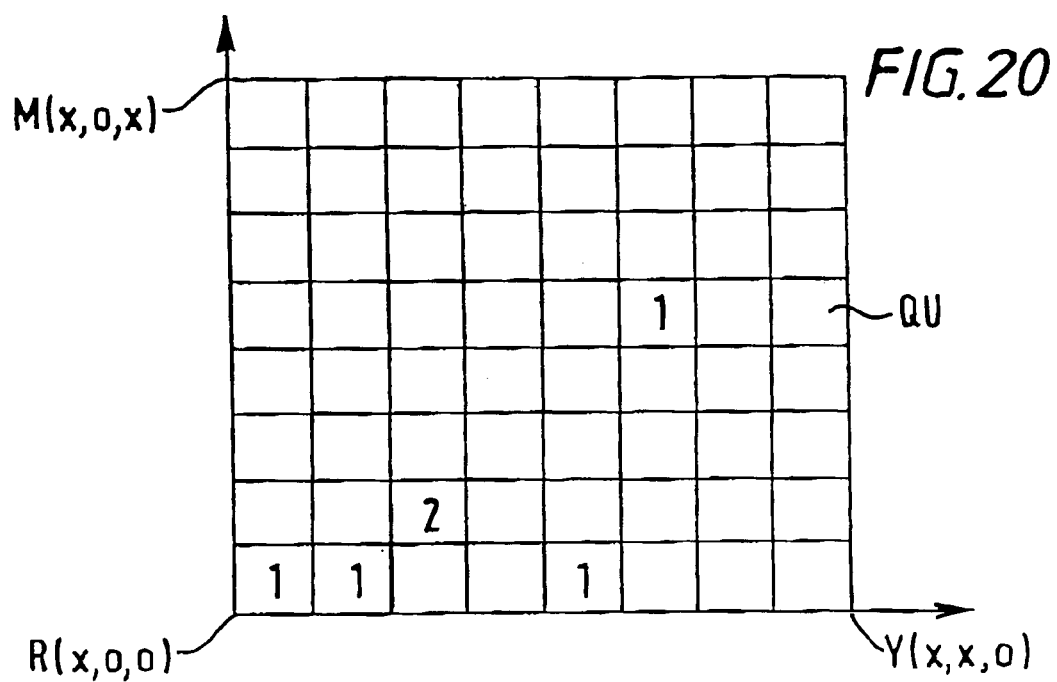
FIG. 20 illustrates a plane of the colour space shown in FIG. 19.

At step S60 in FIG. 18, the CPU 22 allocates each pixel of each image to be used for the voxel colouring process to a quantum of a quantized colour space and stores a quantized colour map for each image. Any appropriate conventional colour space may be used. In this example, as shown schematically in FIG. 19, the colour space is a cubic RGB colour space in which the origin (0,0,0) represents black (K) while the corners of the cube along the x, y and z axes represent red (R), green (G) and blue (B), respectively. In this example, the colour space shown in FIG. 19 is quantized by dividing the colour cube into a set of smaller cubes. FIG. 20 shows one plane of the colour cube to illustrate this division. As shown in FIG. 20, each side of the colour cube is divided by eight so that the colour space is divided into 512 quanta. FIG. 20 shows the quanta QU as abutting one another and not overlapping. The quantized colour map is stored for each image so that, instead of being represented by the original RGB value, each pixel is represented by a number identifying the corresponding quantum.

At step S61, the CPU projects voxel n into a pixel patch in image m and stores a quantized colour map for the patch. This is carried out in the manner shown in FIG. 14c except that the CPU 22 tests only to see whether the voxel is fully occluded or unoccluded, that is steps S404 and S406 of FIG. 14c are omitted. This quantized colour map will indicate the frequency of occurrence of each colour quantum in that pixel patch. Of course, the quantized colour map may be compressed for a particular pixel patch so that only the portion of the colour space containing quanta present in that pixel patch is stored. Thus, for example, where the colours of the pixel patch all fall within the plane shown in FIG. 20, then only that portion of the colour space will be stored as the quantized colour map. The quantized colour map may be stored in tabular form as shown in FIG. 20 with each quantum indicating whether, and if so how many times, a colour quantum appears in a pixel patch. For example, FIG. 20 shows some of the colour quanta associated with numbers indicating the frequency of occurrence of those quanta in a pixel patch. As another possibility, the quantized colour map may be stored as a histogram.

It will be appreciated that the assigning of the pixels to respective colour quanta could be carried out after a voxel has been projected into an image so only pixels to which a voxel projects are assigned to colour quanta.

The CPU 22 then checks if all of the images have been checked (m=M) at step S62 and, if not, increments M by one at step S63 and repeats steps S61 to S63 until the answer at step S62 is yes. The CPU 22 then determines if the voxel projects into two or more images (step S64). If the answer is no, the CPU determines that the photoconsistency cannot be checked and retains the voxel at step S65. When the answer at step S64 is yes, the CPU 22 compares, at step S66, the quantized colour maps for the pixel patches for the images into which the voxel projects. The CPU 22 then determines at step S67 whether the quantized colour maps share at least one quantized colour. If the answer is no, then the CPU determines that the voxel is photo-inconsistent and removes it at step S68. If, however, the answer is yes, then the CPU retains that voxel at step S65. Steps S22 to S26 are then carried out as described above with reference to FIG. 12 at step S69.

The methods described above with reference to FIGS. 15, 17 and 18 enable the voxel colouring process to take account of voxels that project to occluding boundaries or to areas of high spatial frequency so that the voxel does not project to an area of constant colour. The method described with reference to FIG. 15 enables such voxels to be sub-divided and the individual sub-voxels to be checked while the methods described above with reference to FIGS. 17 and 18 err on the side of caution so that if there is at least some correspondence in colour between parts of the different pixel patches associated with a voxel, that voxel is retained. This should avoid or at least reduce the possibility of catastrophic failure of the voxel colouring process resulting from erroneous removal of a voxel that actually forms part of the 3D object surface but projects to an occluding boundary or area of high spatial frequency.

Another method for defining the 3D object surface once the initial voxel space has been defined will now be described with reference to FIGS. 21 to 22b.

Figure 21:
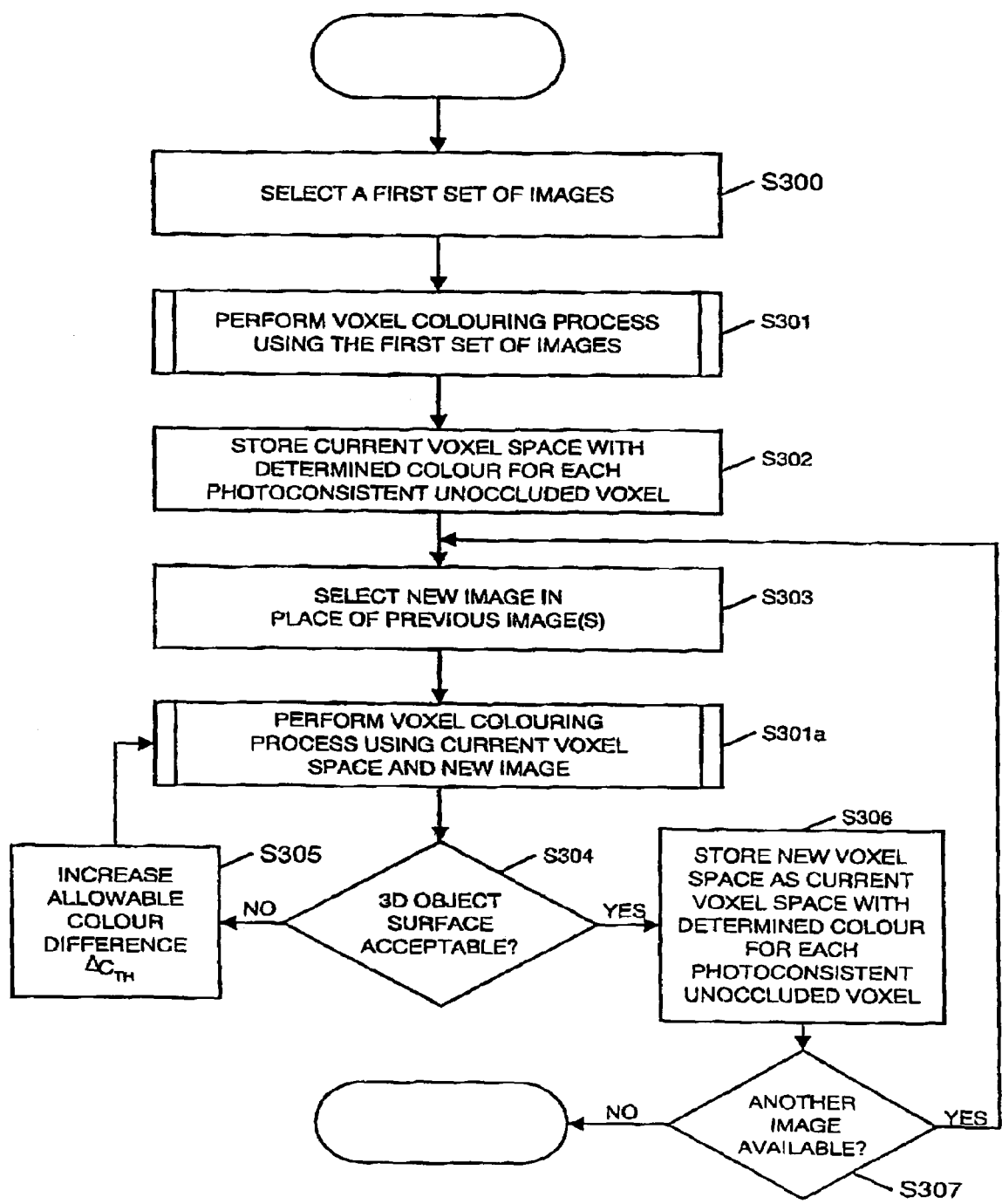
FIG. 21 shows a flowchart illustrating in greater detail another way of carrying out the step S2 in FIG. 3 of determining the voxels defining the 3D object surface.

At step S300 in FIG. 21, the CPU 22 selects a first set of images for use in the voxel colouring process. This first set of images will consist of a sub-set of the images used to determine the initial voxel space.

Typically, the first set of images will consist of up to 20 to 30 images taken at different positions and orientations around the object.

At step S301, the CPU 22 performs a voxel colouring process using the first set of images as described above with reference to FIGS. 12a and 12b or FIGS. 12a and 12b as modified by FIG. 15 or 17, or FIG. 18.

At the end of this voxel colouring process, the CPU 22 stores at step S302 the current voxel space together with the determined colour for each photoconsistent non-occluded voxel of the current colour space. At step S303 the CPU 22 selects another image from the stored images, that is an image not in the first set of images, and at step S301a the CPU 22 performs the voxel colouring process using the current voxel space and the new image as will be described in greater detail below with reference to FIGS. 22a and 22b. At step S304, the CPU determines whether the voxel colouring process converged to a reasonable 3D object surface. This determination may be effected by the CPU 22 causing the 3D object surface to be displayed to the user on the display 24 together with a message saying "Please confirm acceptance of the 3D object surface" so that the user can determine whether the voxel colouring process has proceeded satisfactorily or whether erroneous removal of voxels has resulted in an erroneous 3D object surface. Alternatively, the CPU 22 itself may determine roughly whether the 3D object surface is acceptable by using the data regarding the volume of the object that may previously have been input by the user. In this case, the CPU 22 would determine that the 3D object surface is not acceptable if the volume bounded by that 3D object surface is less than the expected volume of the object.

When the answer at step S304 is no, then at step S305 the CPU 22 increases the allowable colour difference used in the voxel colouring process and repeats steps S301a, S304 and S305 until the CPU determines at step S304 that the 3D object surface is acceptable. This repetition of the voxel colouring process is possible because the voxel space that resulted from the previous voxel colouring process is stored at step S302 and the image data for the new image added for the current voxel colouring process is stored at step S303 and is not discarded until the answer at step S304 is yes. This method thus enables a user to return to the previously determined voxel space if the voxel colouring process carried out at step S301a results in erroneous removal of one or more voxels or even catastrophic failure of the voxel colouring process.

When the answer at step S304 is yes, then the CPU 22 stores the newly derived voxel space as the current voxel space together with the determined colour for each photoconsistent non-occluded voxel and discards the previously stored image at step S306 and then checks at step S307 whether there is another image available.

Step S307 may be carried out automatically by the CPU 22 where a large number of images have been pre-stored. The images may be selected by the CPU in any predetermined order. For example, the images may be successive images along a predetermined path around the object. As another possibility, the first set of images may consist of images taken at predetermined intervals or angles relative to one another around the object and the next images may be intermediate those images and so on.

As another possibility at step S307, the CPU 22 may allow the user a choice in the next image selected. For example, the CPU 29 may display a message to the user requesting the user to select one of a number of additional pre-stored images and may also give the user the opportunity to input data for further images (for example via a removable disc 27, as a signal over the interface I or using a digital camera). In this way, the user can view the results of the previous voxel colouring process and determine whether it would improve the 3D object surface if data from one or more additional images was also used in the voxel colouring process.

Steps S303 to S307 are repeated until the answer at step S307 is no, that is no more images are available.

Figure 22A:
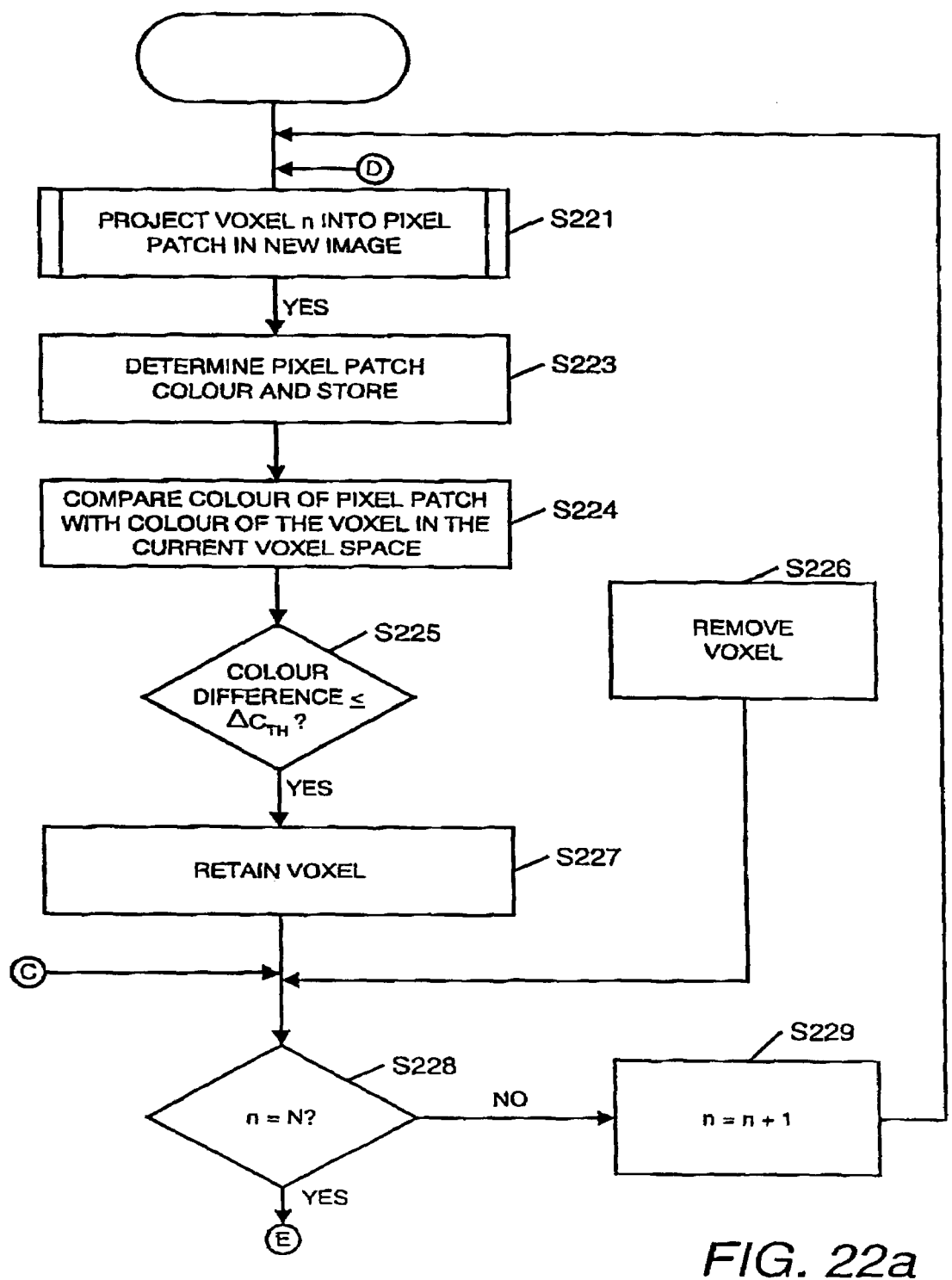
FIGS. 22a and 22b show a flowchart illustrating in greater detail the step of performing a voxel colouring process using a current voxel space and a new image shown in FIG. 21.
Figure 22B:
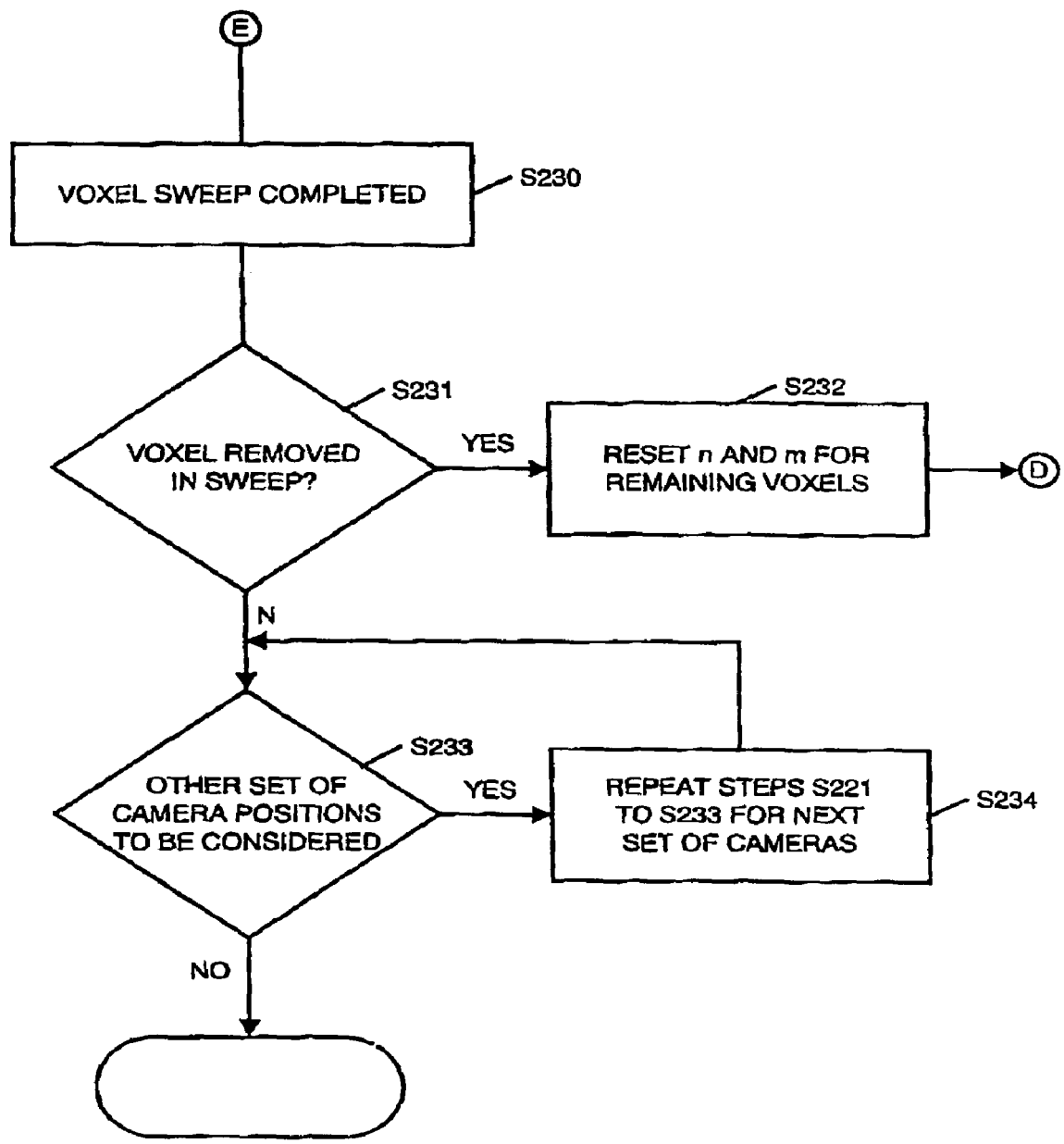

FIGS. 22a and 22b illustrate in greater detail the step S301a of FIG. 21 of performing a voxel colouring process using the current voxel space and a new image.

At step S221, the voxel n is projected into a pixel patch in the new image in the manner described above with reference to FIG. 14. If the voxel n does not project into the new image then as described with reference to FIG. 14, the CPU 22 proceeds to point C which is step S228 in FIG. 22a and if all the non occluded voxels of the current voxel volume have not yet been projected into the new image, increments n by 1 at step S229 and then repeats step S221. When the voxel does project into the new image, the CPU 22 determines at step S223 the colour of the pixel patch and stores this colour in association with the voxel n for the new image in its memory 22a. The step S223 of determining the pixel patch colour is carried out in the same manner as described above with reference to FIG. 12a.

At step S224, the CPU 22 compares the colour of the pixel patch for the new image with the stored colour associated with that voxel in the current voxel space. The CPU then checks at step S225 whether the colour difference is less than or equal to the predetermined threshold ACTH. If the answer is no, the voxel is removed at step S226 while if the answer is yes the voxel is retained at step S227. The CPU then determines at step S228 whether all the non-occluded voxels of the current voxel space have been visited and if the answer is no increments n by 1 at step S229 and then repeats steps S221 to S229 until the answer at step S228 is yes.

When the answer at step S228 is yes, the CPU 22 determines at step S230 that the voxel sweep has been completed (that is all non-occluded voxels have been visited). The CPU then checks at step S231 whether any voxels have been removed in the sweep and if the answer is yes resets n and m for the remaining voxels at step S232 and, for the reasons given above, repeats steps S221a to S232 until the answer at step S231 is no. When the answer at step S231 is no, the CPU 22 determines whether there are any other sets of camera positions to be considered at step S223 and if the answer is yes repeats at step S234 steps S221a to S234 until all of the sets of cameras have been considered.

As will be appreciated from the above, the steps set out in FIGS. 22a and 22b are carried out each time a new image is added and the photoconsistency of that new image is compared with the stored results of the previous voxel colouring process. This means that it is only necessary to store in the CPU's working memory 22a the current voxel space, the colour associated with each non-occluded voxel of that space and the current image. This also means that the 3D object surface resulting from the voxel colouring process can be refined as required by the user simply by requesting the CPU 22 to check the photoconsistency of the existing voxel volume against another image at step S307 in FIG. 21.

Figure 23:
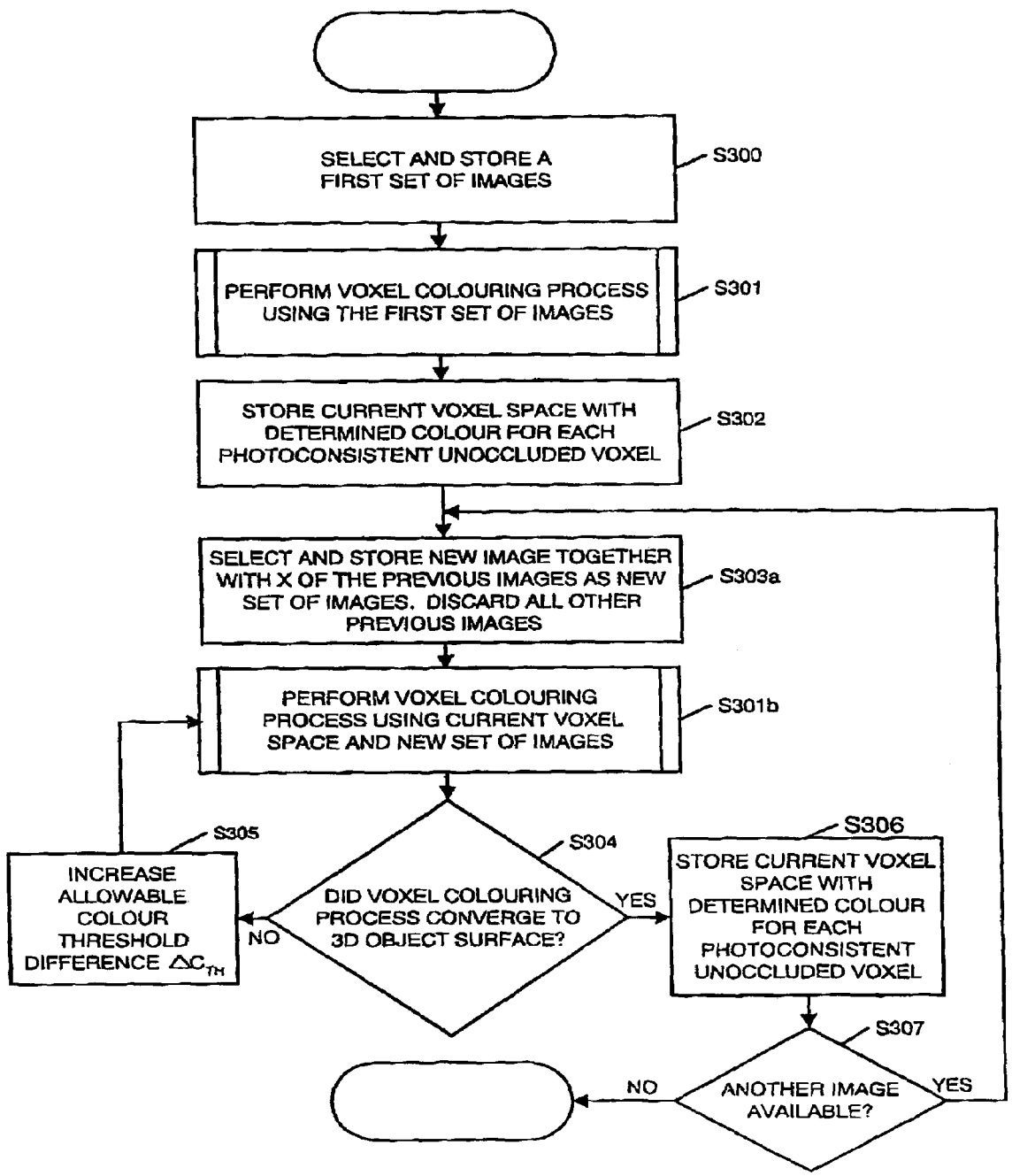
FIG. 23 shows a flowchart illustrating another way of carrying out step S2 in FIG. 3.
Figure 24A:
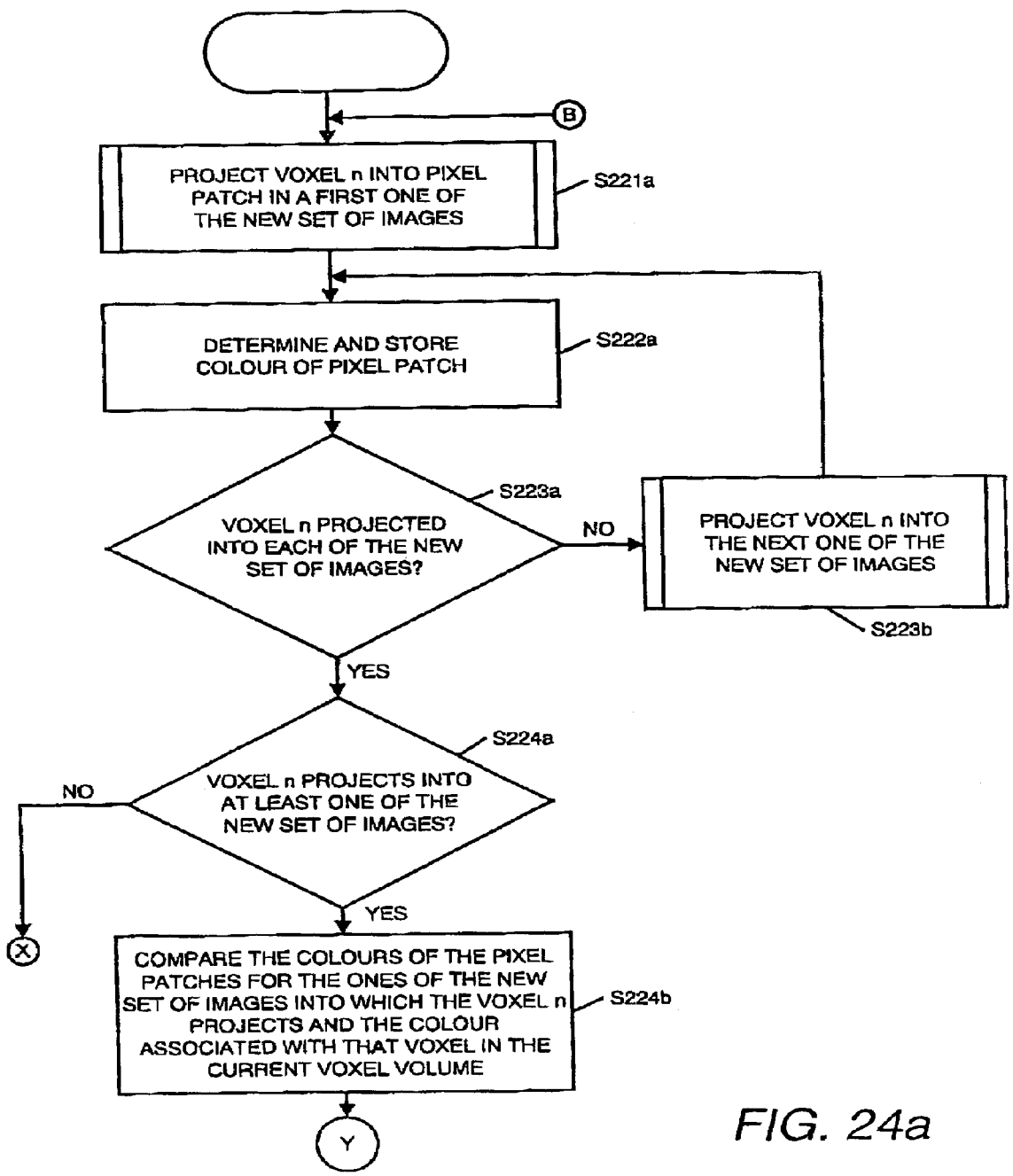
FIGS. 24a and 24b show a flowchart illustrating in greater detail the step of performing a voxel colouring process using a current voxel space and a new set of images shown in FIG. 23.
Figure 24B:
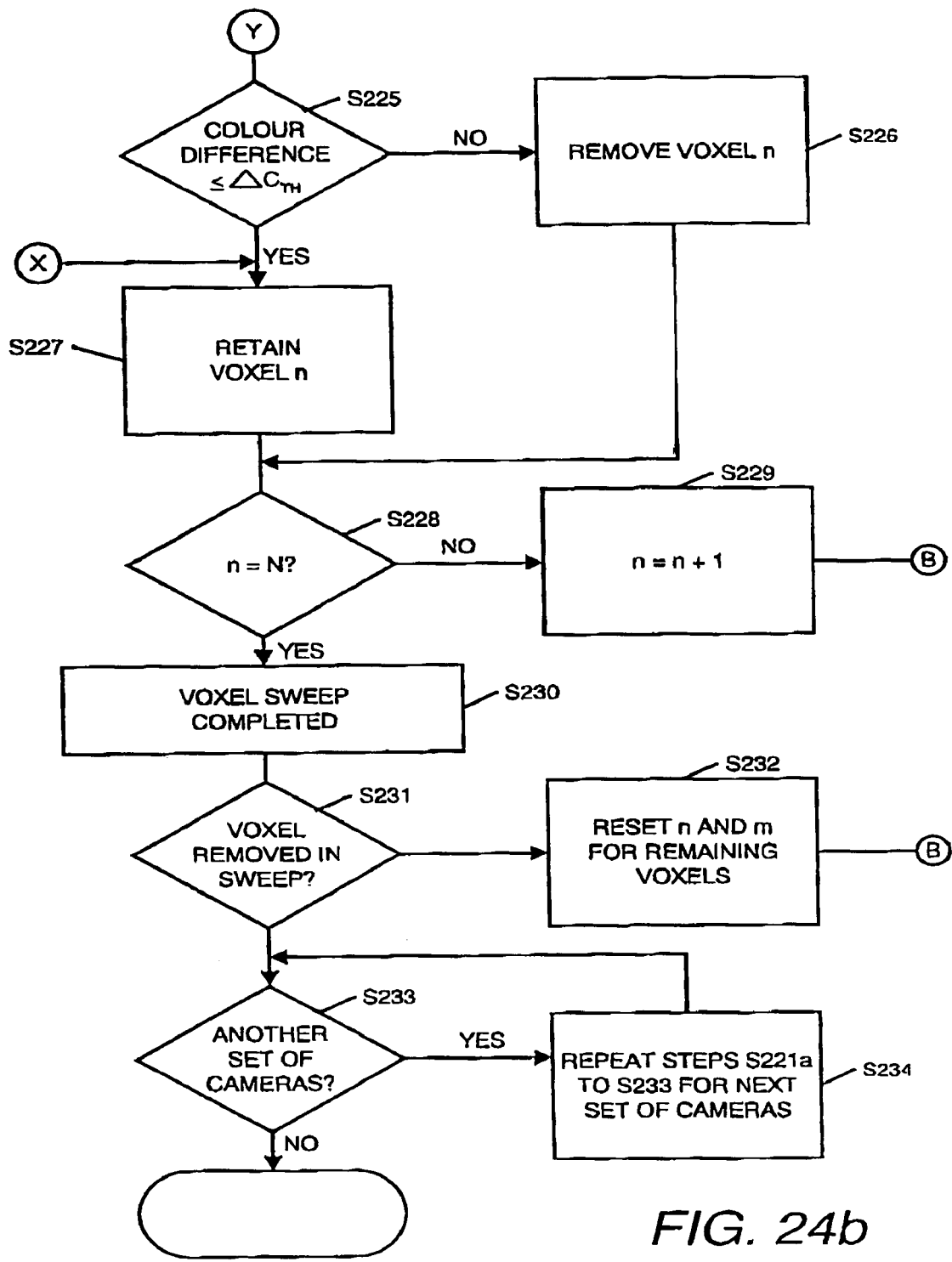

FIGS. 23, 24a and 24b illustrate another method for defining the 3D object surface once the initial voxel space has been defined. FIG. 23 corresponds to FIG. 21 while FIGS. 24a and 24b correspond to FIGS. 22a and 22b.

The method shown in FIGS. 23, 24a and 24b differs from that described above with reference to FIGS. 21 to 22 in that, in this case, a number of previous images are retained in addition to the new image and the voxel colouring process is repeated using the current voxel space, the stored previous images and the new images. The number of previous images used will be considerably less than that used as the first set of images and may be, for example, 10. The number of previously stored images is kept constant so that, each time a new image is added, the oldest of the previously stored images is discarded. Where images of the first set still remain, then the image to be discarded (that is the "oldest" image) will be selected at random from that first set. Once all of the first set of images have been discarded, then the oldest image can be determined by looking at the time at which that image was added.

As can be seen from FIG. 23, in this method steps S300 to S302 are carried out in the same manner as described above with reference to FIG. 21. However, at step S303a, instead of just storing the new image in place of the previous images, the CPU 22 stores the new image together with x (in this example 10) of the previously used images and discards all other images.

The voxel colouring process is then carried out at step S301b using the current voxel space and the new set of images (that is the new image and the previous 10 images). Steps S304 to S307 are then carried out as described above with reference to FIG. 21.

In the method shown in FIG. 23, the voxel colouring process carried out at step S301 is the same as that described above with reference to FIGS. 12 and 14 or FIGS. 12a and 12b when modified by FIG. 17 or 18 or FIG. 18.

The voxel colouring process carried out at step S301b differs somewhat from that described above with reference to FIGS. 22a and 22b as can be seen from FIGS. 24a and 24b. Thus, at step S221a in FIG. 24a, the CPU 22 projects voxel n into a pixel patch in a first one of the new set of images in the manner described above with reference to FIG. 14.

The CPU 22 then determines and stores the colour of the pixel patch at step S222a in the manner described above and at step S223a the CPU 22 determines whether the voxel n has been projected into each of the new set of images. If the answer at step S223a is no, then the CPU 22 projects voxel n into the next one of the new set of images at step S223b in the manner described above with reference to FIG. 14. When the answer at step S223a is yes, the CPU 22 determines at step S224a whether the voxel n projects into at least one of the new set of images. If the answer is no, then the CPU 22 determines that it is not possible to check the photoconsistency of that voxel in this particular voxel colouring process and so retains that voxel at step S227 (FIG. 24b). If the answer at step S224a is yes, then the CPU 22 compares, at step S224a, the colours of the pixel patches for the ones of the new set of images into which the voxel n projects and the colour associated with that voxel in the current voxel volume. The CPU 22 then determines at step S225 whether the difference in colour between the pixel patches and the colour associated with that voxel in the current voxel volume is less than or equal to $\Delta C_{TH}$. If the answer at step S225 is no, then the voxel is removed at step S226 while if the answer is yes the voxel is retained at step S227. Steps S228 to S234 are then carried out as described above with reference to FIGS. 22a and 22b.

The method described above with reference to FIGS. 23 to 24b requires a larger amount of data to be stored than the method described with reference to FIGS. 21 to 22b. However, the storage of the additional ones of the previous images means that less image information is lost and allows the photoconsistency of the surface voxels of the current voxel volume to be checked again with each of these images in combination with the new image. In contrast, the method described with reference to FIGS. 21 to 22 requires less storage of data but only enables the new image to be checked against the currently decided voxel space.

Figure 25:
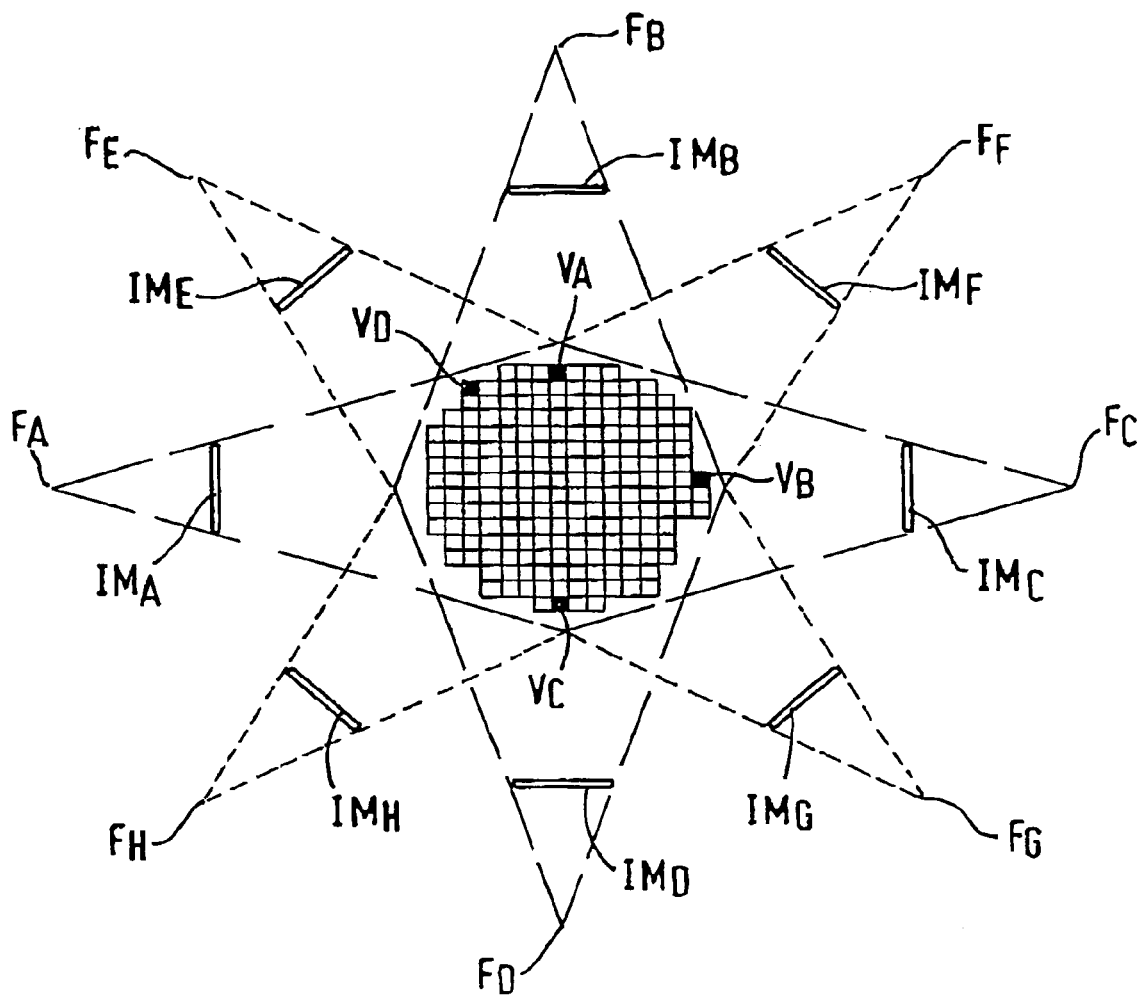
FIG. 25 shows a very schematic view similar to FIG. 8 for use in explaining the effect of adding further images.

FIG. 25 shows a top plan view corresponding to FIG. 8 but part way into a voxel colouring process (so that some voxels have already been removed) to illustrate the effect of adding camera positions. The initial camera positions A to D are represented in FIG. 25 by the corresponding focal points FA to $F_D$ and the imaging areas $IM_A$ to $IM_D$ while additional camera positions E to H are represented in FIG. 25 by the focal points $F_E$ to $F_H$ and the imaging areas $IM_E$ to $IM_H$.

The effect of adding the four additional camera positions E to H will now be described for the four voxels VA to VD shown coloured black in FIG. 25. Thus, voxel VA is visible at only one of the original four camera positions, that is camera position B, because intervening voxels occlude voxel VA as far as the other three camera positions A, C and D are concerned. For example, voxel VX amongst others occludes voxel VA from camera position C. Similarly, voxel VD is visible only at camera position B of the four original camera positions while voxel VB is visible at camera positions C and D and voxel VC is visible at camera position A. Thus, when only the four camera positions A to D are provided, it is not possible to determine the photoconsistency of voxels VA and VC because they are only visible at a single camera position. In contrast, when the additional four camera positions E to H are added, voxel VA becomes visible at camera positions B, E and F while voxel VC becomes visible at camera positions D, G and H enabling the photoconsistency of these two voxels to be checked. Voxel VD is visible at two of the four original camera positions and so its photoconsistency can be checked without the additional camera positions. However, when the additional camera positions are added, voxel VD also becomes visible at camera position E so that the voxel VD is visible from three camera positions which should enable a more accurate determination as to whether the voxel VD forms part of the 3D object surface or not. Similarly, voxel VB which was visible at two of the original camera positions C and D becomes visible at four camera positions B, C, F and G when the four additional camera positions are added which should again enable greater accuracy in determining whether or not the voxel forms part of the 3D object surface.

In the arrangement shown in FIG. 25, the additional camera positions are provided intermediate the original four camera positions. A further additional camera position may, for example, be provided looking directly down onto the top of the object. The manner in which additional camera positions are added may be determined by the CPU 22 in accordance with a pre-stored algorithm. For example, as shown in FIG. 25, each set of additional camera positions may add a camera position intermediate each pair of adjacent camera positions. Alternatively or additionally, the addition of camera positions may be under the control of the user so that, for example, at step S307 in FIGS. 21 and 23, the user determines the selection of the additional image (and thus the camera position) on the basis of the current estimate of the 3D object surface. This enables the user to add additional camera positions at the points where he can see from visual inspection of the estimated 3D object surface that further information is required so as to better define the 3D object surface.

As can be seen, the likelihood of a voxel that is not actually on the surface of the 3D object being erroneously retained will reduce with increase in the number of images used. Thus, the methods described above enable further refinement of the generated 3D object surface so as to bring it into closer agreement with the actual 3D object surface without significantly increasing the amount of data that needs to be stored at any one time by the main processing unit.

As described above, a single new image is added for each successive voxel colouring process. However, instead of adding a single new image, a set of new images may be added. Thus, for example, images recorded at all or subsets of the additional camera positions shown in FIG. 25a may be added simultaneously at step S303 in FIG. 21 and step S303a in FIG. 23 and the further voxel colouring processes of steps S301a and S301b carried out using all simultaneously added new images.

In the embodiment described with reference to FIGS. 23 to 24b, where a set of previous images are retained for carrying out the further voxel colouring process, the set of previous images may consist simply of the last used x images or may consist of images that are strategically important in the voxel colouring process. These images may be selected by the user. Thus, for example, at step S303a in FIG. 23, the CPU 22 may display to the user on display 25 a message requesting the user to select from the currently stored images the images to be retained for the next voxel colouring process.

It will be appreciated that the initial voxel space defining process described above with reference to FIGS. 3 to 11 may be used with the voxel colouring process described with reference to FIGS. 12a and 12b, or FIGS. 12a and 12b as modified by FIG. 17 or FIG. 18 or the voxel colouring process as described above with reference to FIGS. 18 and 12b or any conventional voxel colouring process. Similarly, the iterative voxel colouring processes described above with reference to FIGS. 21 to 22a or 23 to 24 may be used in combination with the modifications described above with reference to FIGS. 15, 17 and 18.

The voxel colouring processes described above with reference to FIGS. 12a, 12b and 15, FIGS. 12a, 12b and 17 or FIGS. 18 and 12b may be used where the initial voxel space is defined in the manner described in the aforementioned University of Rochester Computer Sciences Technical Report or any other conventional process for defining the initial voxel space, for example by setting the initial voxel space as a volume known by a user to be sufficiently large to encompass the object whose 3D surface is to be generated. Similarly, the iterative voxel colouring processes described above with reference to FIGS. 21 to 22b or FIGS. 23 to 24 may be used with such known initial voxel space defining techniques. The initial voxel space or resulting 3D object surface data may be downloaded onto a storage medium such as a disc or supplied as a signal over, for example, a network.

Once the 3D object surface has been generated and stored by the CPU in the mass-storage system 25, then, if desired or required, the texture data generation module 14 shown in FIG. 1 may be used to generate texture data from the input image data showing the object for rendering the 3D object surface produced as described above. The texture data generation module may form part of the same image processing apparatus or may be provided by a separate image processing apparatus to which the 3D object surface data is downloaded from a storage medium or supplied as a signal.

It will, of course, be appreciated that the focal length of a camera may be so long that, in practice, the viewing cone of the camera can be represented by a viewing volume in which the rays defining the viewing volume are parallel or substantially parallel to one another.

The present application incorporates by cross-reference the full contents of the following applications of the assignee which are being filed simultaneously herewith:

Attorney reference CFP1793US (2636550) which claims priority from UK applications 9927876.4, 9927875.6, 0019081.9 and 0019122.1.

Attorney reference CFP1796US (2641950) which claims priority from UK applications 9927906.9, 9927907.7, 9927909.3, 0019080.1, 0019087.6 and 0019086.8.

Attorney reference CFP1800US (2635850) which claims priority from UK applications 0001300.3, 0001479.5, 0018492.9, 0019120.5, 0019082.7 and 0019089.2.

Annex A

1 Corner Detection 1.1 Summary

This process described below calculates corner points, to sub-pixel accuracy, from a single grey scale or colour image. It does this by first detecting edge boundaries in the image and then choosing corner points to be points where a strong edge changes direction rapidly. The method is based on the facet model of corner detection, described in Haralick and Shapiro[i].

1.2 Algorithm

The algorithm has four stages:
(1) Create grey scale image (if necessary);
(2) Calculate edge strengths and directions;
(3) Calculate edge boundaries;
(4) Calculate corner points.

1.2.1 Create Grey Scale Image

The corner detection method works on grey scale images. For colour images, the colour values are first converted to floating point grey scale values using the formula:

$$grey\_scale=(0.3\times red)+(0.59\times green)+(0.11\times blue) \quad \text{A-1}$$

This is the standard definition of brightness as defined by NTSC and described in Foley and van Dam[ii].

1.2.2 Calculate Edge Strengths and Directions

The edge strengths and directions are calculated using the 7×7 integrated directional derivative gradient operator discussed in section 8.9 of Haralick and Shapiro[i].

The row and column forms of the derivative operator are both applied to each pixel in the grey scale image. The results are combined in the standard way to calculate the edge strength and edge direction at each pixel.

The output of this part of the algorithm is a complete derivative image.

1.2.3 Calculate Edge Boundaries

The edge boundaries are calculated by using a zero crossing edge detection method based on a set of 5×5 kernels describing a bivariate cubic fit to the neighbourhood of each pixel.

The edge boundary detection method places an edge at all pixels which are close to a negatively sloped zero crossing of the second directional derivative taken in the direction of the gradient, where the derivatives are defined using the bivariate cubic fit to the grey level surface. The subpixel location of the zero crossing is also stored along with the pixel location.

The method of edge boundary detection is described in more detail in section 8.8.4 of Haralick and Shapiro[i].

1.2.4 Calculate Corner Points

The corner points are calculated using a method which uses the edge boundaries calculated in the previous step.

Corners are associated with two conditions:
(1) the occurrence of an edge boundary; and
(2) significant changes in edge direction.

Each of the pixels on the edge boundary is tested for "cornerness" by considering two points equidistant to it along the tangent direction. If the change in the edge direction is greater than a given threshold then the point is labelled as a corner. This step is described in section 8.10.1 of Haralick and Shapiro[i].

Finally the corners are sorted on the product of the edge strength magnitude and the change of edge direction. The top 200 corners which are separated by at least 5 pixels are output.

2. Feature Tracking 2.1 Summary

This process described below tracks feature points (typically corners) across a sequence of grey scale or colour images.

The tracking method uses a constant image velocity Kalman filter to predict the motion of the corners, and a correlation based matcher to make the measurements of corner correspondences.

The method assumes that the motion of corners is smooth enough across the sequence of input images that a constant velocity Kalman filter is useful, and that corner measurements and motion can be modelled by gaussians.

2.2 Algorithm

1) Input corners from an image.
2) Predict forward using Kalman filter.
3) If the position uncertainty of the predicted corner is greater than a threshold, $\Delta$, as measured by the state positional variance, drop the corner from the list of currently tracked corners.
4) Input a new image from the sequence.
5) For each of the currently tracked corners:
   a) search a window in the new image for pixels which match the corner;
   b) update the corresponding Kalman filter, using any new observations (i.e. matches).
6) Input the corners from the new image as new points to be tracked (first, filtering them to remove any which are too close to existing tracked points).

7) Go back to (2)

2.2.1 Prediction

This uses the following standard Kalman filter equations for prediction, assuming a constant velocity and random uniform gaussian acceleration model for the dynamics:

$$X_{n+1} = \Theta_{n+1,n} X_n \qquad \text{A-2}$$

$$K_{n+1} = \Theta_{n+1,n} K_n \Theta_{n+1,n}{}^T + Q_n \qquad \text{A-3}$$

where X is the 4D state of the system, (defined by the position and velocity vector of the corner), K is the state covariance matrix, $\Theta$ is the transition matrix, and Q is the process covariance matrix.

In this model, the transition matrix and process covariance matrix are constant and have the following values:

$$\Theta_{n+1,n} = \begin{pmatrix} I & I \\ 0 & I \end{pmatrix} \qquad \text{A-4}$$

$$Q_n = \begin{pmatrix} 0 & 0 \\ 0 & \sigma_v^2 I \end{pmatrix} \qquad \text{A-5}$$

2.2.2 Searching and Matching

This uses the positional uncertainty (given by the top two diagonal elements of the state covariance matrix, K) to define a region in which to search for new measurements (i.e. a range gate).

The range gate is a rectangular region of dimensions:

$$\Delta x = \sqrt{K_{11}}, \Delta y = \sqrt{K_{22}} \qquad \text{A-6}$$

The correlation score between a window around the previously measured corner and each of the pixels in the range gate is calculated.

The two top correlation scores are kept.

If the top correlation score is larger than a threshold, $C_0$, and the difference between the two top correlation scores is larger than a threshold, $\Delta C$, then the pixel with the top correlation score is kept as the latest measurement.

2.2.3 Update

The measurement is used to update the Kalman filter in the standard way:

$$G = KH^T(HKH^T + R)^{-1} \qquad \text{A-7}$$

$$X \to X + G(X - HX) \qquad \text{A-8}$$

$$K \to (I - GH)K \qquad \text{A-9}$$

where G is the Kalman gain, H is the measurement matrix, and R is the measurement covariance matrix.

In this implementation, the measurement matrix and measurement covariance matrix are both constant, being given by:

$$H = (I0) \qquad \text{A-10}$$

$$R = \sigma^2 I \qquad \text{A-11}$$

2.2.4 Parameters

The parameters of the algorithm are:
Initial conditions: $X_0$ and $K_0$.
Process velocity variance: $\sigma_v^2$.
Measurement variance: $\sigma^2$.
Position uncertainty threshold for loss of track: $\Delta$.
Covariance threshold: $C_0$.
Matching ambiguity threshold: $\Delta C$.

For the initial conditions, the position of the first corner measurement and zero velocity are used, with an initial covariance matrix of the form:

$$K_0 = \begin{pmatrix} 0 & 0 \\ 0 & \sigma_0^2 I \end{pmatrix} \qquad \text{A-12}$$

$\sigma_0^2$ is set to $\sigma_0^2 (\text{pixels/frame})^2$.

The algorithm's behaviour over a long sequence is anyway not too dependent on the initial conditions.

The process velocity variance is set to the fixed value of 50 (pixels/frame)$^2$. The process velocity variance would have to be increased above this for a hand-held sequence. In fact it is straightforward to obtain a reasonable value for the process velocity variance adaptively.

The measurement variance is obtained from the following model:

$$\sigma^2 = (rK + a) \qquad \text{A-13}$$

where $K = \sqrt{(K_{11} K_{22})}$ is a measure of the positional uncertainty, "r" is a parameter related to the likelihood of obtaining an outlier, and "a" is a parameter related to the measurement uncertainty of inliers. "r" and "a" are set to r=0.1 and a=1.0.

This model takes into account, in a heuristic way, the fact that it is more likely that an outlier will be obtained if the range gate is large.

The measurement variance (in fact the full measurement covariance matrix R) could also be obtained from the behaviour of the auto-correlation in the neighbourhood of the measurement. However this would not take into account the likelihood of obtaining an outlier.

The remaining parameters are set to the values: $\Delta=400$ pixels$^2$, $C_0=0.9$ and $\Delta C=0.001$.

3. 3D Surface Generation

3.1 Architecture

In the method described below, it is assumed that the object can be segmented from the background in a set of images completely surrounding the object. Although this restricts the generality of the method, this constraint can often be arranged in practice, particularly for small objects.

The method consists of five processes, which are run consecutively:

First, for all the images in which the camera positions and orientations have been calculated, the object is segmented from the background, using colour information. This produces a set of binary images, where the pixels are marked as being either object or background.

The segmentations are used, together with the camera positions and orientations, to generate a voxel carving, consisting of a 3D grid of voxels enclosing the object. Each of the voxels is marked as being either object or empty space.

The voxel carving is turned into a 3D surface triangulation, using a standard triangulation algorithm (marching cubes).

The number of triangles is reduced substantially by passing the triangulation through a decimation process.

Finally the triangulation is textured, using appropriate parts of the original images to provide the texturing on the triangles.

3.2 Segmentation

The aim of this process is to segment an object (in front of a reasonably homogeneous coloured background) in an image using colour information. The resulting binary image is used in voxel carving.

Two alternative methods are used:

Method 1: input a single RGB colour value representing the background colour—each RGB pixel in the image is examined and if the Euclidean distance to the background colour (in RGB space) is less than a specified threshold the pixel is labelled as background (BLACK).

Method 2: input a "blue" image containing a representative region of the background.

The algorithm has two stages:
(1) Build a hash table of quantised background colours
(2) Use the table to segment each image.

Step 1) Build hash table

Go through each RGB pixel, "p", in the "blue" background image.

Set "q" to be a quantised version of "p". Explicitly:

$$q = (p + t/2)/t \qquad \text{A-14}$$

where "t" is a threshold determining how near RGB values need to be to background colours to be labelled as background.

The quantisation step has two effects:
1) reducing the number of RGB pixel values, thus increasing the efficiency of hashing;
2) defining the threshold for how close an RGB pixel has to be to a background colour pixel to be labelled as background.

q is now added to a hash table (if not already in the table) using the (integer) hashing function:

$$h(q) = (q\_red \ \& \ 7)*2^6 + (q\_green \ \& \ 7)*2^3 + (q\_blue \ \& \ 7) \qquad \text{A-15}$$

That is, the 3 least significant bits of each colour field are used. This function is chosen to try and spread out the data into the available bins. Ideally each bin in the hash table has a small number of colour entries. Each quantised colour RGB triple is only added once to the table (the frequency of a value is irrelevant).

Step 2) Segment each image

Go through each RGB pixel, "v", in each image.

Set "w" to be the quantised version of "v" as before.

To decide whether "w" is in the hash table, explicitly look at all the entries in the bin with index h(w) and see if any of them are the same as "w". If yes, then "v" is a background pixel—set the corresponding pixel in the output image to BLACK. If no then "v" is a foreground pixel—set the corresponding pixel in the output image to WHITE.

Post processing: for both methods a post process is performed to fill small holes and remove small isolated regions.

A median filter is used with a circular window. (A circular window is chosen to avoid biasing the result in the x or y directions.)

Build a circular mask of radius "r". Explicitly store the start and end values for each scan line on the circle.

Go through each pixel in the binary image.

Place the centre of the mask on the current pixel. Count the number of BLACK pixels and the number of WHITE pixels in the circular region.

If (#WHITE pixels≧#BLACK pixels) then set corresponding output pixel to WHITE. Otherwise output pixel is BLACK.

3.3. Voxel carving

The aim of this process is to produce a 3D voxel grid, enclosing the object, with each of the voxels marked as either object or empty space.

The input to the algorithm is:
a set of binary segmentation images, each of which is associated with a camera position and orientation;
2 sets of 3D co-ordinates, (xmin, ymin, zmin) and (xmax, ymax, zmax), describing the opposite vertices of a cube surrounding the object;
a parameter, "n", giving the number of voxels required in the voxel grid.

A pre-processing step calculates a suitable size for the voxels (they are cubes) and the 3D locations of the voxels, using "n", (xmin, ymin, zmin) and (xmax, ymax, zmax).

Then, for each of the voxels in the grid, the mid-point of the voxel cube is projected into each of the segmentation images. If the projected point falls onto a pixel which is marked as background, on any of the images, then the corresponding voxel is marked as empty space, otherwise it is marked as belonging to the object.

Voxel carving is described further in "Rapid Octree Construction from Image Sequences" by R. Szeliski in CVGIP: Image Understanding, Volume 58, Number 1, July 1993, pages 23–32.

3.4 Marching Cubes

The aim of the process is to produce a surface triangulation from a set of samples of an implicit function representing the surface (for instance a signed distance function). In the case where the implicit function has been obtained from a voxel carve, the implicit function takes the value −1 for samples which are inside the object and +1 for samples which are outside the object.

Marching cubes is an algorithm that takes a set of samples of an implicit surface (e.g. a signed distance function) sampled at regular intervals on a voxel grid, and extracts a triangulated surface mesh. Lorensen and Cline[iii] and Bloomentahl[iv] give details on the algorithm and its implementation.

The marching-cubes algorithm constructs a surface mesh by "marching" around the cubes while following the zero crossings of the implicit surface f(x)=0, adding to the triangulation as it goes. The signed distance allows the marching-cubes algorithm to interpolate the location of the surface with higher accuracy than the resolution of the volume grid. The marching cubes algorithm can be used as a continuation method (i.e. it finds an initial surface point and extends the surface from this point).

3.5 Decimation

The aim of the process is to reduce the number of triangles in the model, making the model more compact and therefore easier to load and render in real time.

The process reads in a triangular mesh and then randomly removes each vertex to see if the vertex contributes to the shape of the surface or not. (i.e. if the hole is filled, is the vertex a "long" way from the filled hole). Vertices which do not contribute to the shape are kept out of the triangulation. This results in fewer vertices (and hence triangles) in the final model.

The algorithm is described below in pseudo-code.

INPUT
Read in vertices
Read in triples of vertex IDs making up triangles
PROCESSING
Repeat NVERTEX times
   Choose a random vertex, V, which hasn't been chosen before
   Locate set of all triangles having V as a vertex, S
   Order S so adjacent triangles are next to each other
   Re-triangulate triangle set, ignoring V (i.e. remove selected triangles & V and then fill in hole)
   Find the maximum distance between V and the plane of each triangle
   If (distance<threshold)
   Discard V and keep new triangulation
   Else
   Keep V and return to old triangulation
OUTPUT
Output list of kept vertices
Output updated list of triangles The process therefore combines adjacent triangles in the model produced by the marching cubes algorithm, if this can be done without introducing large errors into the model.

The selection of the vertices is carried out in a random order in order to avoid the effect of gradually eroding a large part of the surface by consecutively removing neighbouring vertices.

3.6 Further Surface Generation Techniques

Further techniques which may be employed to generate a 3D computer model of an object surface include voxel colouring, for example as described in "Photorealistic Scene Reconstruction by Voxel Coloring" by Seitz and Dyer in Proc. Conf. Computer Vision and Pattern Recognition 1997, p1067–1073, "Plenoptic Image Editing" by Seitz and Kutulakos in Proc. 6th International Conference on Computer Vision, pp 17–24, "What Do N Photographs Tell Us About 3D Shape?" by Kutulakos and Seitz in University of Rochester Computer Sciences Technical Report 680, January 1998, and "A Theory of Shape by Space Carving" by Kutulakos and Seitz in University of Rochester Computer Sciences Technical Report 692, May 1998.

4. Texturing

The aim of the process is to texture each surface polygon (typically a triangle) with the most appropriate image texture. The output of the process is a VRML model of the surface, complete with texture co-ordinates.

The triangle having the largest projected area is a good triangle to use for texturing, as it is the triangle for which the texture will appear at highest resolution.

A good approximation to the triangle with the largest projected area, under the assumption that there is no substantial difference in scale between the different images, can be obtained in the following way.

For each surface triangle, the image "i" is found such that the triangle is the most front facing (i.e. having the greatest value for $\hat{n}_t \cdot \hat{v}_i$, where $\hat{n}_t$ is the triangle normal and $\hat{v}_i$ is the viewing direction for the "i"th camera). The vertices of the projected triangle are then used as texture co-ordinates in the resulting VRML model.

This technique can fail where there is a substantial amount of self-occlusion, or several objects occluding each other. This is because the technique does not take into account the fact that the object may occlude the selected triangle. However, in practice this does not appear to be much of a problem.

It has been found that, if every image is used for texturing then this can result in very large VRML models being produced. These can be cumbersome to load and render in real time. Therefore, in practice, a subset of images is used to texture the model. This subset may be specified in a configuration file.

REFERENCES i R M Haralick and L G Shapiro: "Computer and Robot Vision Volume 1", Addison-Wesley, 1992, ISBN 0-201-10877-1 (v.1), section 8.

ii J Foley, A van Dam, S Feiner and J Hughes: "Computer Graphics: Principles and Practice", Addison-Wesley, ISBN 0-201-12110-7.

iii W. E. Lorensen and H. E. Cline: "Marching Cubes: A High Resolution 3D Surface Construction Algorithm", in Computer Graphics, SIGGRAPH 87 proceedings, 21: 163–169, July 1987.

iv J. Bloomenthal: "An Implicit Surface Polygonizer", Graphics Gems IV, AP Professional, 1994, ISBN 0123361559, pp 324–350.

What is claimed is:

1. In an image processing apparatus having a processor for processing image data representing images of an object taken from a plurality of different camera positions, a method of processing image data to derive a representation of a three-dimensional surface of the object, the method comprising the steps of:
   (a) defining an initial volume containing the object surface as an initial space formed of voxels;
   (b) accessing data representing images of the object recorded at different camera positions with respect to the object;
   (c) checking to see if a voxel meets at least one criterion by projecting that voxel into at least one of the images;
   (d) dividing, if the voxel does not meet the at least one criterion, the voxel into subsidiary voxels; and
   (e) checking to see if the subsidiary voxels meet at least one criterion by projecting the subsidiary voxels into at least one of the image,
   wherein the at least one criterion comprises any one or more of the following:
   1) a color variance in a pixel patch to which the voxel projects in an image has a value lower than a predetermined value;
   2) a difference in color or average color between pixel patches to which the voxel projects in different images has a standard deviation less than a predetermined value; and
   3) the voxel is not partially occluded by a voxel or subsidiary voxels of smaller size than the voxel.

2. A method according to claim 1, further comprising deciding that a sub-voxel does not form part of the three-dimensional surface and so should be removed if the sub-voxel does not meet the at least one criterion.

3. A method according to claim 1, further comprising repeating steps c, d and e for any sub-voxel that does not meet the at least one criterion.

4. A method according to claim 1, further comprising:
   accessing data representing a further image of the object recorded at different camera position; and then repeating steps of claim 1 using that further image.

5. A method according to claim 1, further comprising:
accessing data representing a set of images consisting of a sub-set of the images accessed at step (b) and a further image of the object recorded at a different camera position; and
repeating steps of claim 1 using that set of images.

6. In an image processing apparatus having a processor for processing image data representing images of an object taken from a plurality of different camera positions, a method of processing image data to derive a representation of a three-dimensional surface of the object, the method comprising the steps of:
(a) defining an initial volume containing the object surface as an initial space formed of voxels;
(b) accessing data representing images of the object recorded at different camera positions with respect to the object;
(c) determining the area corresponding to a given voxel in each image in which the voxel is visible;
(d) comparing characteristics of each of the image areas corresponding to the given voxel;
(e) deriving from the compared characteristics a value representing the degree of any inconsistency between the characteristics of the image areas corresponding to the given voxel; and
(f) sub-dividing a voxel into subsidiary voxels in response to the derived value exceeding a threshold value and repeating steps (c) to (e) for each subsidiary voxel.

7. A method according to claim 6, further comprising:
(g) in response to a subsidiary voxel having a derived value exceeding a threshold value and a size greater than a minimum size, sub-dividing that subsidiary voxel into subsidiary voxels and repeating steps (c) to (e) for each subsidiary voxel of that subsidiary voxel; and
(h) removing any subsidiary voxel of the minimum size having a derived value exceeding the threshold value.

8. A method according to claim 6, which comprises repeating steps (c) to (h) until the degree of inconsistency for all non-occluded voxels and subsidiary voxels is below a predetermined value.

9. In an image processing apparatus having a processor for processing image data representing images of an object taken from a plurality of different camera positions, a method of processing image data to derive a representation of a three-dimensional surface of the object, the method comprising the steps of:
(a) defining an initial volume containing the object surface as an initial space formed of voxels;
(b) determining the area corresponding to a voxel in each image in which that voxel is visible;
(c) comparing characteristics of each of the image areas corresponding to the voxel to derive a value representing the degree of any inconsistency between the characteristics of the image areas corresponding to the voxel, and when the derived value for a voxel exceeds a threshold value,
(i) sub-dividing the voxel into subsidiary voxels;
(ii) determining the region corresponding to each sub-voxel in each image in which that sub-voxel is visible;
(iii) comparing characteristics of the image regions; and
(iv) removing the voxel only if there is no set of regions which contains a region from each image and for which the characteristics are not inconsistent.

10. In an image processing apparatus for processing image data representing images of an object taken from a plurality of different camera positions to derive a representation of a three-dimensional surface of the object, the apparatus comprising:
means for defining an initial volume containing the object surface as an initial space formed of voxels;
means for accessing data representing images of the object recorded at different camera positions with respect to the object; and
processor means operable:
(c) to check to see if a voxel meets at least one criterion by projecting that voxel into at least one of the images;
(d) if the voxel does not meet the at least one criterion, to divide the voxel into subsidiary voxels; and
(e) to check to see if the subsidiary voxels meets at least one criterion by projecting the subsidiary voxels into at least one of the images,
wherein the at least one criterion comprises any one or more of the following:
1) the color variance in a pixel patch to which the voxel projects in an image has a value lower than a predetermined value;
2) the difference in color or average color between pixel patches to which the voxel projects in different images has a standard deviation less than a predetermined value; and
3) the voxel is not partially occluded by a voxel or subsidiary voxels of smaller size than the voxel.

11. An apparatus according to claim 10, wherein said processor means is operable to decide that a sub-voxel does not form part of the three-dimensional surface and so should be removed if the sub-voxel does not meets the at least one criterion.

12. An apparatus according to claim 10, wherein said processor means is operable to repeat c, d and e for any sub-voxel that does not meet the at least one criterion.

13. An apparatus according to claim 10, wherein said processor means is also operable to access data representing a further image of the object recorded at a different camera position and then to repeat steps set out in claim 10 using that further image.

14. An apparatus according to claim 10, wherein said processor means is also operable to access data representing a set of images consisting of a sub-set of images previously accessed and a further image of the object recorded at a different camera position and then to repeat the steps set out in claim 10 using that set of images.

15. An apparatus according to claim 10, wherein said processor means is further operable:
to determine the viewing volume for each camera position;
to determine the volume bounded by the intersection of the viewing volumes; and
to set the bounded volume as an initial space for use in deriving a representation of the three-dimensional surface of the object using the images.

16. An image processing apparatus for processing image data representing images of an object taken from a plurality of different camera positions to derive a representation of a three-dimensional surface of the object, the apparatus comprising:
means for defining an initial volume containing the object surface as an initial space formed of voxels;

means for accessing data representing images of the object recorded at different camera positions with respect to the object; and processor means operable:
(i) to determine the area corresponding to a given voxel in each image in which the voxel is visible;
(ii) to compare characteristics of each of the image areas corresponding to the given voxel;
(iii) to derive from the compared characteristics a value representing the degree of any inconsistency between the characteristics of the image areas corresponding to the given voxel;
(iv) to sub-divide a voxel into subsidiary voxels in response to the derived value exceeding a threshold value and to repeat steps (i) to (iii) for each subsidiary voxel;
(v) in response to a subsidiary voxel having a derived value exceeding a threshold value and a size greater than a minimum size, to sub-divide that subsidiary voxel into subsidiary voxels and to repeat (i) to (iii) for each subsidiary voxel of that subsidiary voxel;
(vi) to remove any subsidiary voxel of the minimum size having a derived value exceeding the threshold value; and
(vii) to repeat (i) to (vi) for each voxel that is not occluded by another voxel to provide a representation of the three-dimensional object surface consisting of the remaining non-occluded voxels and subsidiary voxels.

17. An apparatus according to claim 16, wherein said processor means is operable to repeat (i) to (vi) until the degree of inconsistency for all non-occluded voxels is below a predetermined value.

18. An apparatus according to claim 16, wherein said processor means is operable to compare characteristics of each of the image areas corresponding to the same voxel by comparing the colors of each of the image areas.

19. An image processing apparatus for processing image data representing images of an object taken from a plurality of different camera positions, a method of processing image data to derive a representation of a three-dimensional surface of the object, the apparatus comprising:

means for defining an initial volume containing the object surface as an initial space formed of voxels;
means for accessing data representing images of the object recorded at different camera positions with respect to the object; and
processor means operable:
(a) to determine the area corresponding to a voxel in each image in which that voxel is visible;
(b) to compare characteristics of each of the image areas corresponding to the same voxel; and
(c) to derive from the compared characteristics a value representing the degree of any inconsistency between the characteristics of the image areas corresponding to the voxel and, when the derived value for a voxel exceeds a threshold value,
(i) to sub-divide the voxel into subsidiary voxels,
(ii) to determine the region corresponding to each sub-voxel in each image in which that sub-voxel is visible,
(iii) to compare characteristics of the image regions, and
(iv) to remove the voxel only if there is no set of regions which contains a region from each image and for which the characteristics are not inconsistent.

20. In an image processing system for processing image data defining images of an object to generate a three-dimensional computer model of the object by determining camera positions at which the images were recorded and using the images and the camera positions to generate the three-dimensional computer model, a method of processing the image data to derive a representation of a three-dimensional surface of the object, the method comprising the steps of:

(a) defining an initial volume containing the object surface as an initial space formed of voxels;
(b) accessing data representing images of the object recorded at different camera positions with respect to the object;
(c) checking to see if a voxel meets at least one criterion by projecting that voxel into at least one of the images;
(d) if the voxel does not meet the at least one criterion, dividing the voxel into subsidiary voxels; and
(e) then checking to see if the subsidiary voxels meets at least one criterion by projecting the subsidiary voxels into at least one of the images,
wherein the at least one criterion comprises any one or more of the following:
1) a color variance in a pixel patch to which the voxel projects in an image having a value lower than a predetermined value;
2) a difference in color or average color between pixel patches to which the voxel projects in different images having a standard deviation less than a predetermined value; and
3) the voxel is not partially occluded by a another voxel or subsidiary voxels of a smaller size than the voxel.

21. In an image processing system for processing image data defining images of an object to generate a three-dimensional computer model of the object by determining camera positions at which the images were recorded and using the images and the camera positions to generate the three-dimensional computer model, a method of processing the image data to derive a representation of a three-dimensional surface of the object, the method comprising the steps of:

(a) defining an initial volume containing the object surface as an initial space formed of voxels;
(b) accessing data representing images of the object recorded at different camera positions with respect to the object;
(c) determining the area corresponding to a given voxel in each image in which the voxel is visible;
(d) comparing characteristics of each of the image areas corresponding to the given voxel;
(e) deriving from the compared characteristics a value representing the degree of any inconsistency between the characteristics of the image areas corresponding to the given voxel;
(f) sub-dividing a voxel into subsidiary voxels in response to the derived value exceeding a threshold value and repeating steps (c) to (e) for each subsidiary voxel;
(g) in response to a subsidiary voxel having a derived value exceeding a threshold value and a size greater than a minimum size, sub-dividing that subsidiary voxel into subsidiary voxels and repeating steps (c) to (e) for each subsidiary voxel of that subsidiary voxel;
(h) removing any subsidiary voxel of the minimum size having a derived value exceeding the threshold value; and
(i) repeating steps (c) to (h) for each voxel that is not occluded by another voxel to provide a representation of the three-dimensional object surface consisting of the remaining non-occluded voxels and subsidiary voxels.

22. In a method of processing image data defining images of an object to generate a three-dimensional computer model of the object by determining camera positions at which the images were recorded and using the images and the camera positions to generate the three-dimensional computer model, an improvement comprising processing the image data to derive a computer representation of a three-dimensional surface of the object by:
   (a) defining an initial volume containing the object surface as an initial space formed of voxels;
   (b) accessing data representing images of the object recorded at different camera positions with respect to the object;
   (c) determining the area corresponding to a given voxel in each image in which the voxel is visible;
   (d) comparing characteristics of each of the image areas corresponding to the given voxel;
   (e) deriving from the compared characteristics a value representing the degree of any inconsistency between the characteristics of the image areas corresponding to the given voxel;
   (f) sub-dividing a voxel into subsidiary voxels in response to the derived value exceeding a threshold value and repeating steps (c) to (e) for each subsidiary voxel;
   (g) in response to a subsidiary voxel having a derived value exceeding a threshold value and a size greater than a minimum size, sub-dividing that subsidiary voxel into subsidiary voxels and repeating steps (c) to (e) for each subsidiary voxel of that subsidiary voxel;
   (h) removing any subsidiary voxel of the minimum size having a derived value exceeding the threshold value; and
   (i) repeating steps (c) to (h) for each voxel that is not occluded by another voxel to provide a representation of the three-dimensional object surface consisting of the remaining non-occluded voxels and subsidiary voxels.

23. In a method of processing image data defining images of an object to generate a three-dimensional computer model of the object by determining camera positions at which the images were recorded and using the images and the camera positions at which the images were recorded and using the images and the camera positions to generate the three-dimensional computer model, a method for processing the image data to derive a computer representation of a three-dimensional surface of the object by:
   (a) defining an initial volume containing the object surface as an initial space formed of voxels;
   (b) accessing data representing images of the object recorded at different camera positions with respect to the object;
   (c) determining the area corresponding to a given voxel in each image in which that voxel is visible;
   (d) comparing characteristics of each of the image areas corresponding to the given voxel;
   (e) deriving from the compared characteristics a value representing the degree of any inconsistency between the characteristics of the image areas corresponding to the given voxel;
   (f) sub-dividing a voxel into subsidiary voxels in response to the derived value exceeding a threshold value and repeating steps (c) to (e) for each subsidiary voxel;
   (g) removing any subsidiary voxel having a derived value exceeding a threshold value; and
   (h) repeating steps (c) to (g) for each voxel that is not occluded by another voxel to provide a representation of the three-dimensional object surface consisting of the remaining non-occluded voxels and subsidiary voxels.

24. In a method of processing image data defining images of an object to generate a three-dimensional computer model of the object by determining camera positions at which the images were recorded and using the images and the camera positions to generate the three-dimensional computer model, a method for processing the image data to derive a computer representation of a three-dimensional surface of the object by:
   (a) defining an initial volume containing the object surface as an initial space formed of voxels;
   (b) accessing data representing images of the object recorded at different camera positions with respect to the object;
   (c) determining the area corresponding to a given voxel in each image in which the voxel is visible;
   (d) comparing characteristics of each of the image areas corresponding to the given voxel;
   (e) deriving from the compared characteristics a value representing the degree of any inconsistency between the characteristics of the image areas corresponding to the given voxel;
   (f) sub-dividing a voxel into subsidiary voxels in response to the derived value exceeding a threshold value and repeating steps (c) to (e) for each subsidiary voxel;
   (g) in response to a subsidiary voxel having a derived value exceeding a threshold value and a size greater than a minimum size, sub-dividing that subsidiary voxel into subsidiary voxels and repeating steps (c) to (e) for each subsidiary voxel of that subsidiary voxel;
   (h) removing any subsidiary voxel of the minimum size having a derived value exceeding the threshold value; and
   (i) repeating steps (c) to (h) for each voxel that is not occluded by another voxel to provide a representation of the three-dimensional object surface consisting of the remaining non-occluded voxels and subsidiary voxels.

25. In an image processing system for processing image data defining images of an object to generate a three-dimensional computer model of the object by determining camera positions at which the images were recorded and by using the images and the camera positions to generate the three-dimensional computer model, an apparatus for processing image data representing images of an object taken from a plurality of different camera positions to derive a representation of a three-dimensional surface of the object, the apparatus comprising a processor configured by processor instructions to operate:
   (a) to define an initial volume containing the object surface as an initial space formed of voxels;
   (b) to access data representing images of the object recorded at different camera positions with respect to the object;
   (c) to check to see if a voxel meets at least one criterion by projecting that voxel into at least one of the images;
   (d) if the voxel does not meet the at least one criterion, to divide the voxel into subsidiary voxels; and
   (e) then to check to see if the subsidiary voxels meets at least one criterion by projecting the subsidiary voxels into at least one of the images,
   wherein the at least one criterion comprises any one or more of the following:

1) a color variance in a pixel patch to which the voxel projects in an image having a value lower than a predetermined value;
2) a difference in color or average color between pixel patches to which the voxel projects in different images having a standard deviation less than a predetermined value; and
3) the voxel is not partially occluded by a another voxel or subsidiary voxels of a smaller size than the voxel.

26. In an image processing system for processing image data defining images of an object to generate a three-dimensional computer model of the object by determining camera positions at which the images were recorded and by using the images and the camera positions to generate the three-dimensional computer model, an apparatus for processing image data representing images of an object taken from a plurality of different camera positions to derive a representation of a three-dimensional surface of the object, the apparatus comprising a processor configured by processor instructions:

(a) to define an initial volume containing the object surface as an initial space formed of voxels;
(b) to access data representing images of the object recorded at different camera positions with respect to the object;
(c) to determine the area corresponding to a given voxel in each image in which the voxel is visible;
(d) to compare characteristics of each of the image areas corresponding to the given voxel;
(e) to derive from the compared characteristics a value representing the degree of any inconsistency between the characteristics of the image areas corresponding to the given voxel;
(f) to sub-divide a voxel into subsidiary voxels in response to the derived value exceeding a threshold value and repeating steps (c) to (e) for each subsidiary voxel;
(g) in response to a subsidiary voxel having a derived value exceeding a threshold value and a size greater than a minimum size, to sub-divide that subsidiary voxel into subsidiary voxels and to repeat steps (c) to (e) for each subsidiary voxel of that subsidiary voxel;
(h) to remove any subsidiary voxel of the minimum size having a derived value exceeding the threshold value; and
(i) to repeat steps (c) to (h) for each voxel that is not occluded by another voxel to provide a representation of the three-dimensional object surface consisting of the remaining non-occluded voxels and subsidiary voxels.

27. In an image processing system for processing image data defining images of an object to generate a three-dimensional computer model of the object by determining camera positions at which the images were recorded and by using the images and the camera positions to generate the three-dimensional computer model, an improvement comprising an apparatus for processing image data representing images of an object taken from a plurality of different camera positions to derive a representation of a three-dimensional surface of the object, the apparatus comprising a processor configured by processor instructions to operate:

(a) to define an initial volume containing the object surface as an initial space formed of voxels;
(b) to access data representing images of the object recorded at different camera positions with respect to the object;
(c) to determine the area corresponding to a given voxel in each image in which that voxel is visible;
(d) to compare characteristics of each of the image areas corresponding to the given voxel;
(e) to derive from the compared characteristics a value representing the degree of any inconsistency between the characteristics of the image areas corresponding to the given voxel;
(f) to sub-divide a voxel into subsidiary voxels in response to the derived value exceeding a threshold value and to repeat steps (c) to (e) for each subsidiary voxel;
(g) to remove any subsidiary voxel having a derived value exceeding a threshold value; and
(h) to repeat steps (c) to (g) for each voxel that is not occluded by another voxel to provide a representation of the three-dimensional object surface consisting of the remaining non-occluded voxels and subsidiary voxels.

28. In an image processing system for processing image data defining images of an object to generate a three-dimensional computer model of the object by determining camera positions at which the images were recorded and by using the images and the camera positions to generate the three-dimensional computer model, an improvement comprising an apparatus for processing image data representing images of an object taken from a plurality of different camera positions to derive a representation of a three-dimensional surface of the object, the apparatus comprising a processor configured by processor instructions:

(a) to define an initial volume containing the object surface as an initial space formed of voxels;
(b) to access data representing images of the object recorded at different camera positions with respect to the object;
(c) to determine the area corresponding to a given voxel in each image in which the voxel is visible;
(d) to compare characteristics of each of the image areas corresponding to the given voxel;
(e) to derive from the compared characteristics a value representing the degree of any inconsistency between the characteristics of the image areas corresponding to the given voxel;
(f) to sub-divide a voxel into subsidiary voxels in response to the derived value exceeding a threshold value and repeating steps (c) to (e) for each subsidiary voxel;
(g) in response to a subsidiary voxel having a derived value exceeding a threshold value and a size greater than a minimum size, to sub-divide that subsidiary voxel into subsidiary voxels and to repeat steps (c) to (e) for each subsidiary voxel of that subsidiary voxel;
(h) to remove any subsidiary voxel of the minimum size having a derived value exceeding the threshold value; and
(i) to repeat steps (c) to (h) for each voxel that is not occluded by another voxel to provide a representation of the three-dimensional object surface consisting of the remaining non-occluded voxels and subsidiary voxels.

29. In a method of processing image data defining images of an object to generate a three-dimensional computer model of the object by determining camera positions at which the images were recorded and using the images and camera positions to generate the three-dimensional computer model, an improvement comprising processing the image data to derive a computer representation of a three-dimensional surface of the object by:
- (a) defining an initial volume containing the object surface as an initial space formed of voxels;
- (b) accessing data representing images of the object recorded at different camera positions with respect to the object;
- (c) determining the area corresponding to a voxel in each image in which that voxel is visible;
- (d) comparing characteristics of each of the image areas corresponding to the same voxel; and
- (e) deriving from the compared characteristics a value representing the degree of any inconsistency between the characteristics of the image areas corresponding to the voxel; and, when the derived value for a voxel exceeds a threshold value:
  - (i) sub-dividing the voxel into subsidiary voxels;
  - (ii) determining the region corresponding to each sub-voxel in each image in which that sub-voxel is visible;
  - (iii) comparing characteristics of the image regions; and
  - (iv) removing the voxel only if there is no set of regions which contains a region from each image and for which the characteristics correspond.

30. In an image processing system for processing image data defining images of an object to generate a three-dimensional computer model of the object by determining camera positions at which the images were recorded and by using the images and the camera positions to generate the three-dimensional computer model, an apparatus for processing the image data to derive a computer representation of a three-dimensional surface of the object, the apparatus comprising a processor configured by processor instructions to operate:
- (a) to define an initial volume containing the object surface as an initial space formed of voxels;
- (b) to access data representing images of the object recorded at different camera positions with respect to the object;
- (c) to determine the area corresponding to a voxel in each image in which that voxel is visible;
- (d) to compare characteristics of each of the image areas corresponding to the same voxel; and
- (e) to derive from the compared characteristics a value representing the degree of any inconsistency between the characteristics of the image areas corresponding to the voxel; and, when the derived value for a voxel exceeds a threshold value:
  - (i) to sub-divide the voxel into subsidiary voxels;
  - (ii) to determine the region corresponding to each sub-voxel in each image in which that sub-voxel is visible;
  - (iii) to compare characteristics of the image regions; and
  - (iv) to remove the voxel only if there is no set of regions which contains a region from each image and for which the characteristics correspond.

31. In an image processing system for processing image data defining images of an object to generate a three-dimensional computer model of the object by determining camera positions at which the images were recorded and by using the images and the camera positions to generate the three-dimensional computer model, an improvement comprising an apparatus for processing the image data to derive a computer representation of a three-dimensional surface of the object, the apparatus comprising a processor configured by processor instructions to operate:
- (a) to define an initial volume containing the object surface as an initial space formed of voxels;
- (b) to access data representing images of the object recorded at different camera positions with respect to the object;
- (c) to determine the area corresponding to a voxel in each image in which that voxel is visible;
- (d) to compare characteristics of each of the image areas corresponding to the same voxel; and
- (e) to derive from the compared characteristics a value representing the degree of any inconsistency between the characteristics of the image areas corresponding to the voxel; and, when the derived value for a voxel exceeds a threshold value:
  - (i) to sub-divide the voxel into subsidiary voxels;
  - (ii) to determine the region corresponding to each sub-voxel in each image in which that sub-voxel is visible;
  - (iii) to compare characteristics of the image regions; and
  - (iv) to remove the voxel only if there is no set of regions which contains a region from each image and for which the characteristics correspond.

32. In an image processing apparatus for processing image data representing images of an object taken from a plurality of different camera positions to derive a representation of a three-dimensional surface of the object, the apparatus comprising:
- an initial volume definer for defining an initial volume containing the object surface as an initial space formed of voxels;
- a data accessor for accessing data representing images of the object recorded at different camera positions with respect to the object; and
- a processor operable:
  - (c) to check to see if a voxel meets at least one criterion by projecting that voxel into at least one of the images;
  - (d) if the voxel does not meet the at least one criterion, to divide the voxel into subsidiary voxels; and
  - (e) then to check to see if the subsidiary voxels meets at least one criterion by projecting the subsidiary voxels into at least one of the images,
- wherein the at least one criterion comprises any one or more of the following:
  1) a color variance in a pixel patch to which the voxel projects in an image having a value lower than a predetermined value;
  2) a difference in color or average color between pixel patches to which the voxel projects in different images having a standard deviation less than a predetermined value; and
  3) the voxel is not partially occluded by a another voxel or subsidiary voxels of a smaller size than the voxel.

33. An image processing apparatus for processing image data representing images of an object taken from a plurality of different camera positions to derive a representation of a three-dimensional surface of the object, the apparatus comprising:
- an initial volume definer for defining an initial volume containing the object surface as an initial space formed of voxels;
- a data accessor for accessing data representing images of the object recorded at different camera positions with respect to the object; and a processor operable:
- (i) to determine the area corresponding to a given voxel in each image in which the voxel is visible;
- (ii) to compare characteristics of each of the image areas corresponding to the given voxel;
- (iii) to derive from the compared characteristics a value representing the degree of any inconsistency between the characteristics of the image areas corresponding to the given voxel;
- (iv) to sub-divide a voxel into subsidiary voxels in response to the derived value exceeding a threshold value and to repeat steps (i) to (iii) for each subsidiary voxel;
- (v) in response to a subsidiary voxel having a derived value exceeding a threshold value and a size greater than a minimum size, to sub-divide that subsidiary voxel into subsidiary voxels and to repeat (i) to (iii) for each subsidiary voxel of that subsidiary voxel;
- (vi) to remove any subsidiary voxel of the minimum size having a derived value exceeding the threshold value; and
- (vii) to repeat (i) to (vi) for each voxel that is not occluded by another voxel to provide a representation of the three-dimensional object surface consisting of the remaining non-occluded voxels and subsidiary voxels.

34. An image processing apparatus for processing image data representing images of an object taken from a plurality of different camera positions, a method of processing image data to derive a representation of a three-dimensional surface of the object, the apparatus comprising:

an initial volume definer for defining an initial volume containing the object surface as an initial space formed of voxels;

a data accessor for accessing data representing images of the object recorded at different camera positions with respect to the object; and a processor operable:
- (a) to determine the area corresponding to a voxel in each image in which that voxel is visible;
- (b) to compare characteristics of each of the image areas corresponding to the same voxel; and
- (c) to derive from the compared characteristics a value representing the degree of any inconsistency between the characteristics of the image areas corresponding to the voxel and, when the derived value for a voxel exceeds a threshold value,
  - (i) to sub-divide the voxel into subsidiary voxels,
  - (ii) to determine the region corresponding to each sub-voxel in each image in which that sub-voxel is visible,
  - (iii) to compare characteristics of the image regions, and
  - (iv) to remove the voxel only if there is no set of regions which contains a region from each image, and for which the characteristics are not inconsistent.

35. In an image processing apparatus for processing image data representing images of an object taken from a plurality of different camera positions to derive a representation of a three-dimensional surface of the object, the apparatus comprises:

means for defining an initial volume containing the object surface as an initial space formed of voxels;

means for accessing data representing images of the object recorded at different camera positions with respect to the object; and processor means operable:
- (a) to check to see if a voxel meets at least one criterion by projecting that voxel into at least one of the images;
- (b) to divide, if the voxel does not meet the at least one criterion, the voxel into subsidiary voxels; and
- (c) to check to see if the subsidiary voxel meets at least one criterion by projecting the subsidiary voxels into at least one of the images, wherein the processor means is operable to compare characteristics of each of the image areas corresponding to the same voxel by comparing the colors of each of the image areas.

* * * * *

UNITED STATES PATENT AND TRADEMARK OFFICE
CERTIFICATE OF CORRECTION

| | | |
|---|---|---|
| PATENT NO. | : 6,990,228 B1 | Page 1 of 5 |
| APPLICATION NO. | : 09/718413 | |
| DATED | : January 24, 2006 | |
| INVENTOR(S) | : Charles Stephen Wiles et al. | |

It is certified that error appears in the above-identified patent and that said Letters Patent is hereby corrected as shown below:

On the title page, item
[56] REFERENCES CITED

Foreign Patent Documents

"EP 0898245 2/1999" should be deleted (duplicate).

"EP 0901105 3/1999" should be deleted (duplicate).

Other Publications

"Laurnetiini," should read --Laurentini,--.

"Photorealistic Scene Reconstruction by Voxel Coloring", S. Seitz et al., Proc. Conf. Computer Vision and Pattern Recognition, pp. 1067-1073, 1997." should be deleted (duplicate).

"Plenoptic Image Editing", S. Seitz et al., Proc. 6$^{th}$ International Conf. On Computer Vision, pp. 17-24" should be deleted (duplicate).

"Adaptive Least Squares Correlation: A Powerfule" should read --Adaptive Least Squares Correlation: A Powerful--.

"Automatic Reconstruction fo 3D" should read --Automatic Reconstruction of 3D--.

"Rapid Octree Construction from Image Sequences"; Richard Szeliski; CVGIP Image Understanding vol. 58. No. 1. Jul. 1993, pp. 23-32." should be deleted (1$^{st}$ occurrence) (duplicate).

COLUMN 1

Line 55, "does" should read --do--.

COLUMN 7

Line 46, "length etc)" should read --length, etc.)--.
    Line 54, "generated" should read --generate a--.

UNITED STATES PATENT AND TRADEMARK OFFICE
CERTIFICATE OF CORRECTION

| | | |
|---|---|---|
| PATENT NO. | : 6,990,228 B1 | |
| APPLICATION NO. | : 09/718413 | |
| DATED | : January 24, 2006 | |
| INVENTOR(S) | : Charles Stephen Wiles et al. | |

It is certified that error appears in the above-identified patent and that said Letters Patent is hereby corrected as shown below:

COLUMN 10

Line 26, "FA to FD" should read --$F_A$ to $F_D$--.

COLUMN 12

Line 31, "and. If" should read --and, if--.

COLUMN 13

Line 30, "S402 if" should read --S402 is--.
Line 60, "$\propto C_{TH15}$," should read --$_\Delta C_{TH15}$,--.

COLUMN 14

Line 21, "out" should read --out in--.
Line 29, "V1 to V6" should read --$V_1$ to $V_6$--.

COLUMN 19

Line 9, "intermediate" should read --intermediate to--.
Line 45, "ACTH." should read --$_\Delta C_{TH}$.--.

COLUMN 20

Line 44, "FIG. 17 or 18 or FIG. 18." should read --FIG. 15 or 17, or FIG. 18.--.

UNITED STATES PATENT AND TRADEMARK OFFICE
CERTIFICATE OF CORRECTION

PATENT NO. : 6,990,228 B1
APPLICATION NO. : 09/718413
DATED : January 24, 2006
INVENTOR(S) : Charles Stephen Wiles et al.

It is certified that error appears in the above-identified patent and that said Letters Patent is hereby corrected as shown below:

COLUMN 21

Line 26, "FA" should read --$F_A$--.
Line 30, "VA to VD" should read --$V_A$ to $V_D$--.
Line 31, "VA" should read --$V_A$--.
Line 34, "VA" should read --$V_A$--; and "VX" should read --$V_X$--.
Line 36, "VA" should read --$V_A$--.
Line 37, "VD" should read --$V_D$--.
Line 38, "VB" should read --$V_B$--.
Line 39, "VC" should read --$V_C$--.
Line 42, "VA and VC" should read --$V_A$ and $V_C$--.
Line 44, "VA" should read --$V_A$--.
Line 45, "VC" should read --$V_C$--.
Line 48, "VD" should read --$V_D$--.
Line 51, "VD" should read --$V_D$--.
Line 52, "VD" should read --$V_D$--.
Line 54, "VD" should read --$V_D$--.
Line 55, "VB" should read --$V_B$--.
Line 62, "intermediate" should read --intermediate to--.

COLUMN 22

Line 2, "intermediate" should read --intermediate to--.

COLUMN 25

Line 9, "$K_{n+1}=\Theta_{n+1,n}K_n\Theta_{n+1,n}^T+Q_n$" should read
--$K_{n+1}=\Theta_{n+1,n}K_n\Theta^T_{n+1,n}+Q_n$--.
Line 50, "X→X+G(X-HX)" should read -- $X \rightarrow X+G(\hat{X}-HX)$ --.

COLUMN 26

Line 27, "$K=\sqrt{(K_{11}K_{22})}$" should read -- $K=\sqrt{K_{11}K_{22}}$ --.

UNITED STATES PATENT AND TRADEMARK OFFICE
CERTIFICATE OF CORRECTION

| | |
|---|---|
| PATENT NO. | : 6,990,228 B1 |
| APPLICATION NO. | : 09/718413 |
| DATED | : January 24, 2006 |
| INVENTOR(S) | : Charles Stephen Wiles et al. |

It is certified that error appears in the above-identified patent and that said Letters Patent is hereby corrected as shown below:

COLUMN 28

Line 45, "(e.g." should read --(e.g.,--.
Line 57, "(i.e." should read --(i.e.,--.
Line 66, "(i.e." should read --(i.e.,--.

COLUMN 29

Line 14, "(i.e." should read --(i.e.,--.
Line 60, "(i.e." should read --(i.e.,--.

COLUMN 30

Line 14, "RM Harelick and LG Shapiro:" should read
--R.M. Harelick and L.G. Shapiro:--.
Line 17, "J Foley, A van Dam, S Feiner and J Hughes:" should read
--J. Foley, A. van Dam, S. Feiner and J. Hughes:--.
Line 67, "at" should read --at a--.

COLUMN 32

Line 35, "meets" should read --meet--.

COLUMN 34

Line 31, "a another" should read --another--.

COLUMN 37

Line 8, "a another" should read --another--.

UNITED STATES PATENT AND TRADEMARK OFFICE
CERTIFICATE OF CORRECTION

PATENT NO. : 6,990,228 B1
APPLICATION NO. : 09/718413
DATED : January 24, 2006
INVENTOR(S) : Charles Stephen Wiles et al.

It is certified that error appears in the above-identified patent and that said Letters Patent is hereby corrected as shown below:

COLUMN 40

Line 42, "meets" should read --meet--.
    Line 54, "a another" should read --another--.

COLUMN 42

Line 13, "image," should read --image--.

Signed and Sealed this

Twenty-ninth Day of September, 2009

David J. Kappos
*Director of the United States Patent and Trademark Office*